United States Patent [19]

Kamata et al.

[11] Patent Number: 5,038,463
[45] Date of Patent: Aug. 13, 1991

[54] APPARATUS FOR ASSEMBLING A VEHICULAR DRIVE SHAFT

[75] Inventors: Yoshiharu Kamata; Nobuyoshi Nagatsuma; Mituharu Ozawa; Hiroshi Yoshioka, all of Sayama, Japan

[73] Assignee: Honda Giken Kogyo Kabushiki Kaisha, Tokyo, Japan

[21] Appl. No.: 481,080

[22] Filed: Feb. 16, 1990

Related U.S. Application Data

[62] Division of Ser. No. 323,742, Mar. 15, 1989, Pat. No. 5,007,154.

[30] Foreign Application Priority Data

Mar. 17, 1988 [JP] Japan ................................. 63-63838
Mar. 18, 1988 [JP] Japan ................................. 63-65536

[51] Int. Cl.⁵ ............................................. B23P 21/00
[52] U.S. Cl. ....................................... 29/779; 29/783;
29/784; 29/787; 29/791; 29/824
[58] Field of Search ................. 29/771, 779, 783, 784,
29/787, 791, 819, 820, 822, 823, 824

[56] References Cited

U.S. PATENT DOCUMENTS

| | | | |
|---|---|---|---|
| 3,076,257 | 2/1963 | Svenson | 29/783 X |
| 3,364,551 | 1/1968 | Napur et al. | 29/783 X |
| 3,798,736 | 3/1974 | Gibbons et al. | 29/783 X |
| 4,173,824 | 11/1979 | Wolfthal | 29/783 |
| 4,554,723 | 11/1985 | Repella | 29/822 X |
| 4,733,454 | 3/1988 | Mutch | 29/450 |
| 4,815,187 | 3/1989 | Rettig | 29/245 |

FOREIGN PATENT DOCUMENTS

3134195A1 3/1983 Fed. Rep. of Germany .
3403292A1 8/1985 Fed. Rep. of Germany .
61-284333 12/1986 Japan .

Primary Examiner—Mark Rosenbaum
Assistant Examiner—Frances Chin
Attorney, Agent, or Firm—Armstrong, Nikaido, Marmelstein, Kubovcik & Murray

[57] ABSTRACT

The vehicular driving shaft is oriented and conveyed vertically around to plural assembling stations where component parts of a first joint unit are assembled to a lower end of the shaft whereupon the shaft is reversed and the component parts of the second joint unit are thereafter assembled to the now lower other end of the shaft. Plural carriers hold the shaft vertically as they are driven intermittently to plural stations, each station having an appropriate assembling device, the stations being grouped to first assemble the first joint unit and then to assemble the second.

4 Claims, 39 Drawing Sheets

FIG._4

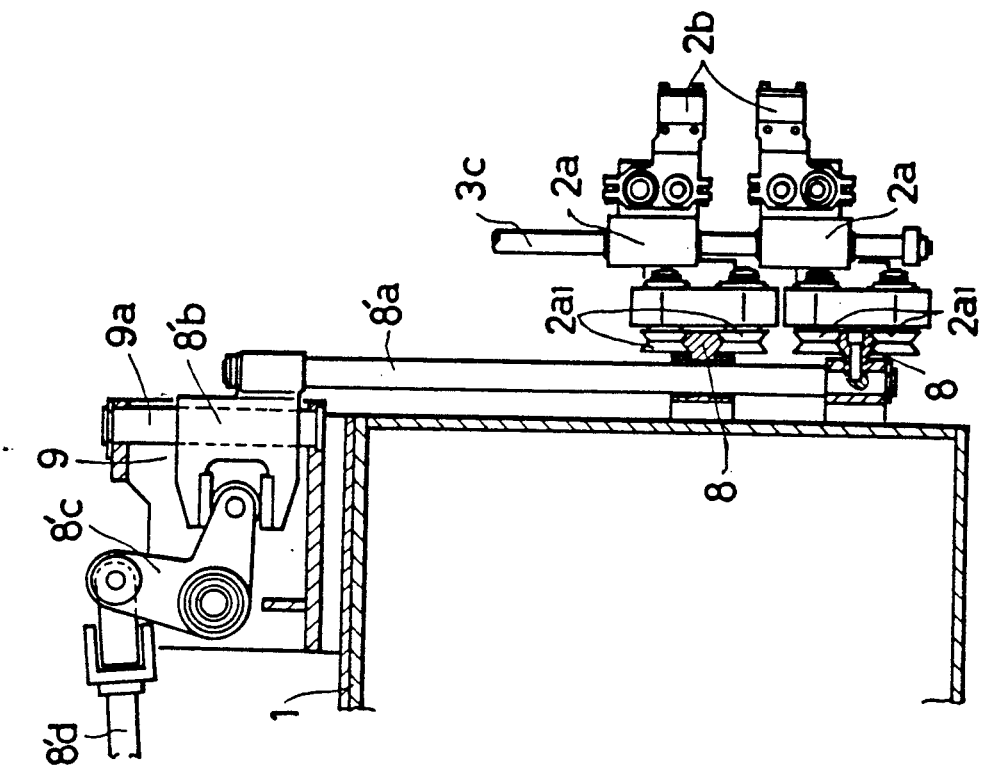
FIG._7
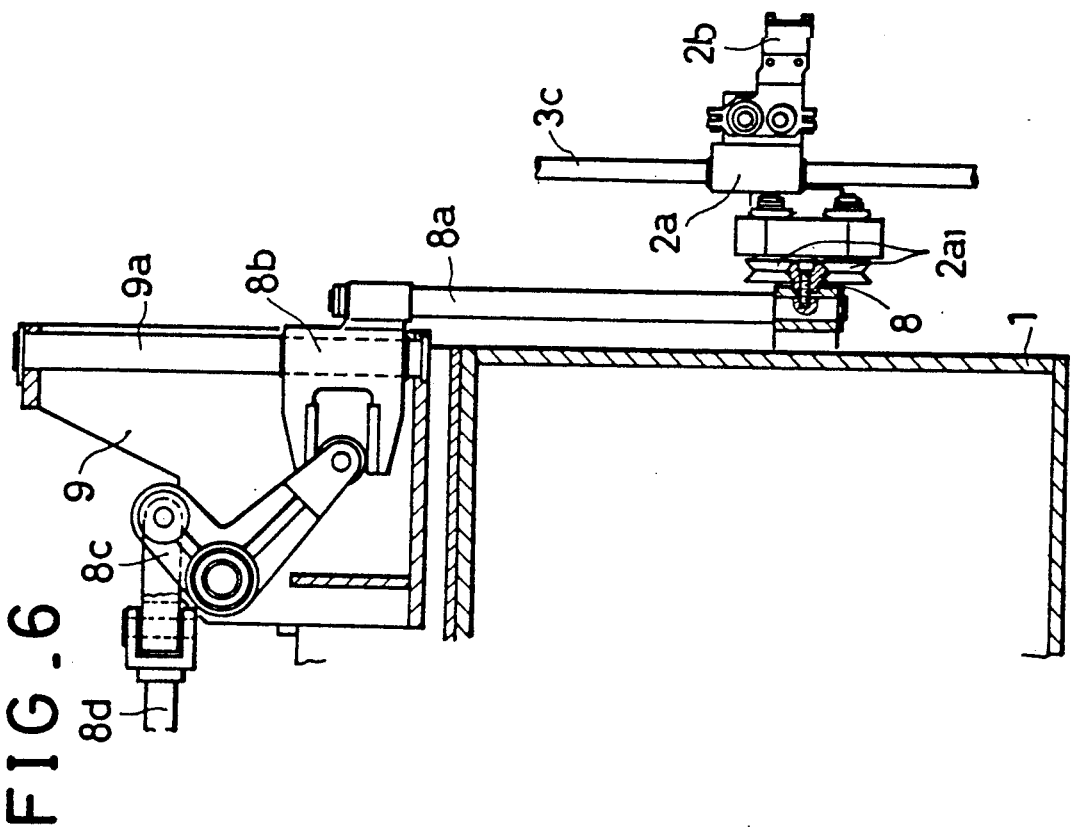
FIG._6

FIG.34 (a)
FIG.34 (b)
FIG.34 (c)
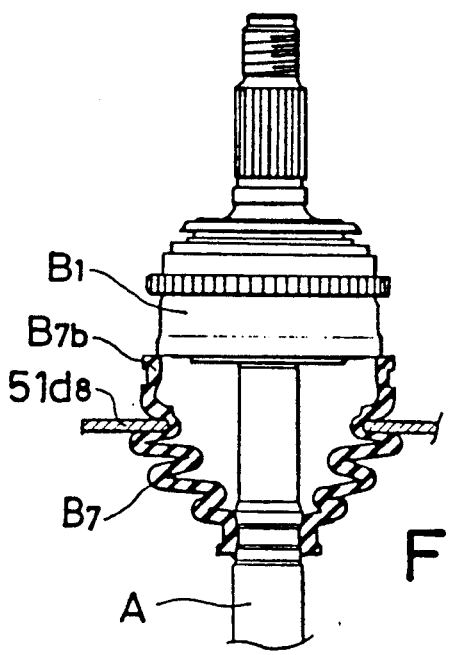
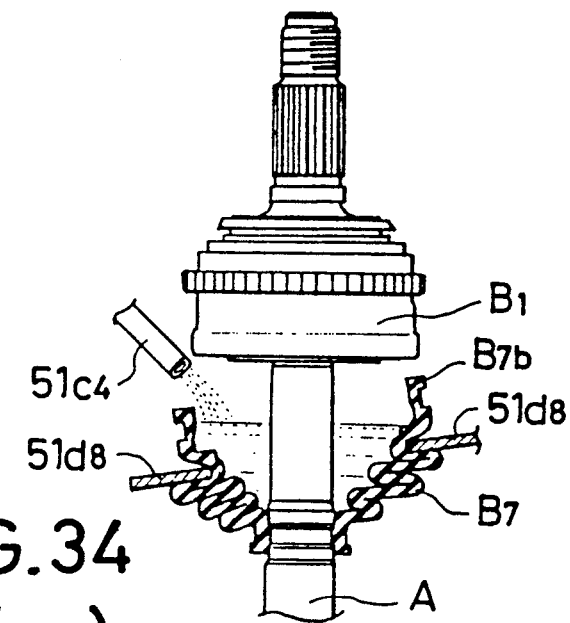
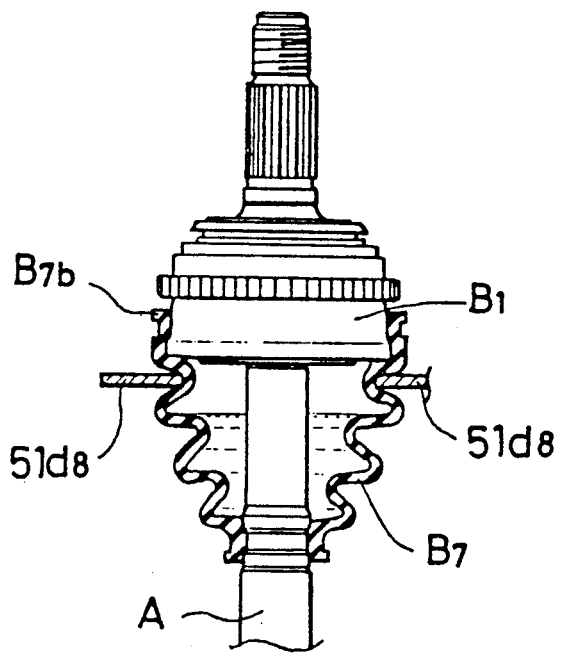

FIG._35

FIG.42 (a)
FIG.42 (b)
FIG.42 (c)
FIG.42 (d)
FIG.42 (e)
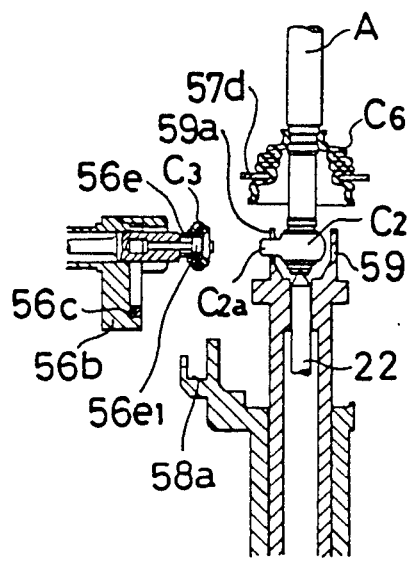
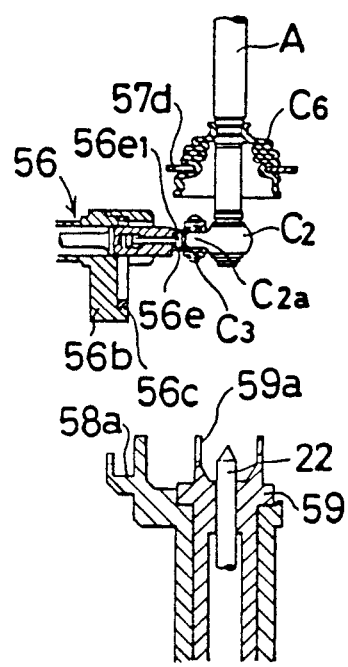
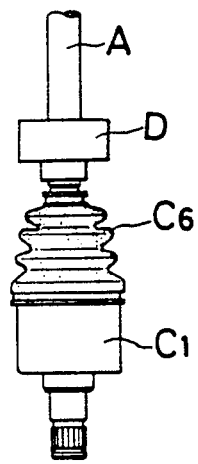
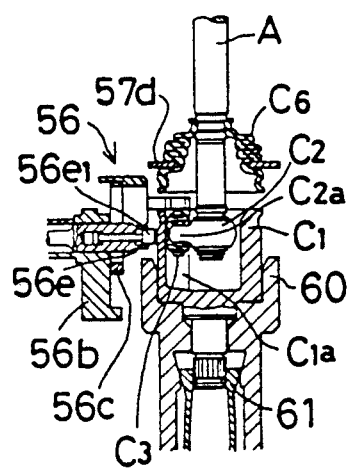
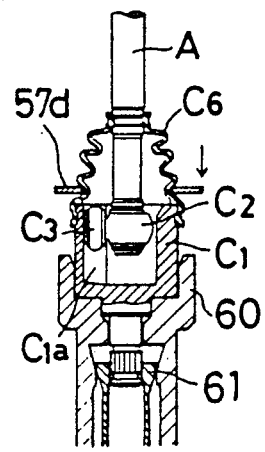
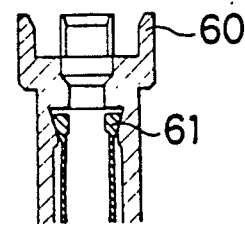

APPARATUS FOR ASSEMBLING A VEHICULAR DRIVE SHAFT

This is a division of application Ser. No. 323,742 filed Mar. 15, 1989, now U.S. Pat. No. 5,007,154.

BACKGROUND OF THE INVENTION

This invention relates to a method of, and an apparatus for, assembling a vehicular driving shaft in which a universal joint unit such as a bell type or tripod constant velocity joint or the like is attached to each of both ends of the driving shaft.

It has been usual heretofore with a conventional driving shaft assembly line of this kind, as disclosed in the Japanese Unexamined Patent Application Publication Tokkashio 61-284333, that a driving shaft held in its lateral laydown posture is sent intermittently to each of plurality of assembling stations. Component parts of a joint unit are assembled to the shaft at each of the assembling stations by means of an assembling device provided on one side of each of the assembling stations.

In the assembly line of this kind, some of the component parts of the first joint unit which are to be attached to one end of the driving shaft are attached to that one end at one of the assembling stations and thereafter some of the component parts of the second joint unit which are to be attached to the other end of the shaft are attached to that other end at next assembling station. Then, the remainder of the component parts of the first joint unit and those of the second joint unit are attached alternately to the one end and to the other end, respectively.

In the foregoing assembly line, the driving shaft which is a long-sized article is conveyed along the assembly line while in a lateral laydown posture, so that a conveying line or passage therefor has to be made wider and thus requires much space. In addition, when a component part which is relatively heavy is attached to one end of the driving shaft, the shaft becomes asymmetrical in weight balance and this makes it difficult to convey the shaft in its balanced posture. Therefore, a first object of the present invention is to solve these problems including the space requirement and the unbalanced posture of the shaft during conveying thereof so that the conveying line space may be reduced and the driving shaft can be conveyed in a balanced posture.

In each assembling station of the prior assembly line, a backup unit for centering a driving shaft and holding it in the centered position is provided to face the end of the shaft other than that to which component parts of the joint unit are being attached. However, in the above-described assembly line in which some of the component parts of the first and the second joint units are attached alternately to each of both ends of the driving shaft in one round of the assembling and some others in next round of the assembling, if one of the first and the second joint units, say, the second one, is changed to a different type, it becomes necessary to change not only the specification of each assembling device for the second joint unit provided at each assembling station but also the specification of a backup unit provided at each assembling station for the first joint unit in order to have it adapted for the corresponding component parts of the second joint unit assembled at the preceding assembling station, so that it takes more time and work to carry out the change. A solution to this problem is the second object to be attained by the present invention.

SUMMARY OF THE INVENTION

According to the present invention in order to achieve the first object described above, there is provided a method for assembling a vehicular driving shaft in which a joint unit is attached to each of both ends of the driving shaft, the method being characterized in that the driving shaft is, while kept held in a vertical posture in which its axial line extends vertically, conveyed to a plurality of assembling stations where component parts of these joint units are assembled to the driving shaft. Each of said component parts is assembled to the driving shaft at each of these stations while the driving shaft is held in its vertical posture.

Taking advantage of the fact that the postural stability of the driving shaft during transit is not impaired by a weight imbalance of the shaft that can result from attachment of a joint unit to one end of the driving shaft making that one end heavier than the other end when the driving shaft is conveyed in its vertical posture as in the present invention, the second aspect of the present invention has been developed to achieve the second object described in the foregoing. According to the invention the method is further arranged such that the plurality of the assembling stations are divided into two groups, a first group of assembling stations for a first joint unit to be assembled to one end of the driving shaft and a second group of assembling stations for a second joint unit to be assembled to the other end of the driving shaft. The second joint unit is assembled to the driving shaft in the assembling stations belonging to the second group thereof after the first joint unit has been assembled to the driving shaft in the assembling stations belonging to the first group.

When component parts of the joint units are assembled to the driving shaft while the shaft is held in its vertical posture as described in the foregoing, the component parts are more likely to come off from the assembling device if assembled to the shaft from thereabove. In the above arrangement, the component parts which have come off from the assembling device fall into a rubber boot covering the open end of the joint unit facing the driving shaft, so that extra work is required to remove the fallen component parts therefrom. Therefore, it is much desired to eliminate this disadvantage by assembling the component parts to the shaft from therebelow.

To meet such a desire as mentioned above, the third aspect of the present invention has been developed, wherein the method is rearranged so that the driving shaft is conveyed to each of the stations belonging to the first group while held in its vertical posture in which one end thereof faces downward and each of the component parts of the first joint unit is assembled to that one end of the driving shaft from therebelow at each station of the first group. The driving shaft is then reversed upside down and conveyed to each of the stations belonging to the second group while being held in a vertical posture with the other end facing downward to assemble each of the component parts of the second joint unit to the other end of the driving shaft from therebelow at each station of the second group.

The fourth aspect of the present invention provides an assembling apparatus designed for use in an embodiment of the inventive method, the apparatus being characterized in that a plurality of carriers are movably provided along an annular conveying passage holding the driving shaft in its vertical posture in which its axial line extends vertically. A plurality of assembling stations are disposed at appropriate intervals along the peripheral direction in the annular conveying passage, each comprising a predetermined assembling device for assembling each component part of each of the joint units to the driving shaft and a supplying device for feeding each of the component parts. A drive mechanism is provided which stops each carrier at each of the assembling stations and moves it intermittently in the peripheral direction of the conveying passage.

The fifth aspect of the present invention provides an assembling apparatus corresponding to second aspect of the inventive method. According to this invention, the apparatus is rearranged so that the plurality of the assembling stations are divided into two groups, a first group of assembling stations for a first joint unit to be assembled to one end of the driving shaft and a second group of assembling stations for a second joint unit to be assembled to the other end of the driving shaft. The first and second groups of assembling stations are disposed in that order along the peripheral direction of the conveying passage. A discharging station and a charging station are provided side by side on the portion of the conveying passage located between the final end of the second group of the stations and the starting end of the first group of the stations for removing the driving shaft from each of said carriers and for setting the driving shaft onto each carrier.

The sixth aspect of this invention provides an assembling apparatus corresponding to the third aspect of the inventive method. According to this invention, the apparatus is further rearranged so that a reversing station is provided on the portion of the conveying passage located between the final end of the first group of the stations and the starting end of the second group of the stations which is equipped with a reversing device for removing the driving shaft from each of the carriers, turning the shaft upside down and then resetting the shaft on each of the carriers. Each of the assembling devices provided at each assembling station of each group of the stations is arranged to be of the type that each of the component parts is assembled to the driving shaft from therebelow. The charging station is provided with a loader device for setting the driving shaft on each carrier while holding the shaft with said one end thereof facing downward.

Each assembling station belonging to the first group of assembling stations is also provided with a backup unit for centering the other end of the driving shaft and holding it centered while each assembling station belonging to the second group of assembling stations is provided with a backup unit serving to center and hold centered the shank of the outer member of the first joint unit which has been assembled to the end of the driving shaft.

By adopting a conveying system in which the driving shaft is conveyed in its vertical or upright posture, the conveying passage is arranged to have the smallest possible width regardless of length of the driving shaft. In addition, since component parts of each joint unit are assembled to the driving shaft held in its vertical posture at each assembling station, the component parts are assembled to the shaft in a vertical direction so that the assembling devices and the backup units can be provided in a vertical arrangement on the assembling stations, thus reducing a planar space required for an assembling station and contributing to improvement of the space economy.

Further, even when one end of the driving shaft becomes heavier with the component parts attached thereto than the other end, this increased weight acts on the vertically standing shaft along its vertical axial line, so that the posture of the driving shaft can not be affected thereby so much as to become unstable.

According to the second aspect of the present invention, the assembly of component parts of the second joint unit to the other end of the driving shaft is not started until after the component parts of the first joint unit have been completely assembled to one end of the driving shaft at the assembling stations belonging to the first group. Therefore, it is good enough to serve the purpose if the backup unit provided at each of the assembling stations of the first group for centering the other end of the driving shaft and holding it in the centered state is so arranged as to directly hold said other end of the driving shaft. In this manner, it is not necessary to change the specification of the backup unit due to change in type of the second joint unit. Since assembling of the first joint unit is all carried out at the assembling stations of the first group, the backup unit provided at each of the assembling stations of the second group may simply be arranged to be of such a type that it holds the shank of the outer member of the first joint unit. In this case, the shank of the outer member generally does not change its shape so much just because the type of the joint unit is changed. Accordingly, it is not necessary to change the specifications of the backup unit for each of the assembling stations of the second group due to change in type of the first joint unit, so that change in type of each of the first and the second joint units can be dealt with by changing only the specifications of the assembling device disposed at each assembling station of the corresponding group of the stations.

According to the third aspect of the present invention, each of the component parts of the first joint unit is assembled to one end of the driving shaft from therebelow at all the stations of the first group while the driving shaft is held in its vertical posture with the one end facing downward. Then, the driving shaft is turned upside down to have the other end of the driving shaft face downward for assembling thereto each of the component parts of the second joint unit from therebelow at all the stations of the second group. This prevents the component parts from coming off during the assembling process and even if some of said parts should come off, they fall down below the driving shaft and do not fall into the rubber boot as when assembled from above the shaft, thus eliminating otherwise necessary extra and troublesome work to take out the fallen parts out of the boot.

According to the fourth aspect of the invention, in the assembling apparatus each carrier is intermittently moved in the peripheral direction of the annular conveying passage so as to convey the driving shaft successively to a plurality of the assembling stations disposed along the conveying passage held in its vertical or upright posture by each carrier. Each of the component parts of the joint unit fed from the supplying device is assembled to the driving shaft by the assembling device at each of the assembling stations.

For the above operation, it may be possible to convey the driving shaft along a linear conveying passage. In such an arrangement, however, it is necessary to provide a return passage for returning each empty carrier from the final end of the passage to the starting end thereof, so that the length of such a loop passage comprising a conveying passage and a return passage almost double that of the conveying distance of the driving shaft. Since the number of the carriers determined by dividing the length of the loop passage by the disposition pitch for the assembling station is necessary, more carriers are required in such a case to result in a higher equipment cost.

Compared with the foregoing arrangement, in the fourth aspect, the assembling apparatus conveys the driving shaft along the annular conveying passage and thus requires no return passage, so that the number of the carriers required is half as many, as compared with the linear conveying passage type, and reduction in the equipment cost can be achieved.

According to the assembling apparatus in the fifth aspect, the driving shaft set onto a carrier at the charging station is conveyed successively to each of the assembling stations of the first group for having the first joint unit assembled to one end thereof, and thereafter conveyed also successively to each of the assembling stations of the second group for having the second joint unit assembled to the other end thereof. Then, the completely assembled driving shaft is taken out of the carrier and said carrier so emptied of the driving shaft is returned to the charging station to have an incomplete driving shaft set thereon, this cycle of operation thus being repeated.

According to the assembling apparatus in the sixth aspect, the driving shaft is conveyed to each of the assembling stations of the first group while held in its vertical posture with one end thereof facing downward, and component parts of the first joint unit are assembled to the one end from therebelow. Next, the driving shaft is turned upside down by the reversing device at the reversing station and reset on the carrier, so that the driving shaft is conveyed to each of the assembling stations of the second group while held in its vertical posture with the other end thereof facing downward, and component parts of the second joint unit are assembled to the other end from therebelow.

BRIEF DESCRIPTION OF THE DRAWINGS

The above and other objects and the attendant advantages of the present invention will become readily apparent by reference to the following detailed description when considered in conjunction with the drawings wherein:

FIGS. 5 through 7 are, respectively, sectional views taken along the lines V—V through VII—VII in FIG. 4;

FIG. 34(a) through 34(c) are explanatory diagrams of operation thereof;

FIGS. 42(a) through 42(e) are diagrams explaining operation of the assembling device concerned;

DETAILED DESCRIPTION OF PREFERRED EMBODIMENTS

Figure 54:
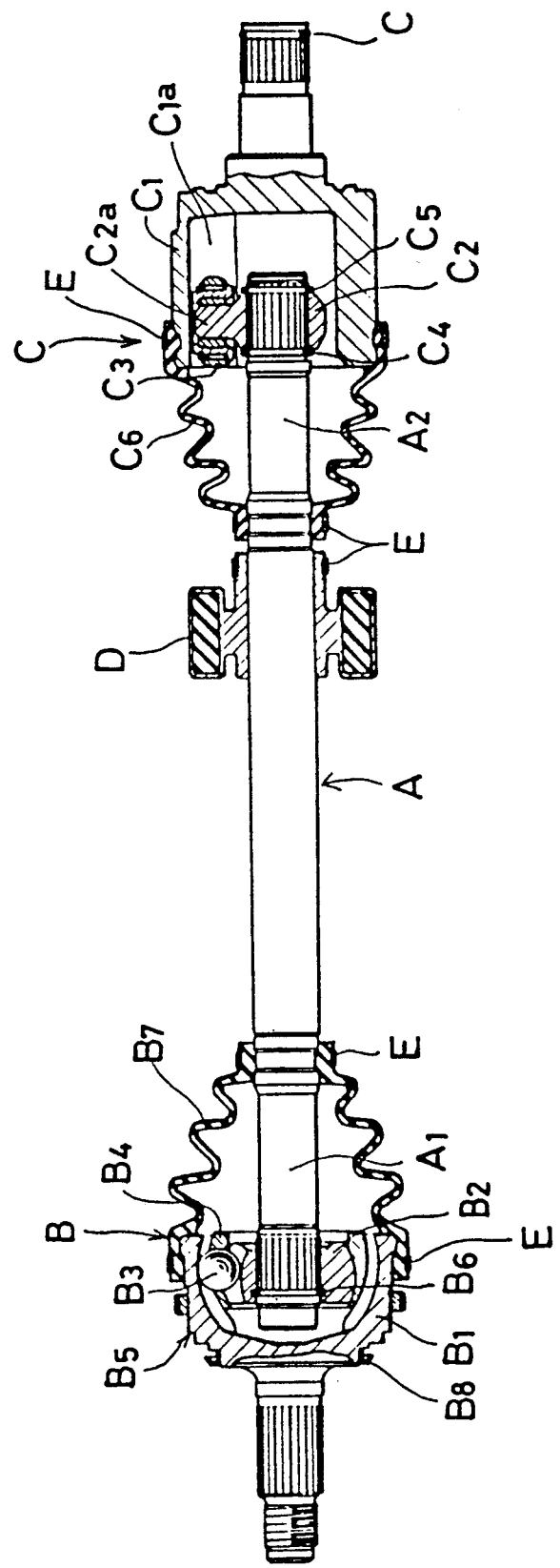
FIG. 54 is a longitudinal sectional view of the driving shaft.

Shown in the accompanying drawings is an embodiment of the present invention in which the present invention is applied to assembling a driving shaft A for an FF (front-engine, front-drive) vehicle. The driving shaft has a first joint unit B consisting of a bell type constant velocity joint provided at one end A1 (output end) thereof, a second joint unit C consisting of a tripod type constant velocity joint provided at the other end A2 (input end) thereof and a damper weight D provided at the intermediate portion thereof, as shown in FIG. 54.

The first joint unit B comprises a joint body B5 having an outer member B1, an inner member B2, a plurality of balls B3 and a retainer B4 attached thereto, a stopper ring B6 which holds the inner member B2 fixed on the driving shaft A, and a rubber boot B7. The second joint unit C comprises an outer member C1, a spider C2, rollers C3 fitted to the spider C2, a pair of circlips C4, C5 which hold the spider C2 fixed on the driving shaft, and a rubber boot C6.

In the drawings an outer ring B8 is fitted to the outer periphery of the outer member B1. A set ring C7 is fitted to the shank of the outer member C1. A band E is used to fix in place each of the boots B7, C6 and the damper weight D with each of these bands E being fitted for use after assembling of the shaft has been completed.

Figure 1:
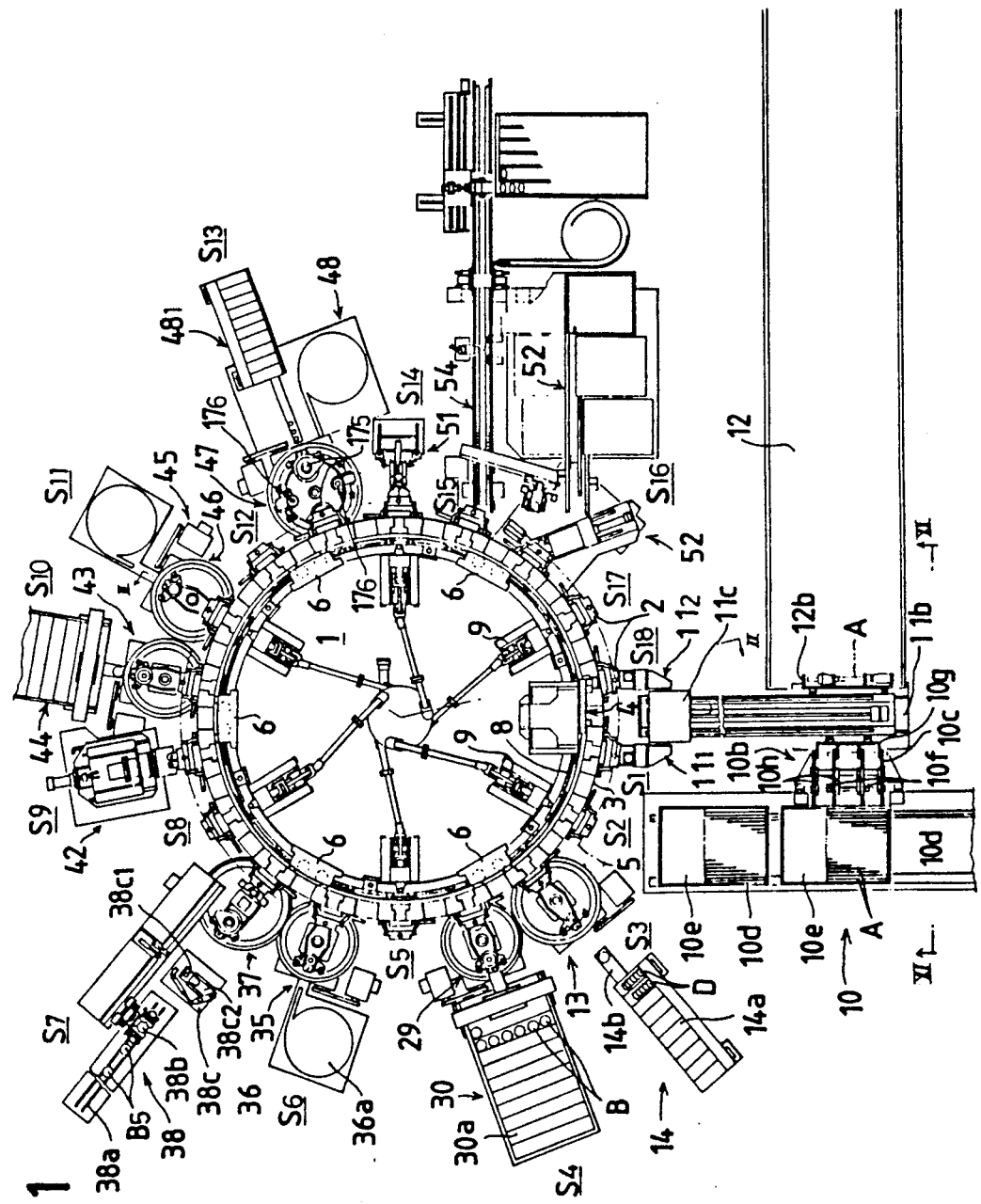
FIG. 1 is a top plan view of one embodiment of an assembling apparatus to the present invention.
Figure 2:
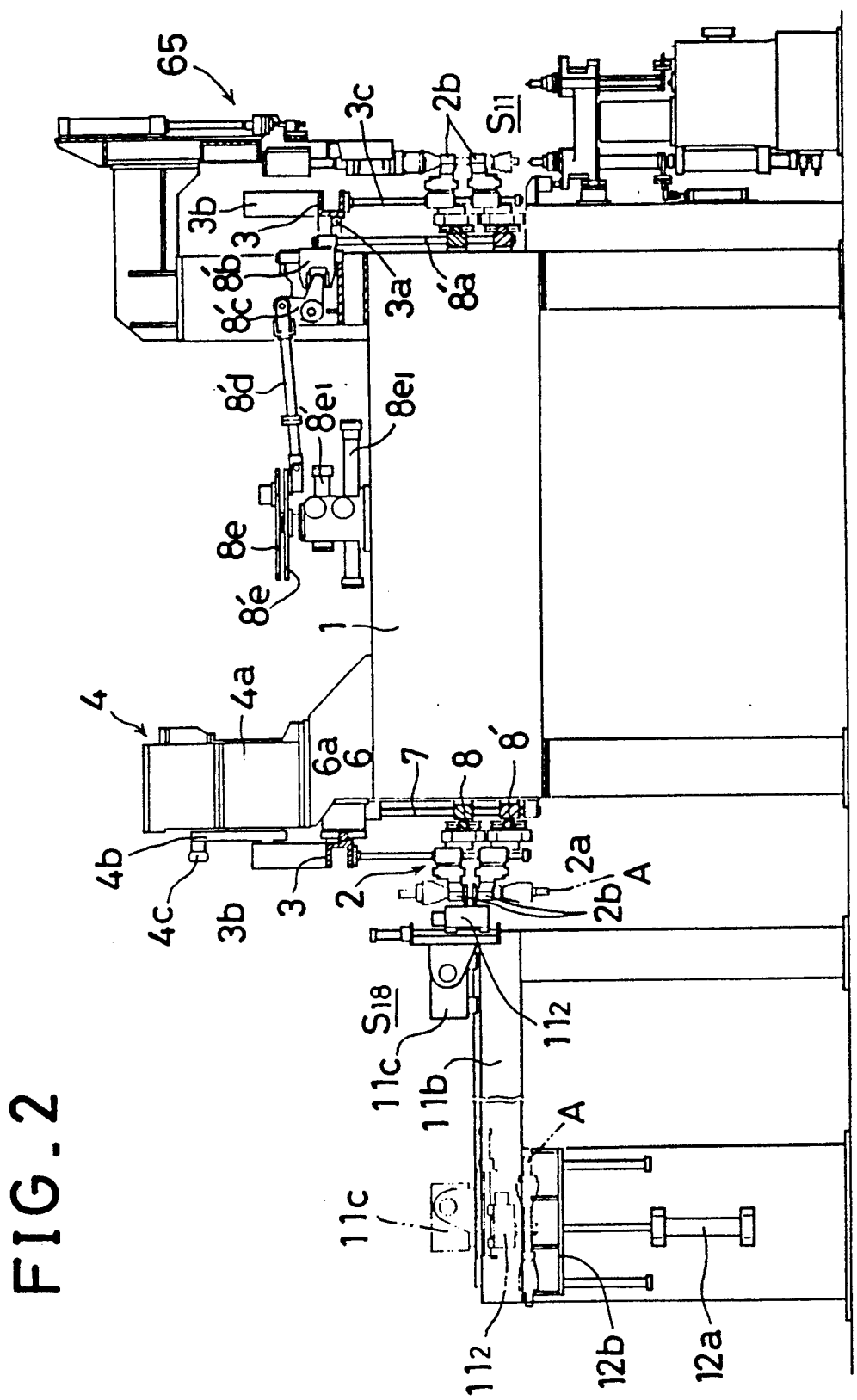
FIG. 2 is a sectional view taken along line II—II in FIG. 1.

Referring to FIGS. 1 and 2, the reference numeral 1 denotes a circular machine base, 2 denotes a carrier which holds the driving shaft A in its vertical posture, and 3 denotes an annular frame turnably held on the outer periphery of the machine frame 1. Eighteen units of the carrier 2 are provided on the annular frame 3 at intervals of 20°. The annular frame 3 is intermittently turned 2° at a time in the clockwise direction on FIG. 1 by a drive mechanism 4 which is to be discussed later in detail so that the driving shaft A held by these carriers 2 may be intermittently moved 20° at a time in the peripheral direction along an annular conveying passage 5 provided around the machine frame 1. Eighteen stations S1 through S18 are disposed on the conveying passage 5 at intervals of 20° so that the driving shaft A may stop at each station and move on successively to the next station in order.

In the above arrangement, S1 denotes a charging station in which the driving shaft A is set on the carrier 2, S2 denotes an empty station, S3 denotes an assembling station for the damper weight D, S4 denotes an assembling station for the rubber boot B7, S5 denotes an empty station, S6 denotes an assembling station for the stopper ring B6, S7 denotes an assembling station for the joint body B5, S8 denotes an empty station, S9 denotes a reversing station in which the driving shaft is reversed upside down, S10 denotes an assembling station for the rubber boot C6, S11 denotes an assembling station for the circlips C4, S12 denotes an empty station, S13 denotes an assembling station for assembling the spider C2 with the circlips C5, S14 denotes a grease injection station for the first joint unit B, S15 denotes an empty station, S16 denotes an assembling station for assembling the roller C3 with the outer member C1, S17 denotes an empty station, and S18 denotes a discharging station in which the driving shaft A is removed from carrier 2 and discharged for next step of the assembling process. The assembling stations S4, S6 and S7 for assembling the component parts of the first joint unit B are grouped as one group and disposed along one-half portion of the annular conveying passage 5. The other group of the assembling stations including S10, S11, S13 and S16 for assembling the component parts of the second joint unit C are disposed along the other half of the annular conveying passage 5. After assembling of the first joint unit has been completed at the former group of the assembling stations, assembling of the second joint unit is carried out at the latter group of the assembling stations.

Figure 3:
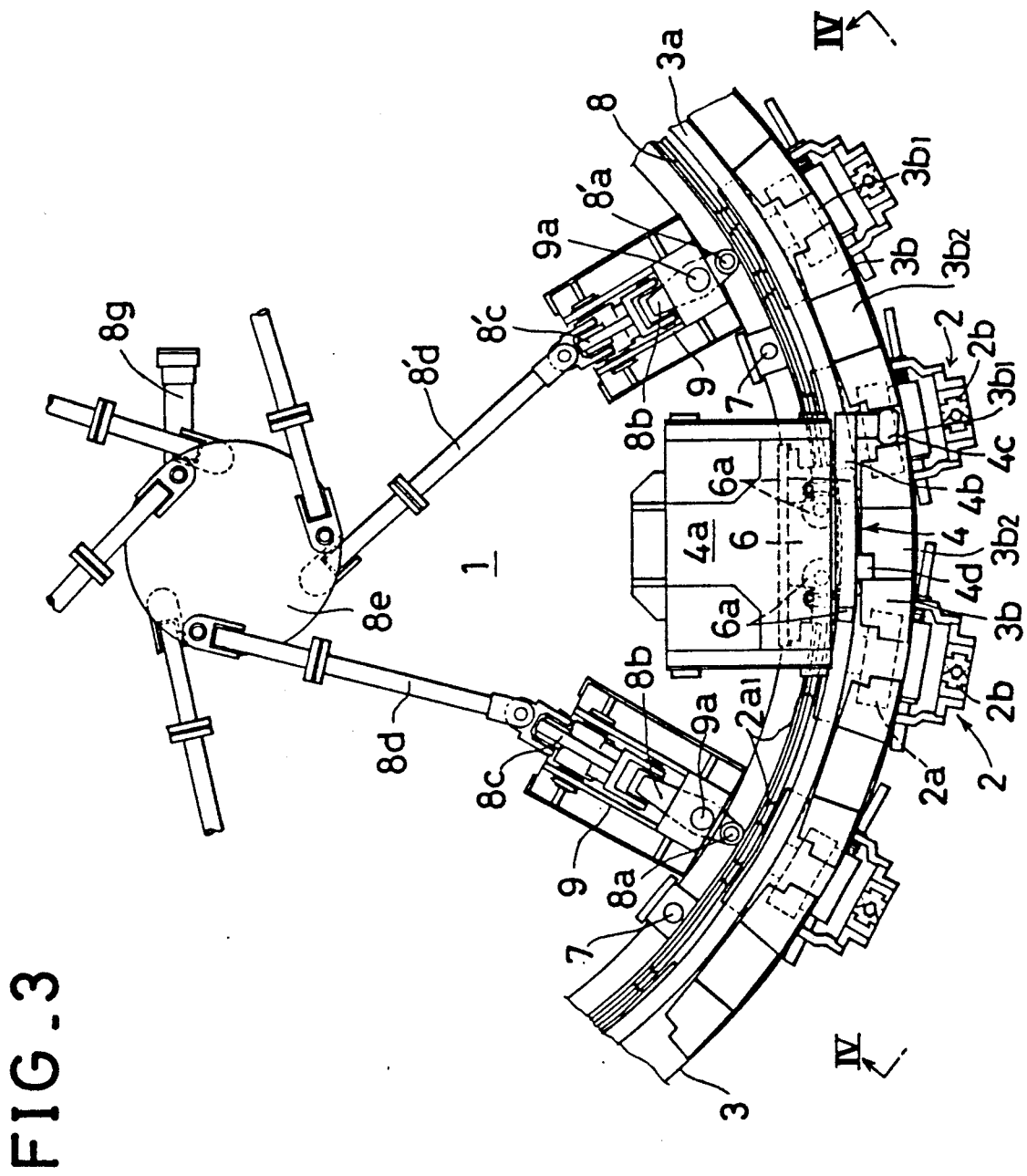
FIG. 3 is an enlarged top plan view of important portions of the conveying passage for the driving shaft.
Figure 4:
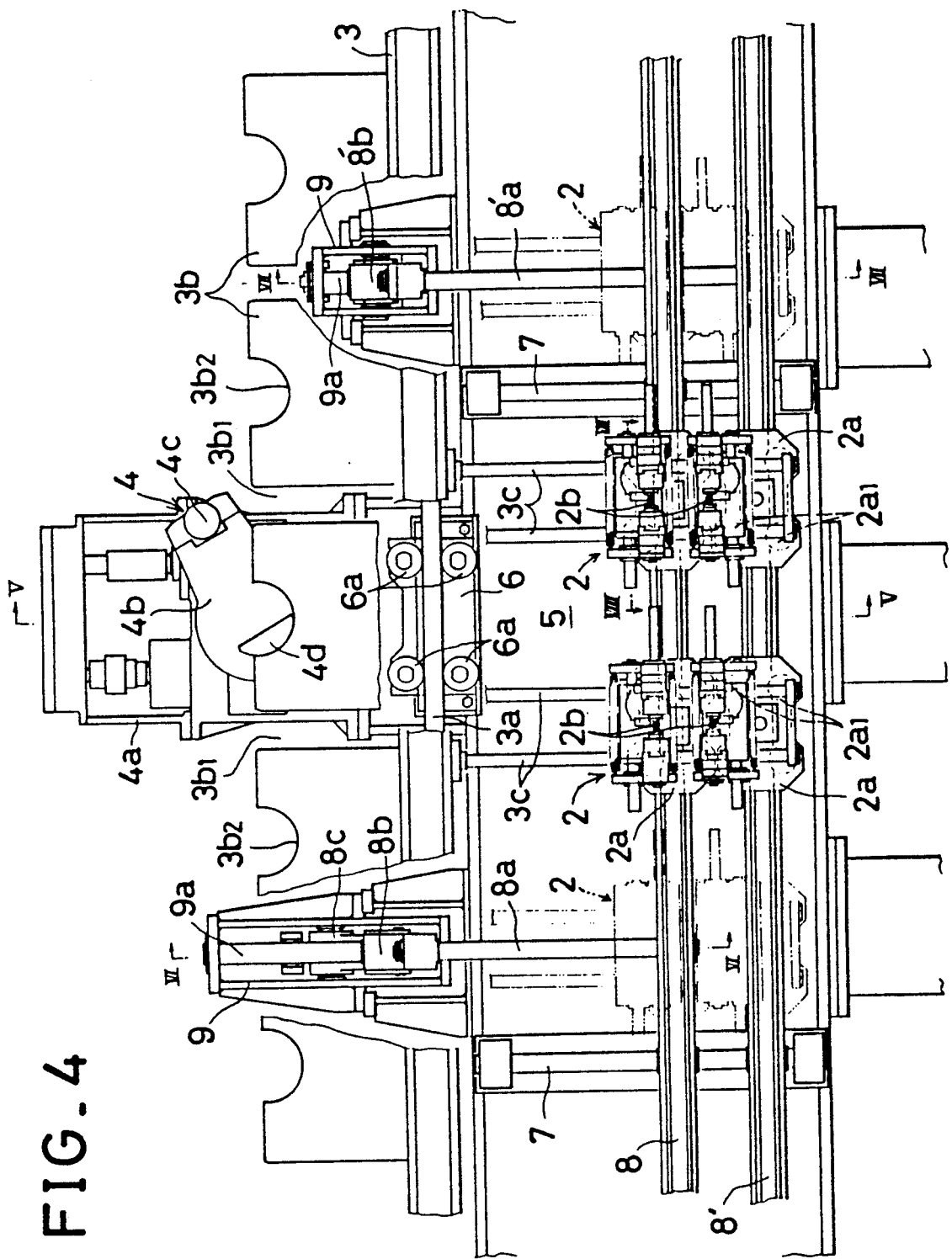
FIG. 4 is an expanded front view of the conveying passage as viewed form the line IV—IV in FIG. 3.
Figure 5:
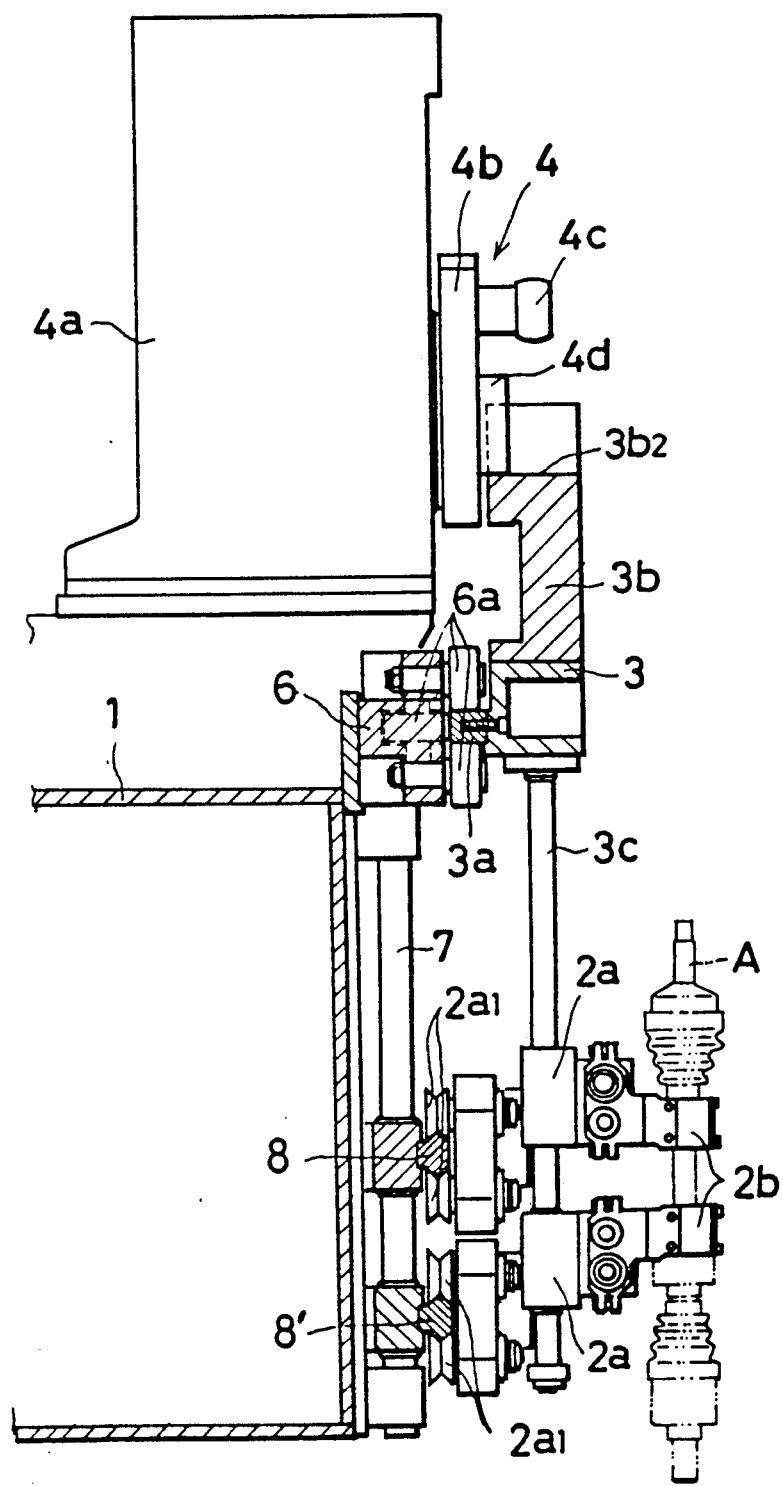

The annular frame 3 is provided with an annular guide rail 3a on the inner peripheral surface thereof as shown in FIGS. 3 through 5. A plurality of guide blocks 6 having a plurality of guide rollers 6a for supporting the guide rail 3a are disposed at appropriate intervals in the peripheral direction on the upper-end outer peripheral surface of the machine base 1 so as to make the annular frame 3 turnable around the machine base 1. There are also provided on the upper surface of the annular frame 3 eighteen tooth portions 3b disposed at intervals of 20°. The afore-said drive mechanism 4 is formed of a Geneva mechanism comprising a Geneva pin 4c fitted to the top end of an arm 4b intermittently rotated by a drive source 4a. The Geneva pin 4c is engageable with a gap $3b_1$ formed between adjacent tooth portions 3b, 3b. In this arrangement, when the arm 4b is rotated in the clockwise direction from the state shown in FIG. 4, the pin 4c comes to engage the gap $3b_1$ to turn the annular frame 3. With the annular frame 3 turned 20°, the pin 4c comes out of the gap $3b_1$ and a semicircular stopper 4d projecting from the root portion of the arm 4b becomes engaged with a U-shaped recess $3b_2$ formed on the upper end of the tooth portion 3b on the right side of the gap to stop the annular frame 3 so that the annular frame 3 is intermittently turned 20° with each full turn of the arm 4b.

Each of the afore-said carriers 2 comprises a pair of upper and lower carrier frames 2a, 2a and a pair of upper and lower chuck members 2b, 2b for holding the driving shaft A upright or in a vertical posture on the carrier frames. Eighteen guide members, each of which comprises a pair of guide bars 3c, 3c extending vertically longitudinally are provided on the underside surface of the annular frame 3 at intervals of 20° and are suspended therefrom. The paired upper and lower carrier frames 2a, 2a of each carrier 2 are supported on each pair of the guide bars 3c, 3c in such a manner as to be slidable in the vertical direction. A pair of upper and lower annular lift rails 8, 8' are provided about the machine base 1 and are supported to be movable up and down along a plurality of guide bars 7 fixedly attached to the machine base 1 in such a manner as to be extending vertically longitudinally. The upper carrier frames 2a of all of the eighteen carriers 2 are engaged with the upper lift rail 8 and the lower carrier frames 2a thereof are all engaged with the lower lift rail 8', respectively, via a plurality of the guide rollers $2a_1$, in such a manner that they may be slidable along in the peripheral direction. Thus, the respective carrier frames 2a of all of these carriers 2 are caused by the upward and downward movements of the respective lift rails 8, 8' to move upward and downward as said lift rails 8, 8' move upward and downward so that clamp positions at which the driving shaft A is clamped by the respective chuck members 2b may be changed freely according to type of the driving shaft A being assembled.

In addition, a plurality of actuating rods 8a, 8'a are erected at appropriate intervals on the upper surfaces of the lift rails 8, 8'. As shown in FIGS. 6 and 7, forks 8b 8'b vertically movably supported on a guide bar 9a provided on each bracket 9 on the machine base 1 are connected to the upper ends of the respective rods 8a, 8'a. One end of each of levers 8c, 8'c pivotally supported on each bracket 9 is engaged with each of the forks 8b, 8'b. Links 8d, 8'd are connected to the other ends of the respective levers 8c, 8'c. As shown in FIGS. 2 and 3, a pair of upper and lower rotary tables 8e, 8'e are provided at the center portion of the upper surface of the machine base 1, each of which can be rotated to any desired degree separately by one of rotary actuators 8e 8'$e_1$. The link 8d corresponding to the upper lift rail 8 is connected to the upper rotary table 8e and the link 8'd corresponding to the lower lift rail 8' is connected to the lower rotary table 8'e. As the upper rotary table 8e rotates, the lever 8c swings via the link 8d. This causes the upper lift rail 8 to be moved upward and downward through the fork 8b and the actuating rod 8a. When the lower rotary table 8'e rotates, the lower lift rail 8' is caused likewise to move upward and downward through the link 8'd, the lever 8'c, the fork 8'b and the actuating rod 8'a.

Figure 8:
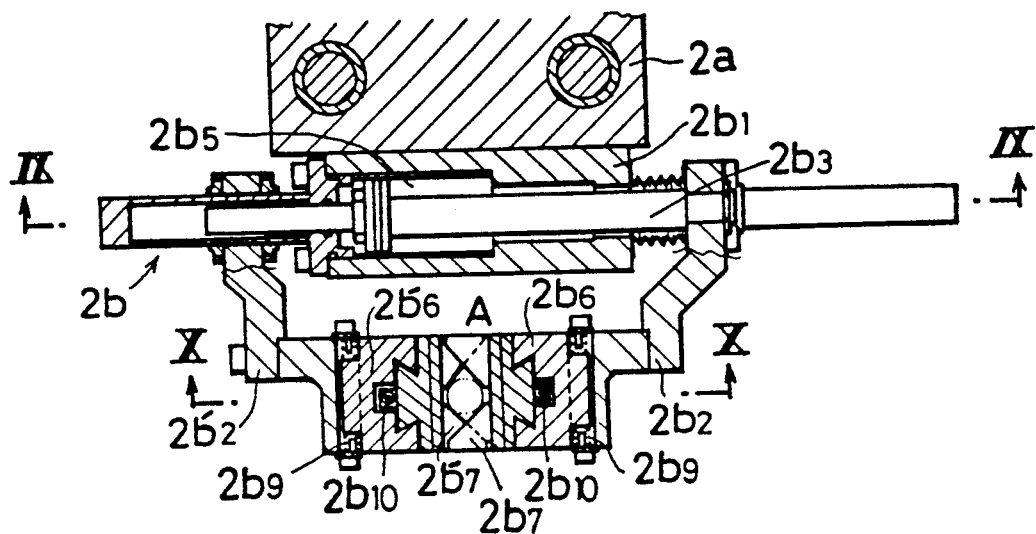
FIG. 8 is a sectional plan view of the chucking unit for the carrier taken along line VIII—VIII in FIG. 4.
Figure 9:
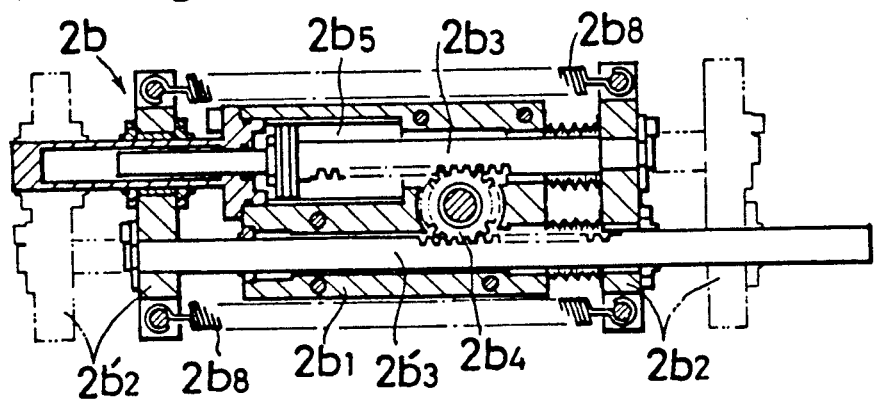
FIGS. 9 and 10 respectively, sectional front views taken along the lines IX—IX and X—X in FIG. 8.
Figure 10:
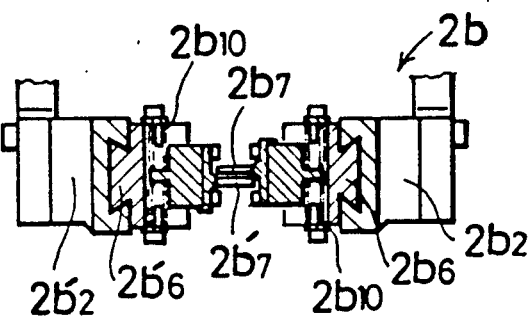

Details of each chuck member 2b are as shown in figures 8 through 10. A pair of left and right clamp arms $2b_2$, $2b_2'$ are supported laterally slidable through rack bars $2b_3$, $2b_3'$ on a base frame $2b_1$ fixed to the carrier frame 2a. The rack bars $2b_3$, $2b_3'$ are connected to each other, via a pinion $2b_4$ pivotally supported within the base frame $2b_1$, in such a manner as to be movable back and forth in the direction opposite to each other. One of the rack bars $2b_3$ is connected to the piston in a cylinder $2b_5$ provided in the base frame $2b_1$ so that both the clamp arms $2b_2$, $2b_2'$ may be operated to open and close by operation of the cylinder $2b_5$. Sliders $2b_6$, $2b_6'$ which are floatably movable forth and back are attached, respectively, to the front ends of the clamp arms $2b_2$, $2b_2'$. The sliders $2b_6$, $2b_6'$ are used to support and hold floatably movable upward and downward V-shaped clamping pieces $2b_7$, $2b'_7$ which hold the driving shaft A properly centered. Thus, when both the clamp arms $2b_2$, $2b_2'$ are closed, the driving shaft A is clamped between the clamping pieces $2b_7$, $2b_7'$ held in such a way that, with the floating operations of the sliders $2b_6$, $2_6'$, the driving shaft may be slightly movable back and forth as well as upward and downward, with respect to the carrier 2. In the drawings, a spring $2b_8$ urges the clamp arms $2b_2$, $2b_2'$ toward the closing direction. Centering springs $2b_9$ and $2b_{10}$, urge, respectively, and hold the sliders $2b_6$, $2b_6'$ and the clamping pieces $2b_7$, $2b_7'$ at the neutral position.

Referring to FIGS. 1 and 2, the charging station S1 is provided with a loader device $11_1$ for setting the driving shaft A on the carrier 2 in a vertical posture with one end A1 down. The driving shaft A is supplied there in a horizontal posture by a supplying device 10. The discharging station S18 is provided with an unloader device $11_2$ for removing the driving shaft A from the carrier 2 and discharging it in a horizontal posture onto a conveyor 12 carrying it to the next step of the process. Both the loader and the unloader devices $11_1$ and $11_2$ are each provided with a chucking unit 11a for holding the driving shaft A. These devices $11_1$ and $11_2$ are mounted on both sides of a common movable frame 11c on a holder base 11b located at the mid-point portion between the two stations S1 and S18 in such a manner that they may be turned 90° about a lateral axis, respectively, to the downward facing posture and the forward facing posture.

The supplying device 10 and the conveyor 12 are disposed on both sides of the rear end portion of the holder base 11b. The loader device $11_1$ and the unloader device $11_2$ are turned to their downward facing postures. The movable frame 11c is then retreated to the rear end portion of the holder base 11b. Thereafter, at this retreated position, the driving shaft A being supplied in a horizontal posture by the supplying device 10 is held by the chucking unit 11a of the loader device $11_1$ and the driving shaft A held by the chucking unit 11a of the unloader device $11_2$ is discharged in its horizontal posture onto the conveyor 12. The movable frame 11c is advanced to the front end portion of the holder base 11b while the two devices $11_1$, $11_2$ are both being turned to the forward facing postures. At this advanced position, the driving shaft A held in a vertical posture by the chucking unit 11a of the loader device $11_1$ is clamped by the chuck member 2b of the carrier 2 found in the charging station S1 so as to transfer the driving shaft A to the carrier 2 while the driving shaft A held in a vertical posture by the chuck member 2b of the carrier 2 present in the discharging stations S18 is clamped by the chucking unit 11a of the unloader device $11_2$ so as to have the unloader device receive the driving shaft A. The above-described operations are repeated to carry out charging and discharging the driving shaft A each time the carrier 2 is intermittently transferred.

Figure 11:
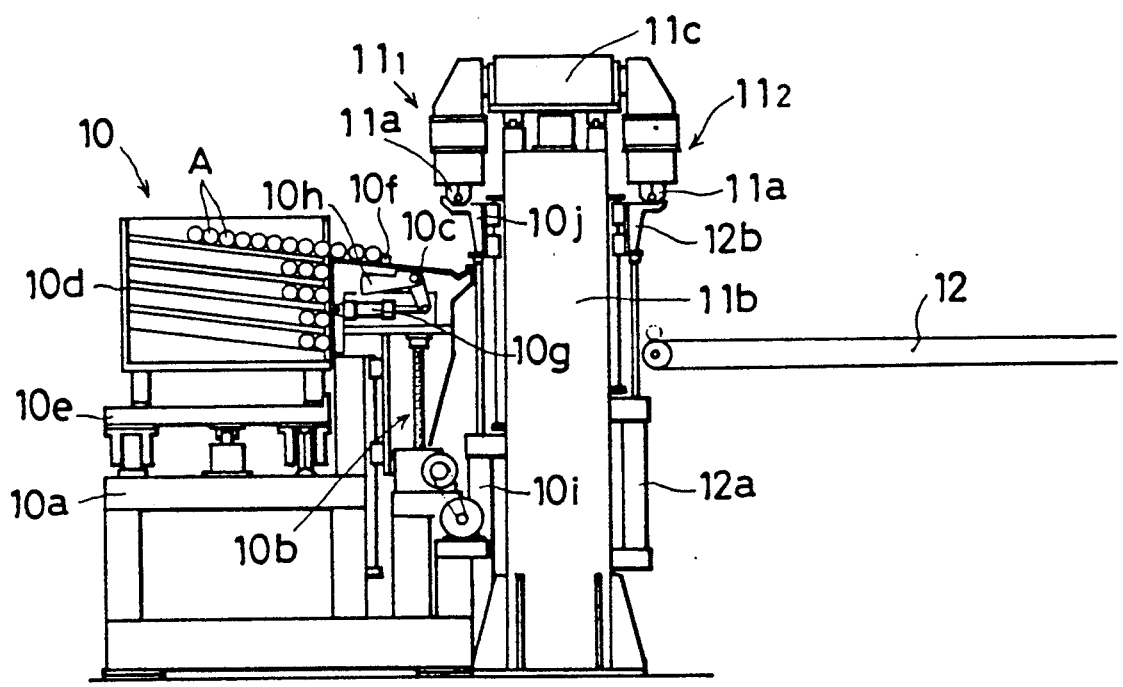
FIG. 11 is an explanatory diagram illustrating feeding of the shafts into the loader device and discharging the shafts from the unloaded device as viewed from the line XI—XI in FIG. 1.

The afore-mentioned supplying device 10, as shown in FIG. 11 is provided on a bed 10a with a chute 10c which is moved upward and downward by a screw-driven type lift mechanism 10b. A magazine 10d in which the driving shafts A are kept in stock in several levels arranged to be one over another is moved by a carriage 10e to and set at the predetermined takeout position adjacent to the tail end portion of the chute 10c. In this condition, the chute 10c is lifted up to the position shown in the drawing. Then, the magazine 10d is opened by opening its side plate facing the chute 10c and allows the driving shafts A in the uppermost level in the magazine 10d to roll out therefrom into the chute 10c. The chute 10c is provided with a stopper 10f and a cutout piece 10h which is operated to swing by a cylinder 10g, so that the driving shafts A are caused by the swing operation of the cutout piece 10h to go over the stopper 10f, one by one, and are delivered to the front end portion of the chute 10c. The driving shaft A is then lifted up by a lifter 10j being operated by a cylinder 10i, and supplied onto the loader device 11₁. As the uppermost level of the stock in the magazine 10d becomes empty of shafts A, the chute 10c is lowered down by one level in order to take out the shafts A from that level next to the uppermost one. This operation is repeated to take out the driving shafts A from all of the levels, from top to bottom in order, in the magazine 10d and supply them to the loader device 11₁. When the magazine 10d becomes empty of the driving shafts A, it is removed out of the position and the next magazine 10d full of the driving shafts A is then set at the takeout position.

Further, a lifter 12b is provided on the side wall of the holder base 11b facing toward the conveyor operated by a cylinder 12a so that the driving shaft A may be transferred onto the conveyor 12 from the unloader device 11₂.

In the assembling stations S3 for the damper weight D, an assembling device 13 for assembling the damper weight D to the driving shaft A from below and a damper weight D supplying device 14 disposed outside thereof are provided.

Figure 12:
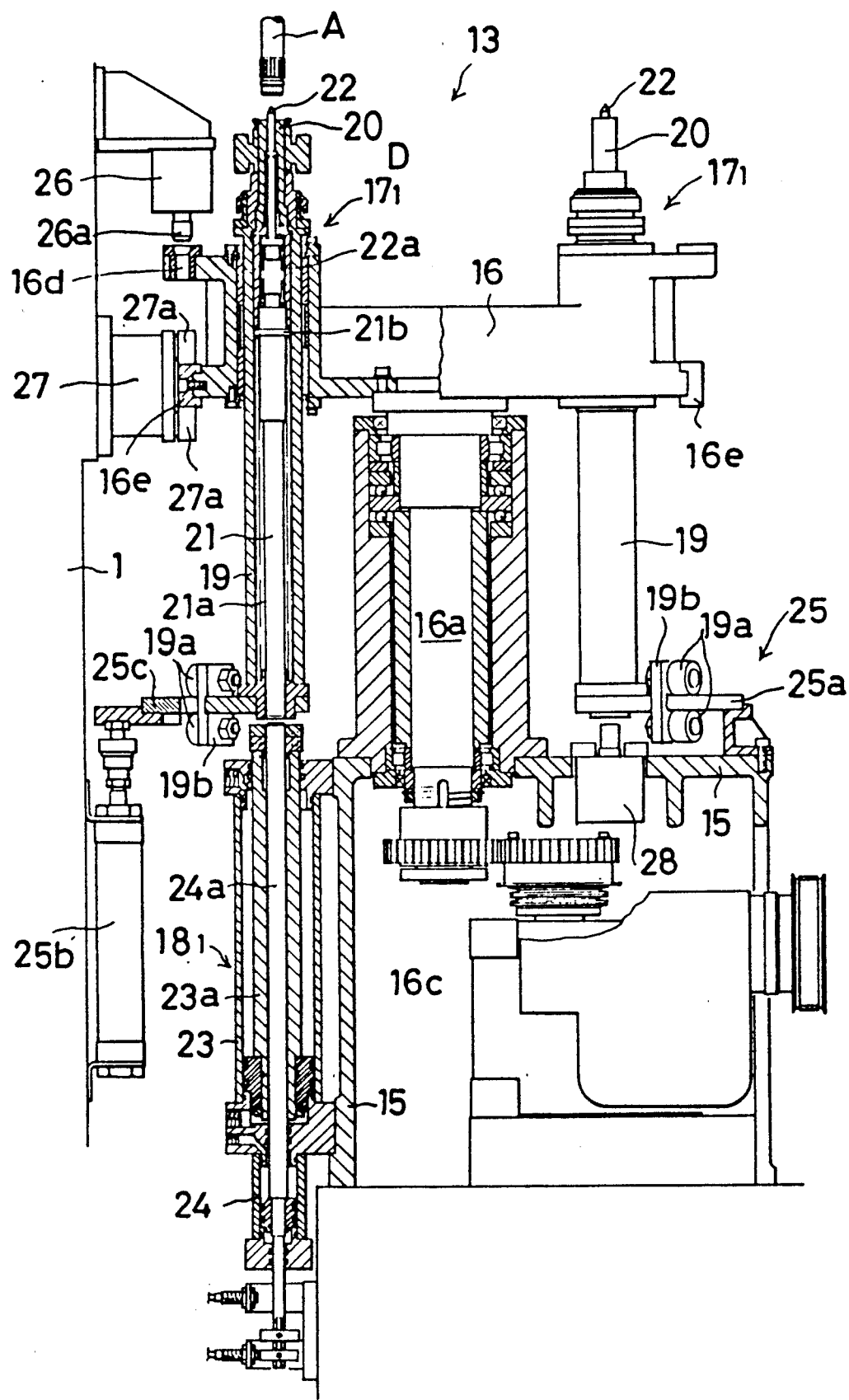
FIG. 12 is a, sectional view of the assembling device provided at the assembling station for the damper weight.
Figure 13:
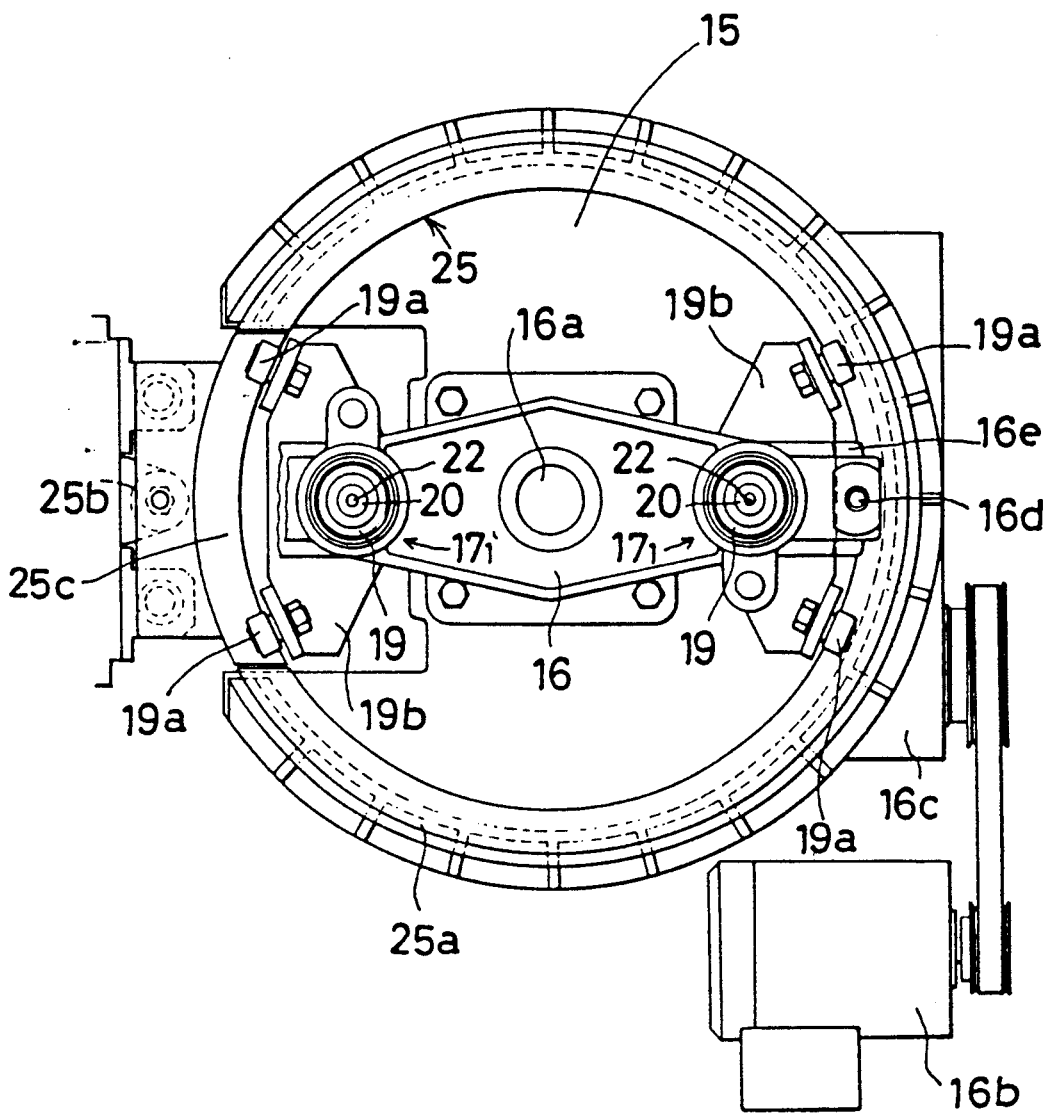
FIG. 13, is a top plan view thereof.

As shown in FIGS. 12 and 13, the assembling device 13 is arranged to comprise a rotary disk 16 pivotally supported by a vertical rotary shaft 16a on a supporting base 15 provided outside of the machine base 1, a pair of assembling jigs 17 disposed on the rotary disk 16 having a phase difference of 180° from each other, a motor 16b operating to index-rotate the rotary disk 16 through a reduction gear 16c for 180° each time the carrier 2 is intermittently moved so that one and the other of the two assembling jigs 17₁, 17₁ are made alternately movable to the inner assembling position right below the driving shaft A held on the carrier 2 and to the outer setting position, and a cylinder device 18₁ for moving the assembling jig provided right below the assembling position.

Each assembling jig 17₁ comprises a tubular jig body 19 inserted through and supported vertically movably by the rotary disk 16, guide shaft 20 which is projectable above the jig body and slidably inserted in the jig body 19, a push rod 21 which has an upper-end flange 21b being urged upward by a spring 21a and contacting the guide shaft 20 from below and which is slidably inserted in the jig body 19, and a center pin 22 which is projectable above the guide shaft 20, urged upward by a spring 22a and inserted slidably in the guide shaft 20.

The cylinder device 181 is of a two-section structure comprising an upper and a lower cylinders 23 and 24. A piston rod 24a of the second cylinder 24 which is the lower one is inserted through a piston rod 23a of the first cylinder 23 which is the upper one. When the assembling jig 17₁ is moved to the assembling position, the piston rod 23a of the first cylinder 23 may face the jig body 119 and the piston rod 24a of the second cylinder 24 may face the push rod 21. In this arrangement, the second cylinder 24 is first operated to move the push rod 21 upward through the piston rod 24a so as to push up the guide shaft 20, together with the jig body 19, to a position where it contacts the lower end surface of the driving shaft A, whereby the center pin 22 is engaged with the center hole in the lower end surface of the driving shaft A for centering. Next, the first cylinder 23 is operated to move the jig body 19 upward through the piston rod 23a so that the damper weight D fitted externally on the guide shaft 20 in advance at the setting position is pushed up by the jig body 19 for assembling the weight D to the driving shaft A.

In addition, the jig body 19 is provided at the lower end thereof with a guide member 19b having a roller 19a and is engaged through the guide member 19b with an annular rail 25 comprising a stationary rail 25a on the supporting base 15 and a movable rail 25c which is on the assembling position side and moved upward and downward by a cylinder 25b. Thus, when the assembling jig 17₁ is moved to the assembling position, the guide member 19c engages with the movable rail 25c. When the damper weight D assembling work is being carried out, the cylinder 25b is set free so as to permit the movable rail 25c to go up following the jig body 19 and, after completion of the assembling work, the contraction movement of the cylinder 25b causes, through the movable rail 25c, the jig body 19 to come down.

In the drawings, a positioning cylinder 26 is provided having a pin 26a which is engageable with a positioning hole 16d formed in the rotary disk 16 near the location of each assembling jig 17₁. It is so arranged that, by operation of cylinder 26, the rotary disk is accurately stopped at the predetermined rotated position in which each assembling jig 17 coincides with the assembling position. Furthermore, a guide block 27 is provided below the cylinder fixedly attached to the machine base 1, and having rollers 27a, 27a disposed to clamp a tongue piece 16e projecting from the rotary disk 16 therebetween from above and below so that the pressure force of the cylinder 26 can be received by the guide block 27. A cylinder 28 is provided to push the push rod 21 of the assembling jig 17 when in the setting position, thereby checking downward movement of the guide shaft 20.

Figure 14:
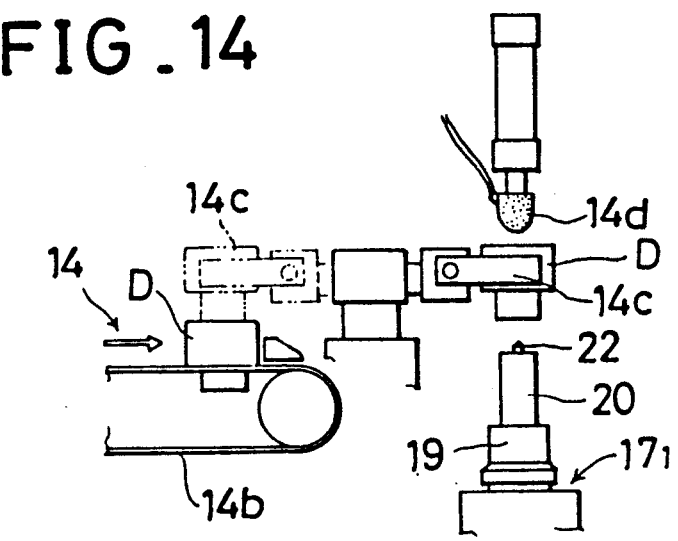
FIG. 14 is a side view of important portions of the damper weight supplying device.

The supplying device 14 is arranged so that the damper weights D are taken out, one by one, from a stocker 14a onto a conveyor 14b by a takeout device (not shown), conveyed to a place near the setting position by the conveyor 14b and, as shown in FIG. 14, set externally fitted onto the guide shaft 20 of the assembling jig 17 present at the setting position by a clamping arm 14c which can move up and down and turn. For this setting operation, a soapy water applying cylinder 14d provided above the setting position is used to apply soapy water to the inner peripheral surface of the damper weight D so as to enable the weight D to be assembled smoothly to the driving shaft A.

In the assembling station S4, an assembling device 29 for assembling from below a rubber boot B7 to one end A1 of the driving shaft A and a rubber boot supplying device 30 located outside of the assembling device 29 are provided.

Figure 15:
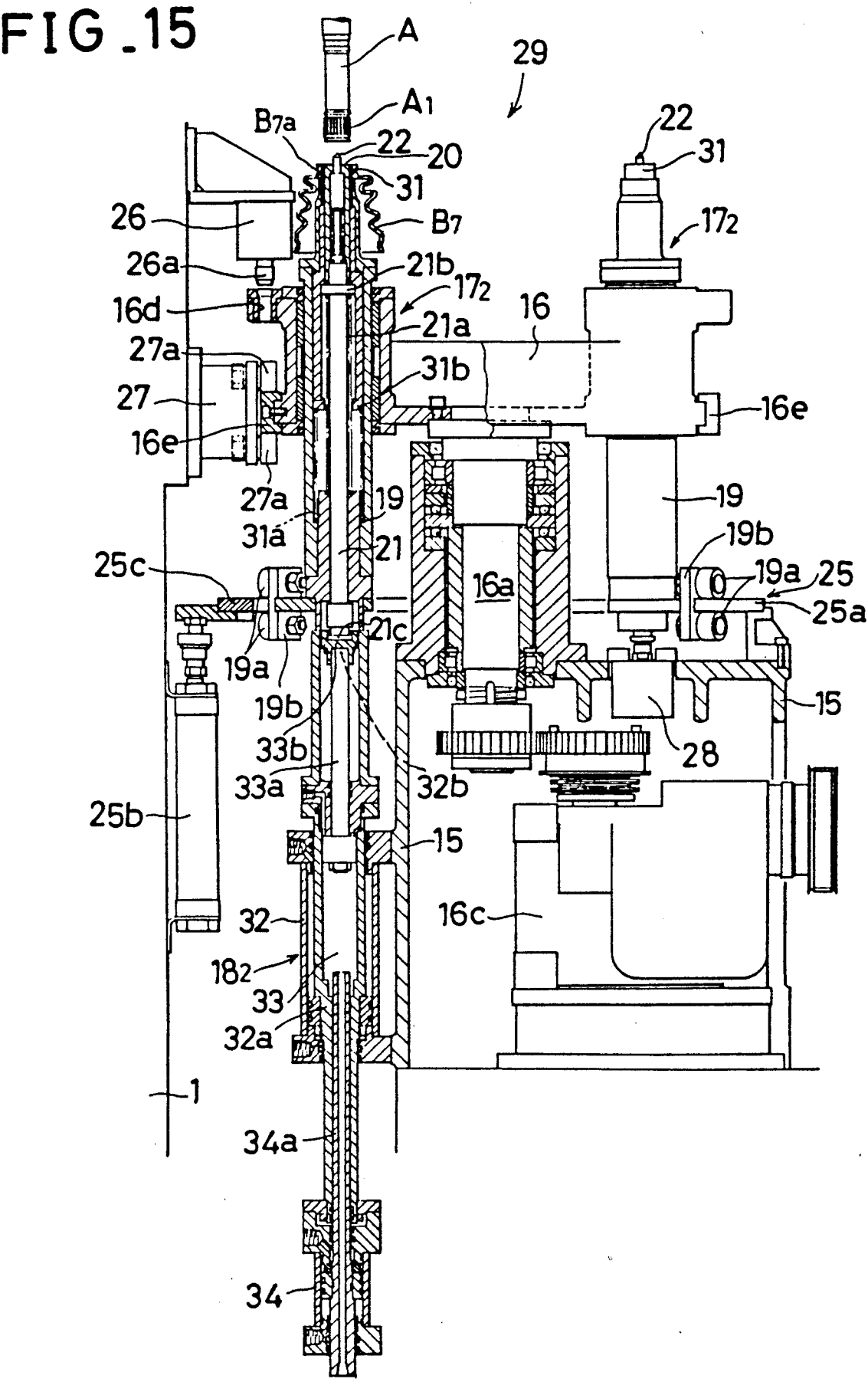
FIG. 15 is a sectional side view of the assembling device provided at the assembling station for the rubber boot.

The assembling device 29 has structural details as shown in FIG. 15 which are substantially the same as those of the
assembling device 13 except for only the assembling jig 17₂ and the cylinder device 18₂ which are different between these two assembling devices 29 and 13. Those component parts common between the two assembling devices above are given the same reference numerals and symbols, so that their explanations are omitted here.

The assembling jig 17₂ is arranged such that a guide sleeve 31 which may be projected above the jig body 19 and which is urged upward by spring 31a is slidably inserted into the jig body 19. A guide shaft 20 is inserted in the sleeve 31, and the push rod 21 is put in contact with the guide sleeve 31 and the guide shaft 20 from underneath. The cylinder device 18₂ is arranged to comprise a first cylinder 32 fixedly mounted on the supporting base 15, a second cylinder 33 formed in the intermediate portion of a piston rod 32a of the first cylinder 32, and a third cylinder 34 attached to the lower end of the piston rod 32a. Thus, when the assembling jig 17₂ is moved to the assembling position, the upper end of the piston rod 32a of the first cylinder 32 comes to face the lower end of the jig body 19 and at the same time a connector 21c attached to the lower end of the push rod 21 becomes engaged with an engagement piece 33b provided on the upper end of the piston rod 33a of the second cylinder 33. The engagement piece 33b is formed in such a shape that can allow the connector 21c to be inserted thereinto and pulled off therefrom in the turning direction of the assembling jig 17₂. In addition, notches 32b are formed on both sides on the upper end periphery of the piston rod 32a for passing the connector 21c therethrough. In the drawing, a stopper 31b is provided on the lower end of the guide sleeve 31.

The guide sleeve 31 is shaped to have one end A1 of the driving shaft A inserted slidably thereinto up to the end of an insertion portion of a diametrally smaller end B7a of the rubber boot B7. The rubber boot 7 is set onto the assembling jig 17₂ when in the setting position having the diametrally smaller end portion B7a thereof externally fitted onto the guide sleeve 31 as will be discussed later in more detail. Then, after the assembling jig 17₂ is moved to the assembling position as shown in FIG. 15, the piston rod 32a of the first cylinder 32 is moved upward for assembling the rubber boot B7 to the guide sleeve 31.

The foregoing assembling process is described more in detail as follows. Supplying of the fluid into the lower chamber of the second cylinder 33 through the piston rod 34a of the third cylinder 34 is stopped and while the piston rod 34a is kept in the upward moving position by supplying fluid into the lower chamber of the third cylinder 34, the piston rod 32a of the first cylinder 32 is moved upward. According to this arrangement, the jig body 19 is pushed up by the piston rod 32a and urged by the respective springs 31a, 21a, the guide sleeve 31, the push rod 21 and the guide shaft 20 move upward following the upward movement of the jig body 19. Thus, first of all, the guide shaft 20 comes in contact with the lower end surface of the driving shaft A and centering of the driving shaft A is made by the center pin 22 provided on the guide shaft 20. Thereafter, compressing the spring 21a, the jig body 19 and the guide sleeve 31 move upward as one body so as to have the guide sleeve 31 fitted externally onto the one end A1 of the driving shaft A.

Figure 16A:
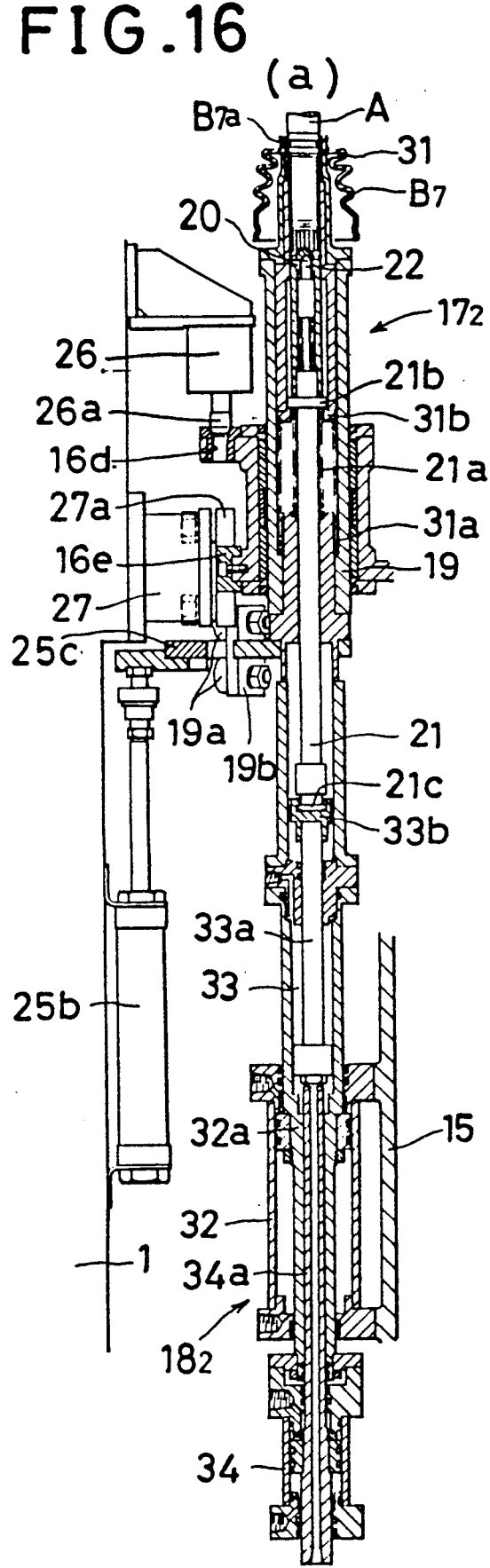
FIGS. 16(a) and 16(b) are explanatory diagrams of operation of the assembling device.

Now, as shown in FIG. 16(a), when the upper end portion of the guide sleeve 31 is moved upward tp tje bppt omsertopm portion of the driving shaft A, the piston rod 32a reaches the stroke end and the upward movement of the jig body 19 and the guide sleeve 31 is stopped. At this time, the stopper 31b on the lower end of the guide sleeve 31 comes in contact with the flange 21b on the upper end of the push rod 21, and the piston rod 34a of the third cylinder 34 with the lower end of the piston rod 33a of the second cylinder 33.

Figure 16B:
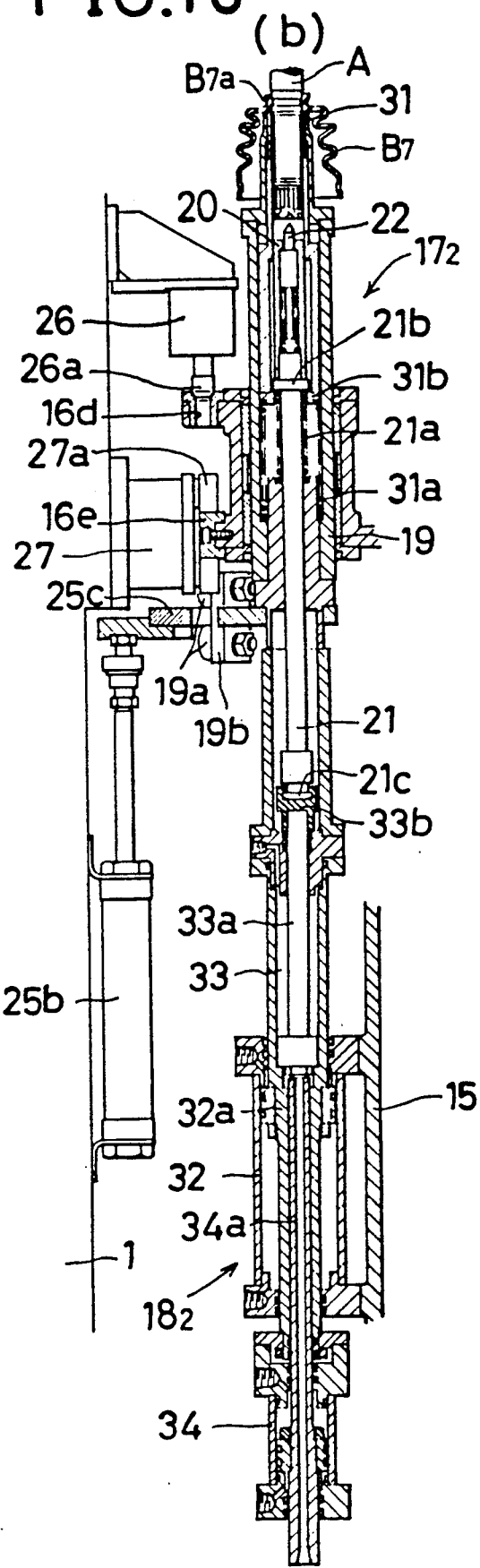

Next, supplying fluid into the upper chamber of the second cylinder 33 and discharging fluid from the lower chamber of the third cylinder 34 are performed. As shown in FIG. 16(b), with this operation, the piston rod 33a of the second cylinder 33 moves downward and the guide sleeve 31 is pulled down through the push rod 21 into the jig body 19. Thus, the guide sleeve 31 is pulled off from the diametrally smaller end portion B7a of the rubber boot B7 seated on the jig body 19 and the diametrally smaller end portion B7a is then fitted, by own elastic force, accurately onto the boot insertion portion of the driving shaft A.

Thereafter, the piston rod 32a is moved downward and at the same time the jig body 19 is moved downward by the movable rail 25c by operation of the cylinder 25b, thereby completing the assembling work.

Figure 17:
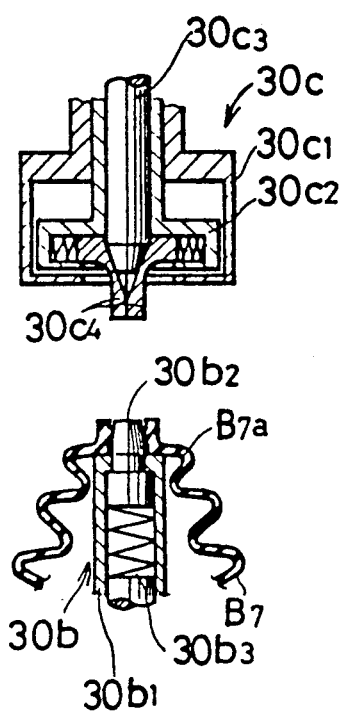
FIG. 17 is a sectional side view of important portions of the rubber boot supplying device.

The foregoing supplying device 30 comprises a delivery device (not shown), which delivers the rubber boots B7, one by one, from a stocker 30a to the delivery position located outside of the setting position and additionally, as shown in FIG. 17, includes a boot holder device 30b receiving the boot B7 delivered to the delivery position, and a boot setting device 30c which receives the rubber boot B7 from the holder device 30b and sets it on the assembling jig 17₂ found at the setting position.

Figure 18:
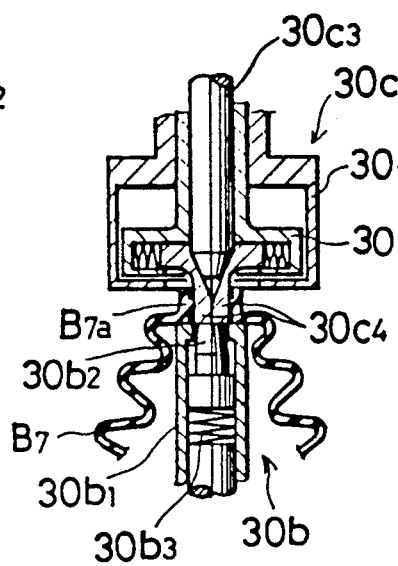
FIGS. 18(a) through 18(d) are explanatory diagrams of operation of the boot, supplying device.
Figure 18:
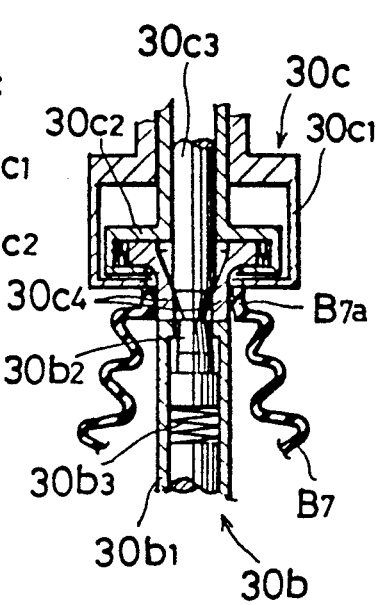
Figure 18C:
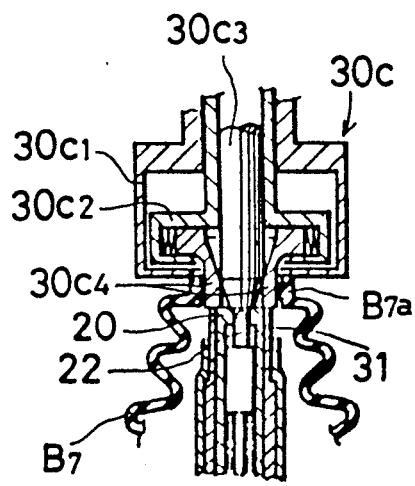
Figure 18D:
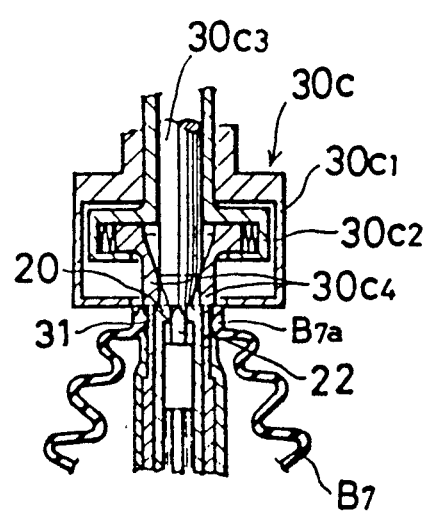

The holder device 30b comprises a tubular body 30b₁ for supporting the diametrally smaller portion B7a and a guide pin 30b₂ which is insertable into the diametrally smaller portion B7a and provided on the upper portion of the tubular body 30b₁ movable downward against a spring 30b₃. The boot setting device 30c comprises a device body 30c₁ which is movable back and forth and up and down, a vertically movable frame 30c₂ provided in the device body 30c₁, a push rod 30c₃, and a pair of pawls 30c₄, 30c₄ which are held on the movable frame 30c₂ and opened and closed by the push rod 30c₃. After the device body 30c₁ is moved back to the delivery position, the device body 30c₁ is moved downward with the two pawls 30c₄, 30c₄ closed as shown in FIG. 18(a), so that both the pawls 30c₄, 30c₄ inserted into the diametrally smaller portion B7a held on the tubular body 30b₁ of the boot holder device 30b while pushing down the guide pin 30b₂. Next, as shown in FIG. 18(b), both pawls 30c₄, 30c₄ are opened to expand diametrally the diametrally smaller portion B7a and, in this condition, the device body 30c₁ is moved upward and forward to the setting position and thereafter moved downward to make both of the pawls 30c₄, 30c₄ hit against the upper end of the guide sleeve 31 of the assembling jig 17₂ found at the setting position, as shown in FIG. 18(c). The device body 30c₁ is pushed down further from the above position so that the diametrally smaller portion B7a remaining in the diametrally expanded state can be fitted externally onto the guide sleeve 31, as shown in FIG. 18(d).

In the assembling station S6, an assembling device 35 for assembling the stopper ring B6 from under the one end A1 of the driving shaft A to the one end A1, and a supplying device 36 for supplying the stopper ring B6 are provided.

Figure 19:
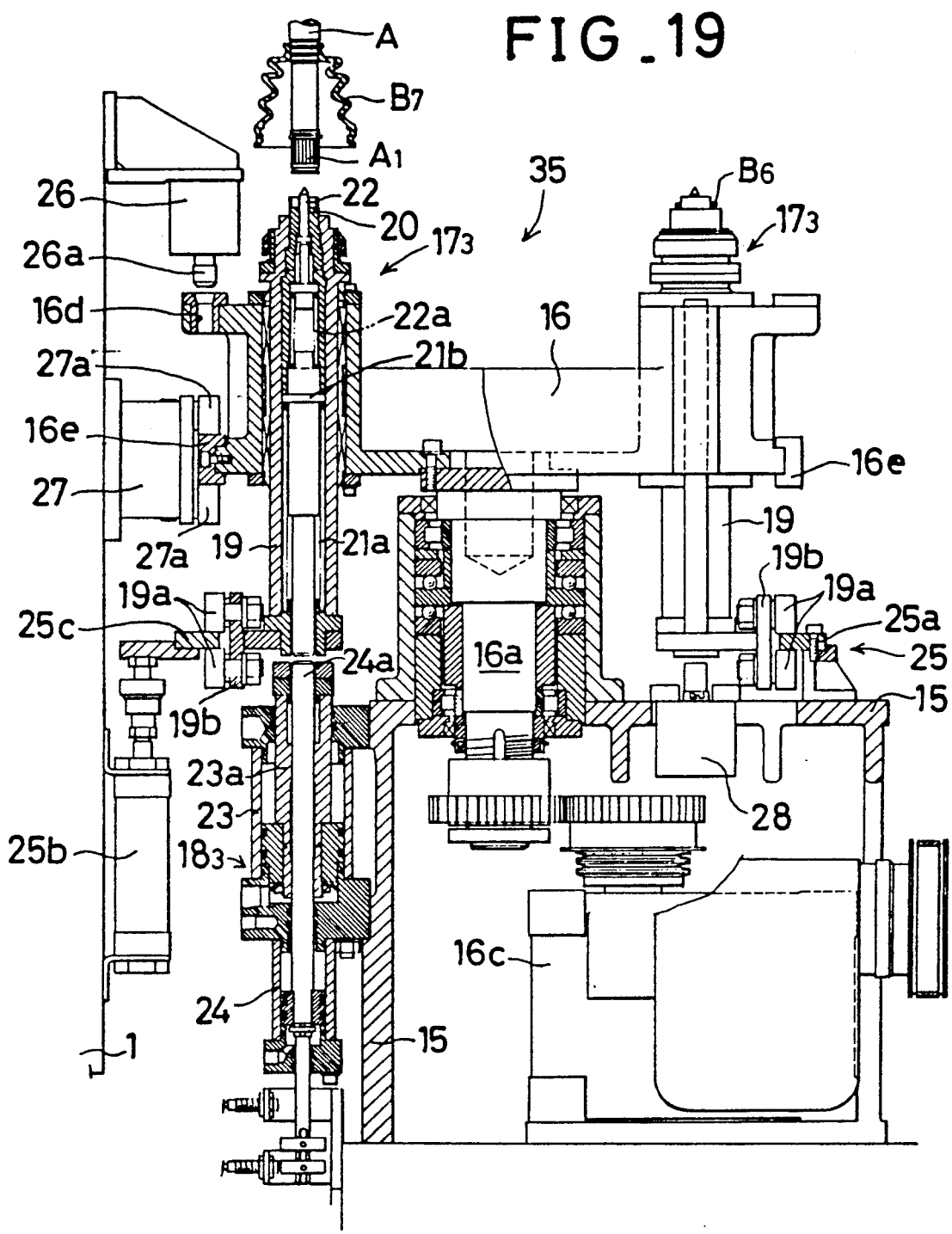
FIG. 19 is a sectional side view of the assembling device provided at the assembling station for the stopper ring.
Figure 20:
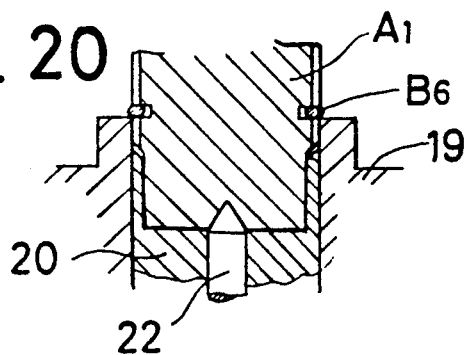
FIG. 20 is an enlarged sectional side view of important portions thereof with the stopper ring assembled thereto.

Details of the assembling device 35 are as shown in FIG. 19 and only the difference it has as compared with the damper weight D assembling device 13 is that, as clearly shown in FIG. 20, the upper end of the guide shaft 20 of the assembling jig 17₃ is cup-shaped so as to be able to have the diametrally smaller end portion of the one end A1 of the driving shaft A fitted thereinto. As operation of the lower or second cylinder 24 of the cylinder device 18₃ pushes up the guide shaft 20 through the push rod 21 to have the diametrally smaller end portion of the one end A1 of the driving shaft A fitted into the upper end portion of the guide shaft 20, a stepped difference present between the diametrally smaller end portion and a portion thereabove where the ring groove is formed on the driving shaft A is levelled off by the guide shaft 20, so that when the jig body 19 is pushed upward with operation of the upper of first cylinder 23, the stopper ring B6 fitted externally and set on the guide shaft 20 in advance is pushed upward smoothly without being caught in the stepped difference and thus smoothly fitted in the ring groove.

The supplying device 36 is arranged such that the stopper ring B6 supplied from a part feeder 36a (refer to FIG. 1) may be fitted externally onto the guide shaft 20 of the assembling jig $17_3$ found at the setting position while in a state in which it is diametrally expanded by a setting device (not shown).

On the assembling station S7, an assembling device 37 for assembling the joint body B5 to on end A1 of the driving shaft A from therebelow, and a supplying device 38 for feeding the joint body B5 are provided.

Figure 21:
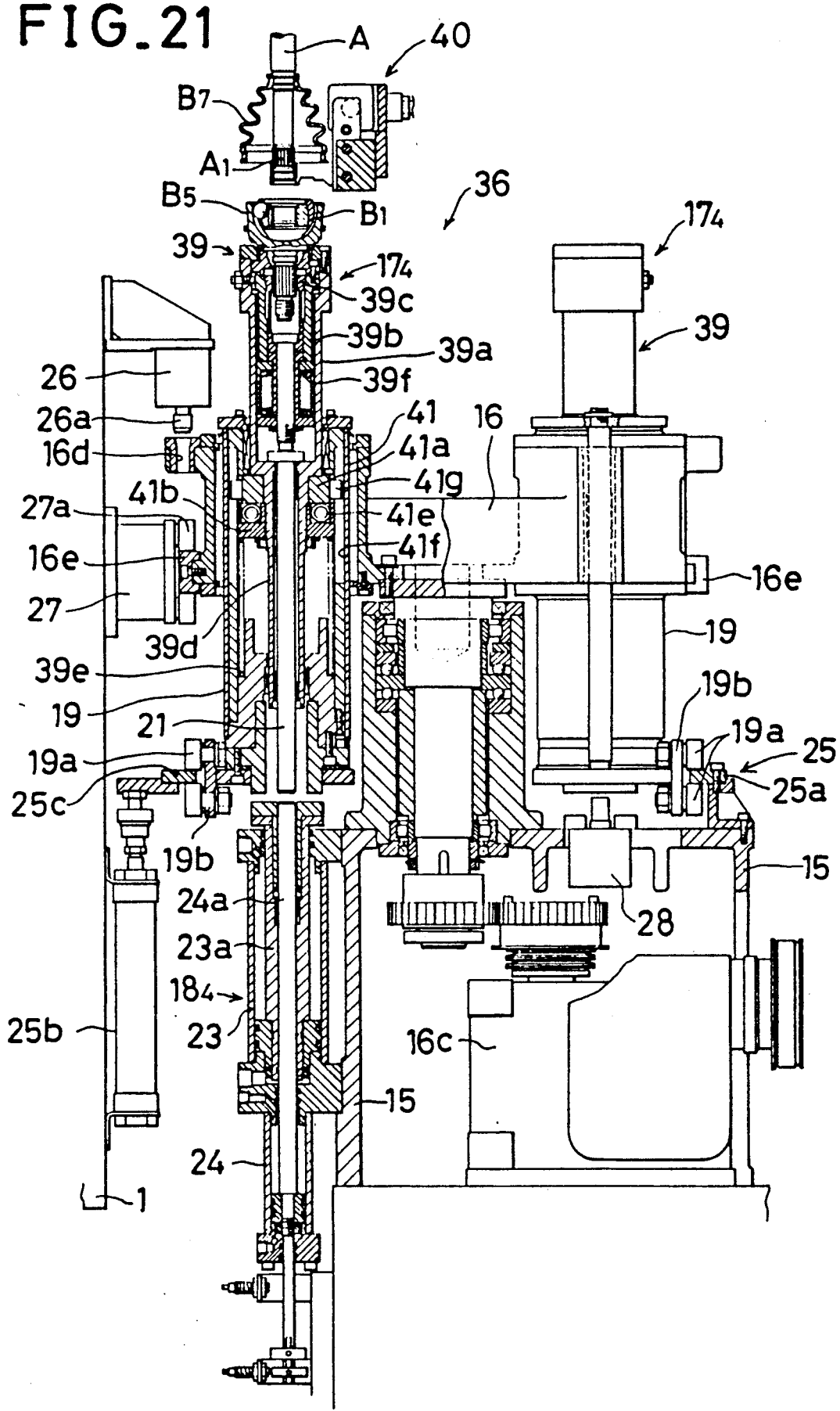
FIG. 21 is a sectional side view of the assembling device provided at the assembling station for the joint body.

Details of the assembling device 37 are as shown in FIG. 21 and the differences it has as compared with the previously mentioned assembling device 13 include that, in place of the foregoing guide shaft 20, a collet chuck 39 is provided on the jig body 19 of the assembling jig $17_4$ for clamping the joint body B5 and that a guide device 40 is provided above the rotary disk 16 as will be described later in more detail.

The collet chuck 39 comprises an outer sleeve 39a, an inner sleeve 39b, and a collet 39c which holds the joint body B5 at the shank of the outer member B1 and is fitted internally to the outer sleeve 39a through the inner sleeve 39b. A hollow shaft 39d extending downward from the outer sleeve 39a is inserted into the jig body 19 so as to have the collet chuck 39 supported on the jig body 19 to be downwardly movable against a spring 39e and turnable. Additionally, the push rod 21 is inserted through the hollow shaft 39d so that, with the upward movement of the rod 21, the collet 39c may be pushed upward against a coned disc spring 39f urging the collet 39c downward toward its closing side and thereby opened. When the jig body 19 is moved upward with respect to the collet chuck 39 while compressing the foregoing spring 39e, the collet chuck 39 is turned through a cam mechanism 41.

Figure 22:
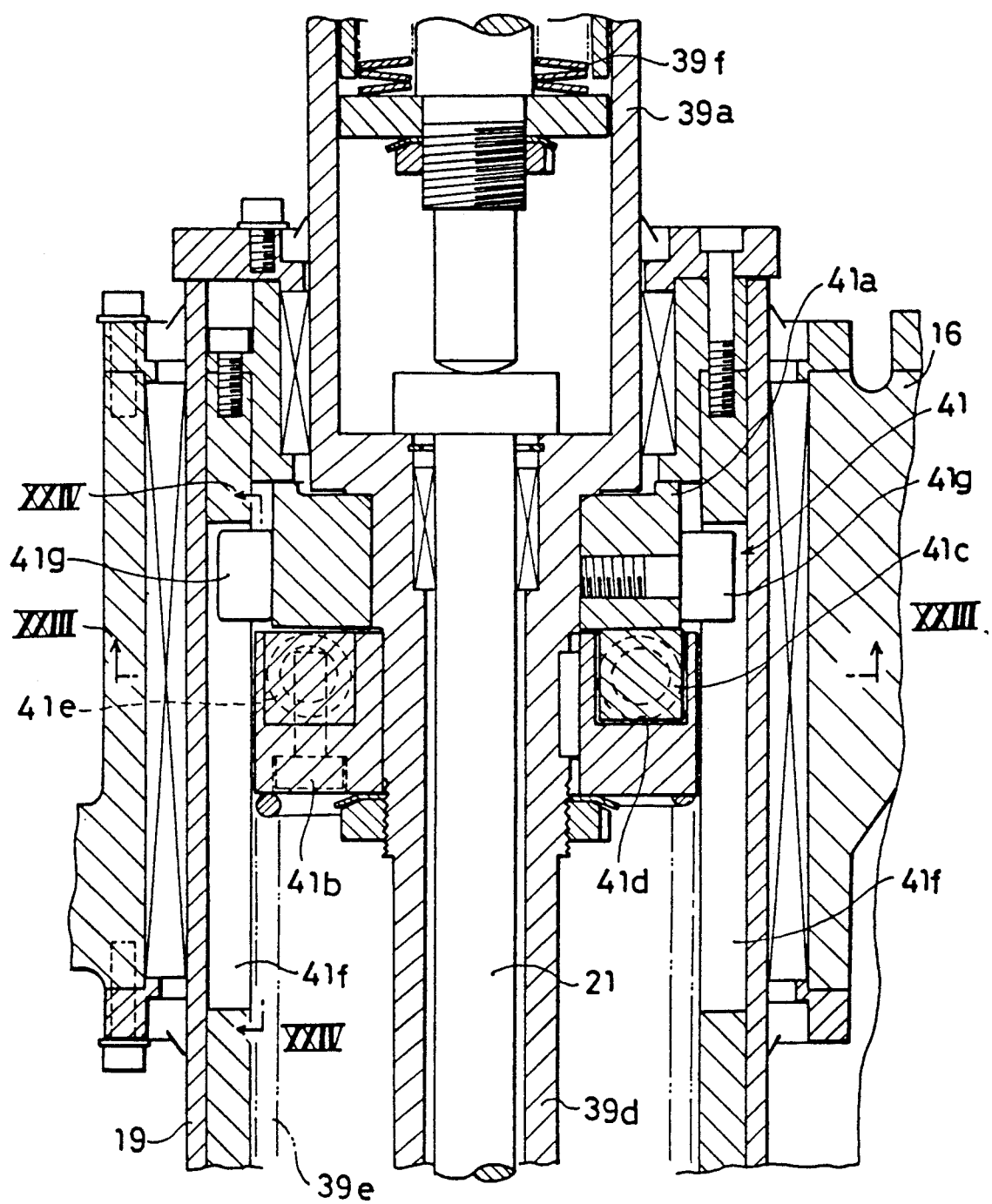
FIG. 22 is an enlarged sectional side view of important portions thereof.
Figure 23:
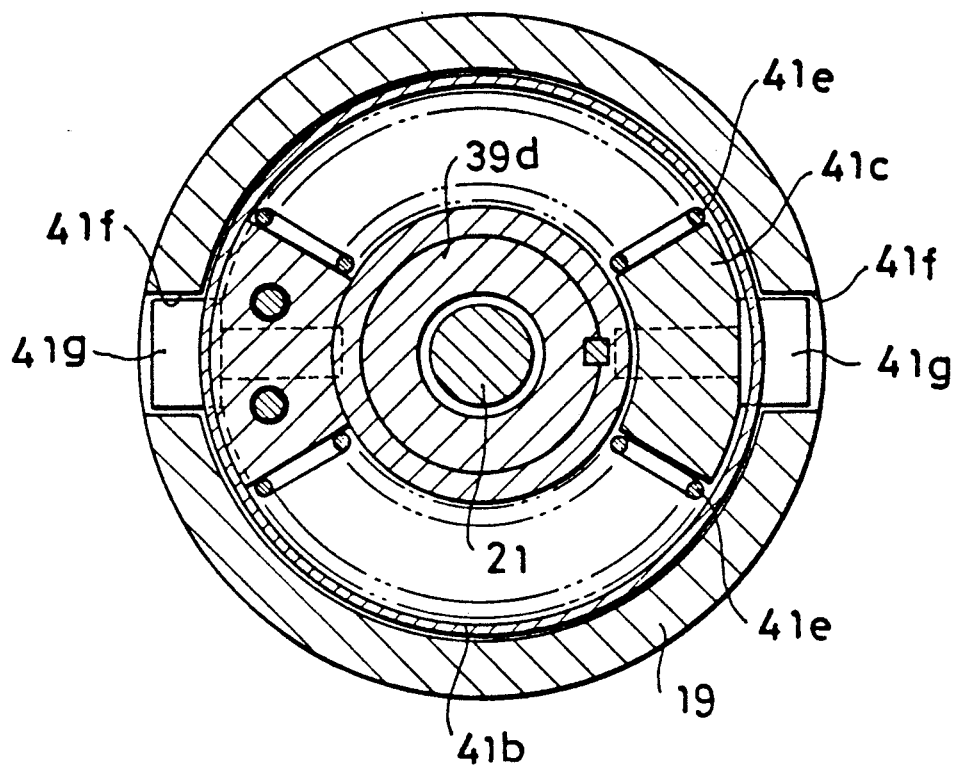
FIG. 23 is a sectional view taken along the line XXIII—XXIII in FIG. 22.
Figure 24:
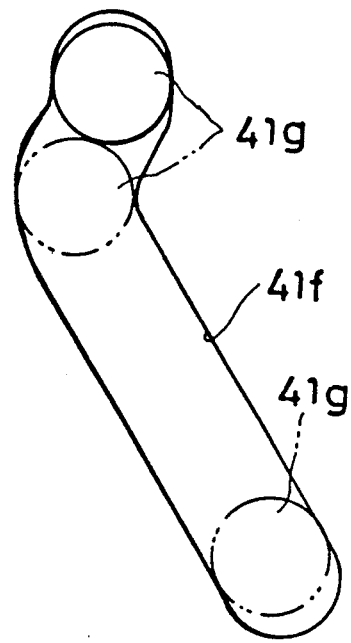
FIG. 24 is a diagram showing the shape of the cam groove as viewed from the line XXIV—XXIV in FIG. 22.

Details for the cam mechanism are as shown in FIGS. 22 through 24. It is arranged as follows: On the outer periphery of the hollow shaft 39d, a first ring 41a which is turnable with respect to the hollow shaft 39d and a second ring 41b located below the first ring 41a and fixedly attached to the hollow shaft 39d are provided. A circular arc-shaped groove 41d is formed in the second ring 41b for receiving therein a projection 41c formed on the underside surface of the first ring 41a. A pair of springs 41e, 41e are housed in the arc-shaped groove 41d clamping the projection 41c from both sides along the peripheral direction. Furthermore, cam grooves 41f, 41f as shown in FIG. 24 are formed on both sides on the periphery of the jig body 19 so that rollers 41g, 41g, attached to both sides on the periphery of the first ring 41a are put in engagement therewith. Thus, according to the upward movement of the jig body 39 with respect to the collet chuck 39, the cam grooves 41f moves upward to turn the first ring 41a by the rollers 41g riding in the cam grooves 41f, 41f. This in turn causes the second ring 41b to be turned by the urging of the springs 41e and, together therewith, the collet chuck 39 comes to turn.

Figure 25:
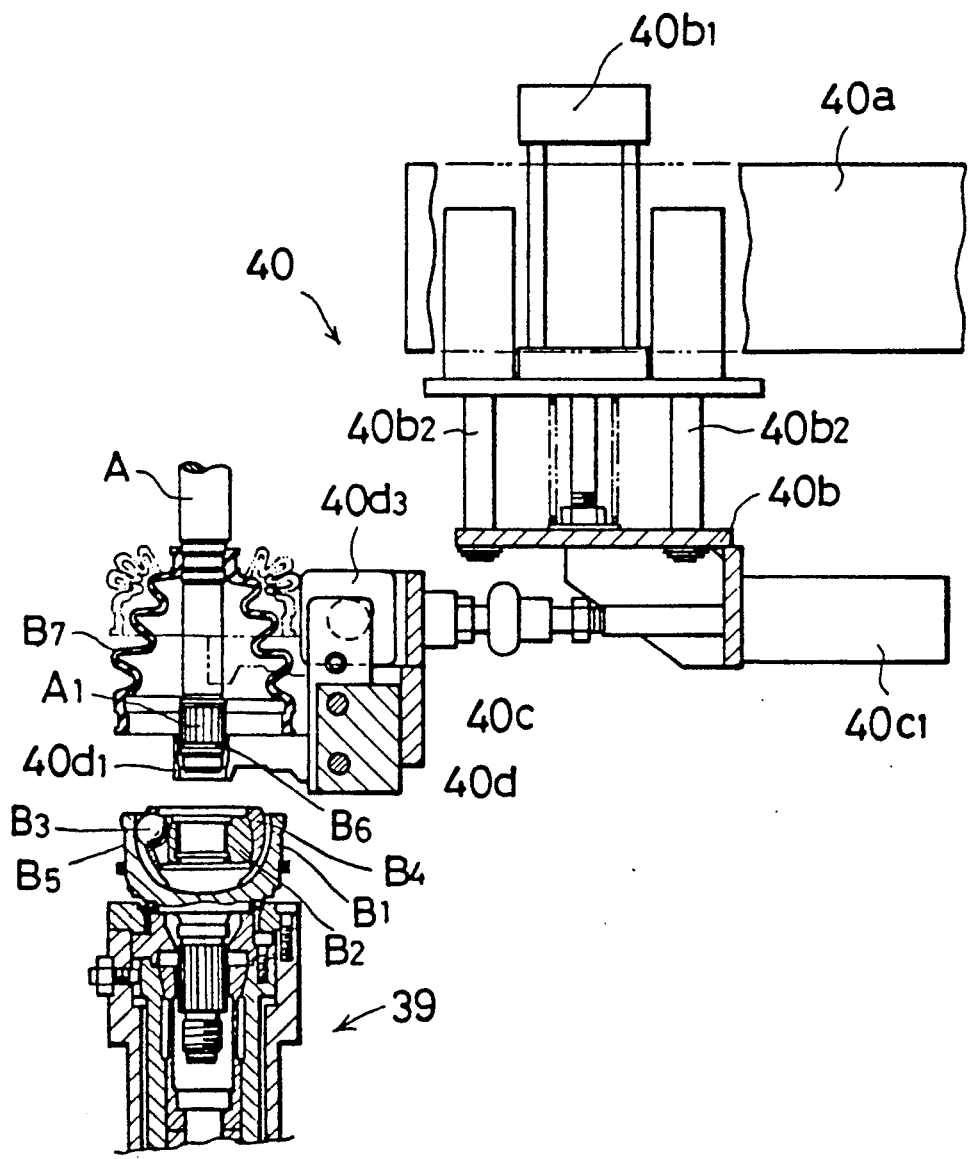
FIG. 25 is a sectional side view of the guide device provided on this assembling apparatus.
Figure 26:
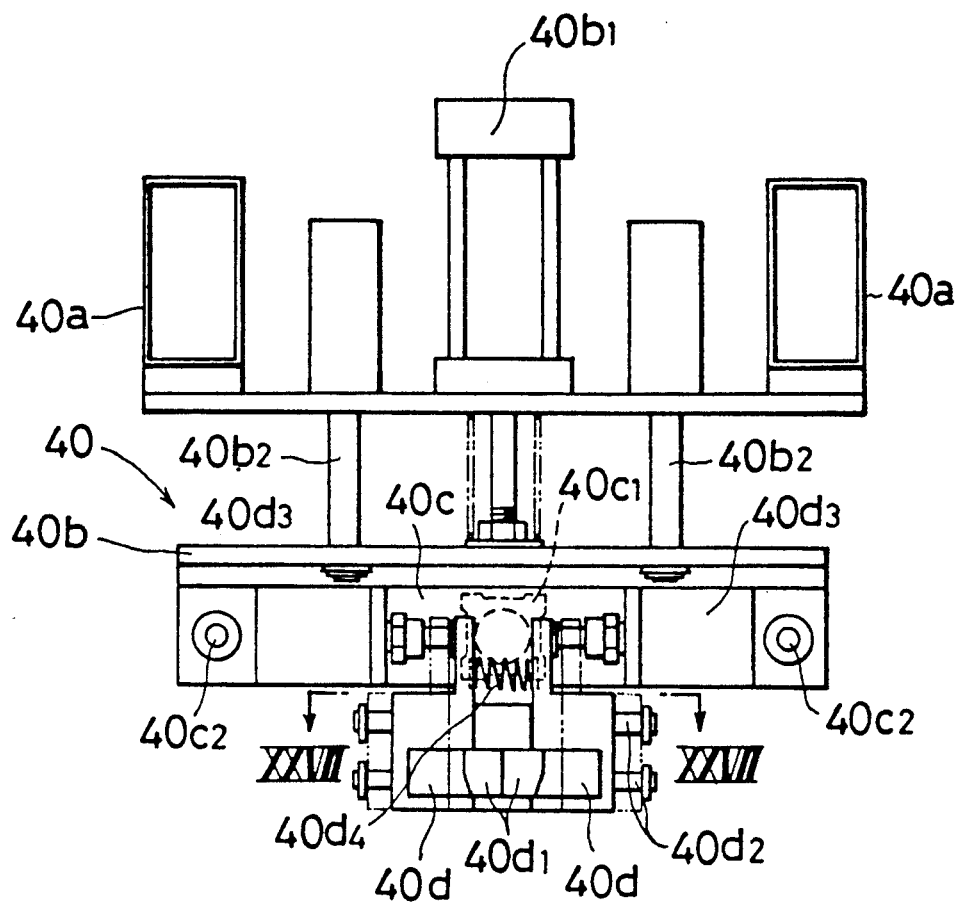
FIG. 26 is a front view thereof.
Figure 27:
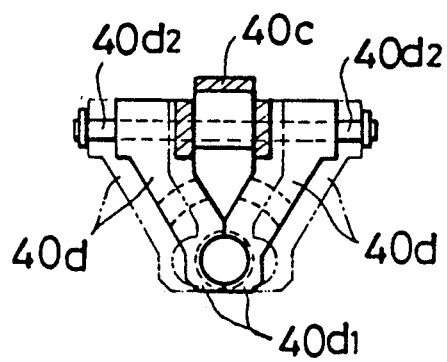
FIG. 27 is a sectional plan view taken along the line XXVII—XXVII in FIG. 26.

Details of the foregoing guide device 40 are as shown in FIGS. 25 through 27. It is arranged as follows. A lift frame 40b is suspended from a stationary frame 40a provided on a location above the rotary disk 16 and is moved upward and downward along guide bars $40b_2$ by a cylinder $40b_1$. A movable frame 40c is provided on the lift frame 40b that is moved back and forth along a guide bar $40c_2$ by a cylinder 40c. A pair of clamp arms 40d, 40d each having formed on the top end thereof a sectionally substantially semicircular trough-like guide portion $40d_1$ for embracing therein the one end A1 of the driving shaft A are supported on the movable frame 40c and are freely opened and closed laterally through the guide bars $40d_2$, $40d_2$. With operation of a pair of cylinders $40d_3$, $40d_3$ attached to the movable frame 40c, both of the clamp arms 40d, 40d are caused to close against the action of an intermediate spring $40d_4$.

For assembling the joint body B5, first of all, the lift frame 40b of the guide device 40 is moved downward and at the same time the movable frame 40c is moved forward to close both clamp arms 40d, 40d.

Then, the one end A1 of the driving shaft A is held between the guide portions $40d_1$ $40d_1$ of both arms 40d, 40d by embracing therebetween the one end A1 portion extending from the lower end thereof to the part in which the ring groove is formed. With this operation, centering of the driving shaft A is carried out and at the same time the stopper ring B6 assembled at the preceding station S6 is squeezed into the ring groove so as not to jut out therefrom. Thus, when the inner peripheral splines are caused to pass the ring groove by the raising of the joint body B5 which will be described later, possible breakage of the stopper ring by the splines can be prevented.

Next, the jig body 19 of the assembling jig $17_4$ positioned at the assembling position is moved upward by operation of the upper or first cylinder 23 of the cylinder device $18_4$. With this operation, the collet chuck 39 is also moved upward and the joint body B5 held by the collet chuck 39 in advance at the setting position is thus lifted so that, first of all, the upper end surface of the inner part B2 comes in contact with the lower ends of the guide portions $40d_1$, $40d_1$. In this manner, the posture of the inner member B2 is thus corrected so as to make the upper surface thereof level. Thereafter, the joint body B5 is, while pushing up the clamp arms 40d, 40d, moved up to a position where the inner peripheral splines of the inner member B2 start to engage with the outer peripheral splines of the one end A1 of the driving shaft A. In this operation, if it is not in such a phase that both sets of splines are allowed to engage each other, any further lift or upward movement of the joint body B5 is checked by interference with each other of the splines and thereafter the jig body 19 moves upward while compressing the spring 39e. With this upward movement, the collet chuck 39 is caused to turn through the engagement of the rollers 41g, 41g with the cam grooves 41f, the first ring 41a, the spring 41e and the second ring 41b. This turning movement causes the joint body B5 to turn as well and when it comes to such a phase that the splines can engage each other, the joint body B5 is pushed upward by the spring force derived from the spring 39e, so that the inner meember B2 becomes spline engaged with the one end A1 of the driving shaft A while the stopper ring B6 becomes engaged with the ring groove on the inner periphery of the inner member B2, thus assembling the joint body B5 to the one end A1 of the driving shaft A.

Next, the lift frame 40b is moved upward by the cylinder $40b_1$ until the uppermost raised position is reached and thereafter the clamp arms 40d, 40d are opened to move back the movable frame 40c. Further, with operation of the lower or second cylinder 24 of the cylinder device $18_4$, the push rod 21 is pushed upward to open the collet chuck 39 and thereafter the jig body 19 together with the chuck 39 is moved downward by the movable rail 25c by operation of the cylinder 25b, thereby completing the assembling work.

The supplying device 38 comprises, as shown in FIG. 1, a conveyor 38a for conveying the joint body B5 assembled in a separate assembling process, a clamping device 38b for clamping the joint body B5 with the clamping device being reciprocatable between the assembling device 37 side and the conveyor 38a side and movable upward and downward, and a setting device 38c for setting the outer ring B8. The setting device is interposed between the conveyor 38a and the assembling device 37. The setting device 38c is provided with a cutout mechanism $38c_2$ which cuts out one by one the outer ring B8 from a magazine (not shown) and sets it on a setting table $38c_1$. After clamping the joint body B5 with the clamping device 38b on the conveyor 38a, the clamping device 38b is moved to a position right over the setting table $38c_1$ and then lowered so that the outer member B1 of the joint body B5 clamped by the clamping device 38b is inserted under pressure into the outer ring B8 on the setting table $38c_1$ for assembling of the outer ring B8. Next, the clamping device 38b is moved to a position right over the assembling jig $17_4$ found at the setting position of the assembling device 37 and then lowered so as to insert the joint body B5 into the collet chuck 39 of the assembling jig $17_4$ and set it therein.

For inserting the joint body B5 into the collet chuck 39 and setting it therein as above, the push rod 21 is pushed by the cylinder 28 on the supporting base 15 shown in FIG. 21 in order to open the collet chuck 39.

Figure 28:
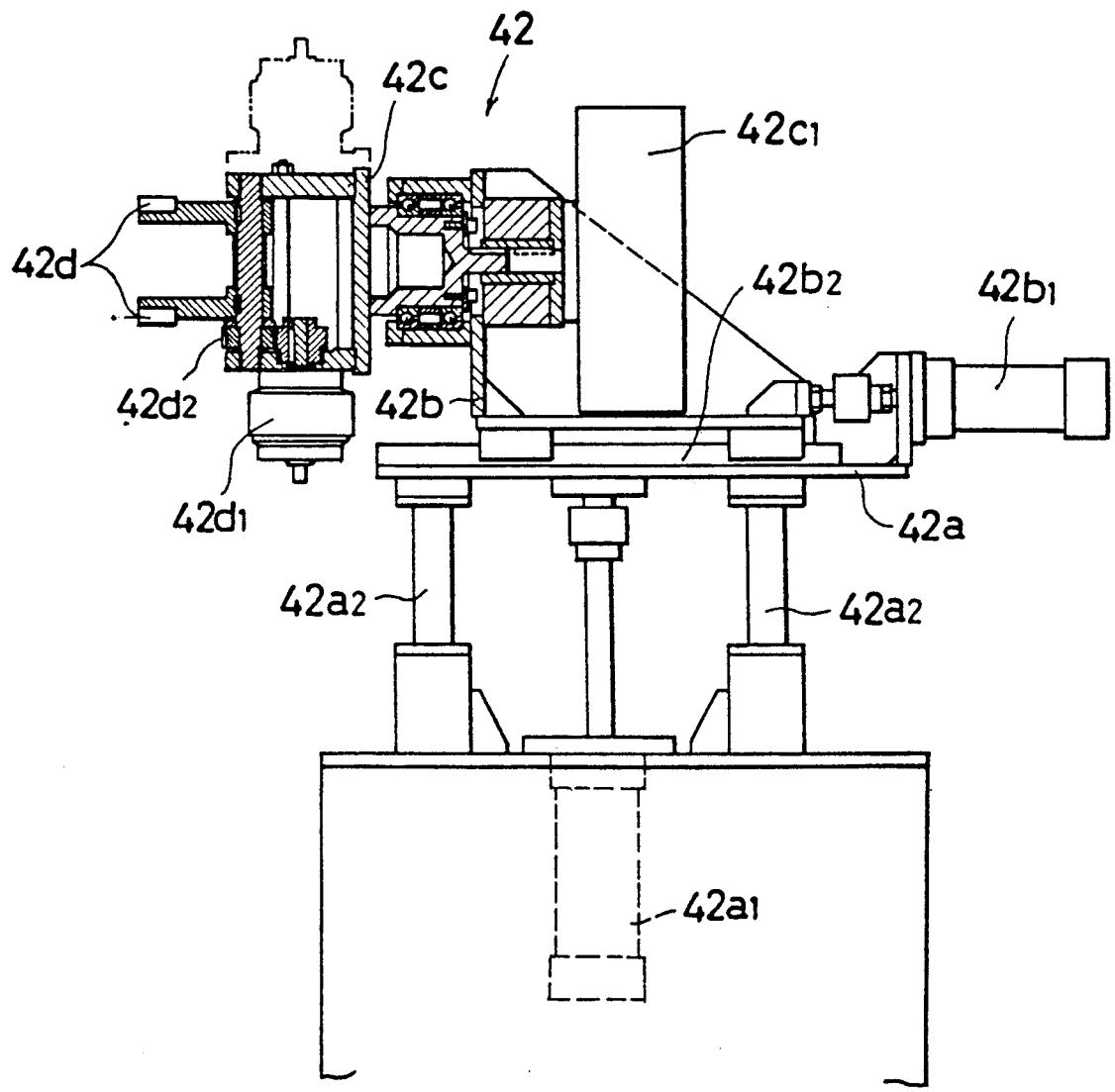
FIG. 28 is a sectional side view of the reversing device provided at the reversing station.
Figure 29:
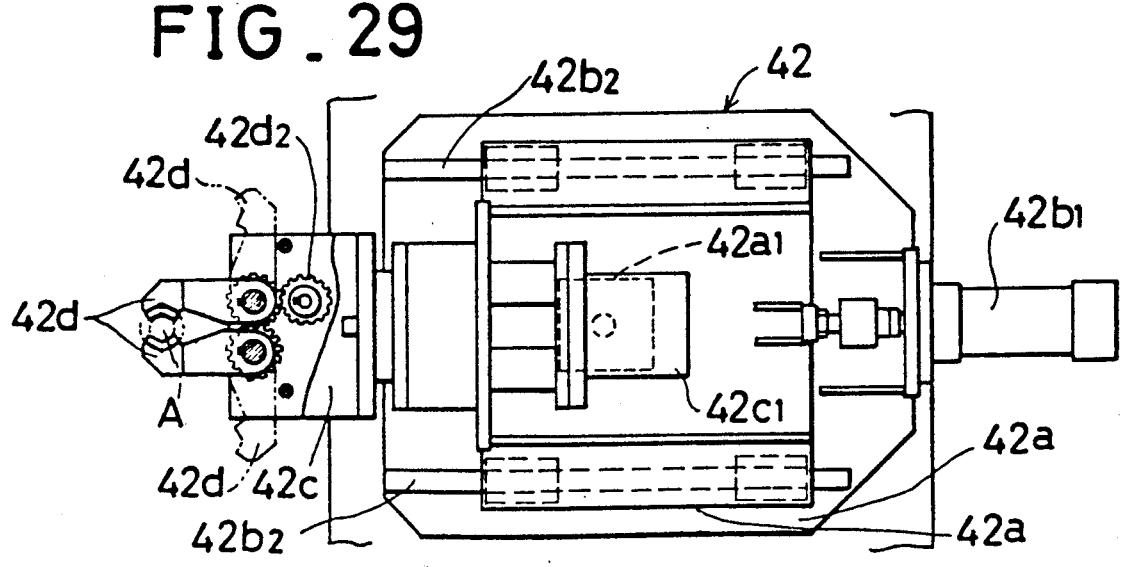
FIG. 29 is a plan view thereof.

In the reversing station S9, a reversing device 42 is provided as shown in FIGS. 28 and 29. Using the reversing device 42, the driving shaft A is removed from the carrier 2 and reversed upside down so as to make the other end A2 turned to face downward for resetting of the shaft A on the carrier 2.

More in detail, the reversing device 42 comprises a lift table 42a which is moved upward and downward by a cylinder $42a_1$ along guide bars $42a_2$; a movable frame 42b which is provided on the lift table 42a and moved toward and away from the carrier 2 by a cylinder 42b along guide rails $42b_2$; a rotary frame 42c which is provided on the movable frame 42b and reversibly operated by a rotary actuator $42c_1$ to rotate about a horizontal axis; and a pair of upper and lower clamp arms 42d, 42d which are disposed on the rotary frame 42c and opened and closed through a gear train $42d_2$ by a motor $42d_1$ mounted on the rotary frame $42d_2$. The lift table 42a is preset to an appropriate height of elevation according to the type of the driving shaft A. As the driving shaft A is reversed in its rotating direction, the movable frame 42b is first moved forward for the clamp arms 42d, 42d to clamp the driving shaft A which is held on the carrier 2 in such a posture that the one end A1 thereof is down. Next, the movable frame 42b is moved back to reverse the rotary frame 42c and thereafter the movable frame 42b is moved forward again to reset on the carrier 2 the driving shaft A in such a posture that the other end A2 thereof may be down.

In the assembling station S10, an assembling device 43 for assembling from below a rubber boot C6 to the other end A2 of the driving shaft A and a rubber boot supplying device 44 are provided. In the next assembling station S11, an assembling device 45 for assembling from below a circlip C4 to the other end A2 of the driving shaft A and a circlip supplying device 46 are provided. As for the arrangements of the assembling device 43 and supplying device 44 of the assembling station S10, they are same as those of the assembling device 29 and supplying device 30 of the assembling station S4 while the arrangements of the assembling device 45 and supplying device 46 of the assembling station S11 are same as those of the assembling device 35 and supplying device 36 of the assembling station S6, so that detailed description of these devices 43, 44, 45 and 46 are omitted.

In the assembling station S13, an assembling device 47 for assembling from below successively a spider C2 and a circlip C5 to the other end A2 of the driving shaft A, and supplying devices $48_1$, $48_2$, one for feeding the spider C2 and the other for feeding the circlip C5 are all provided.

Figure 30:
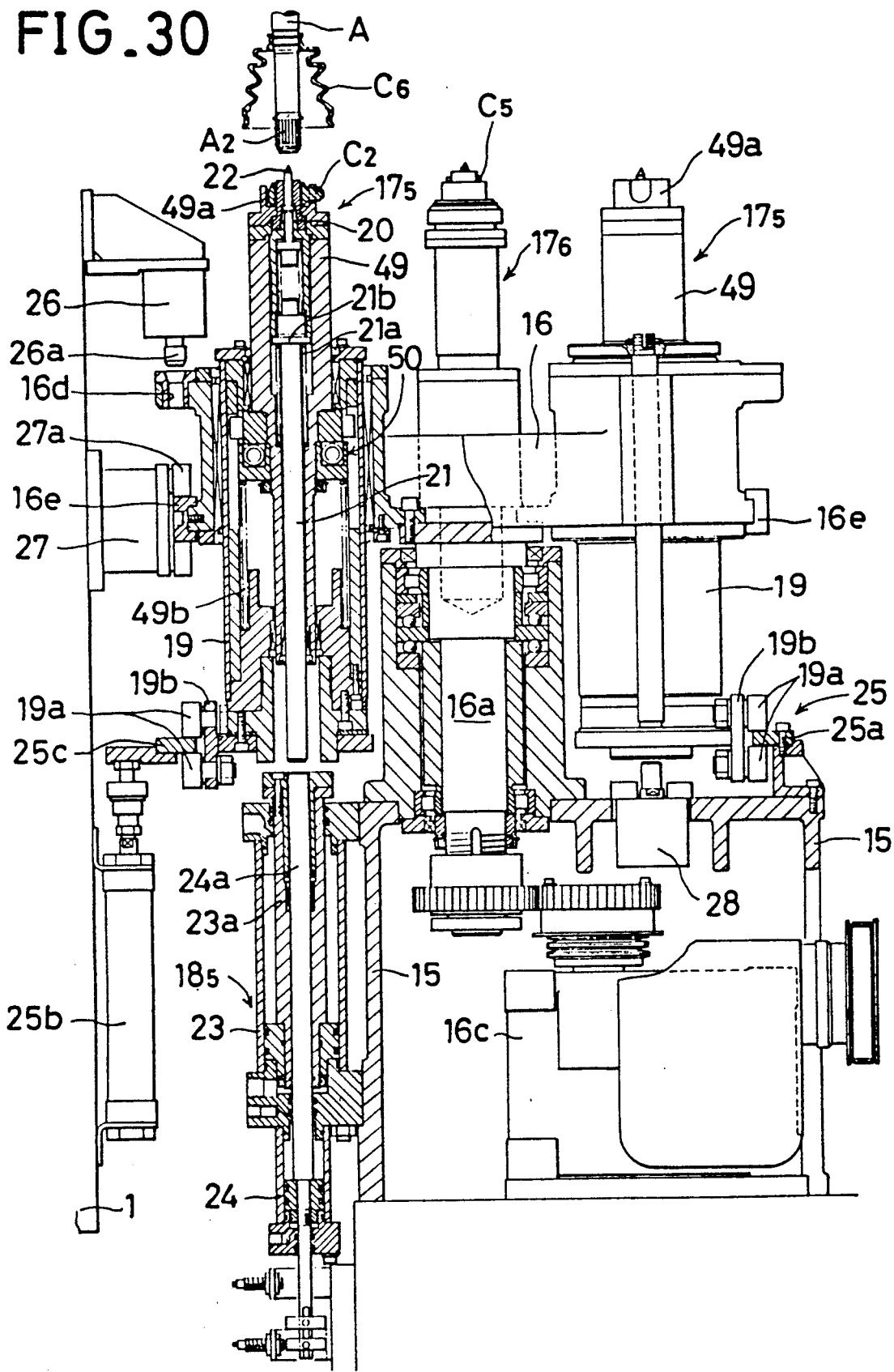
FIG. 30 is a sectional side view of the assembling device provided at the assembling station of the spider and the circlip.

The assembling device 47 comprises a rotary disk 16 which is index-rotated by 90° at a time in the counterclockwise direction on FIG. 1, a pair each of assembling jigs $17_5$ for the spider C2 and assembling jigs $17_6$ for the circlip C5 which are disposed alternately at intervals of 90° on the rotary disk 16. The assembling jig $17_5$ comprises, as shown in FIG. 30: a setting shaft 49 having a spider receiving portion 49a provided at the top end thereof; a jig body 19 which the setting shaft 49 is inserted to be movable downward against a spring 49b; a guide shaft 20 with a center pin 22 inserted therein and a push rod 21. The guide shaft 20 and the push rod 21 are inserted through the setting shaft 49. A cam mechanism 50 is provided that turns the setting shaft 49 by an upward movement of the jig body 19 with respect to the setting shaft 49. The cam mechanism 50 is arranged same as the foregoing cam mechanism 41, so that detailed description thereof is omitted.

For assembling the spider C2, first the guide shaft 20 is pushed up through the push rod 21 by operation of the lower or second cylinder 24 of the cylinder device $18_5$ to have the guide shaft 20 hit against the lower end surface of the driving shaft A so that the driving shaft A may be set centered by the center pin 22.

During this operation, the setting shaft 49 and the jig body 19 which follow the guide shaft 20 are moved upward likewise. After centering, the jig body 19 together with the setting shaft 49 is pushed up further by operation of the upper or first cylinder 23 of the cylinder device $18_5$. In this case, if the inner peripheral splines of the spider C2 and the outer peripheral splines on the other end A2 of the driving shaft A are not aligned so that both sets of splines become engaged with each other, the upward movement of the setting shaft 49 is checked by interference with each other of the splines. The jig body 19 continues to move upward while compressing the spring 49b against the setting shaft 49 so as to turn the setting shaft 49 through the cam mechanism 50 and thus turn the splines to the phase in which they engage each other. The spider C2 is pushed up through the setting shaft 49 by the urging force of the spring 49b so that the spider C2 becomes engages under a light pressure with the other end A2 of the driving shaft A through the splines.

After assembling the spider C2, the assembling jig $17_5$ is lowered through the movable rail 25c by operation of the cylinder 25b and thereafter the assembling jig $17_6$ is moved by a 90° turn of the rotary disk 16 to the assembling position right below the riving shaft A so as to fit the circlip C5 into the ring groove on the lower portion of the other end A2 of the driving shaft A.

The assembling jig $17_6$ has the same structural arrangement as that of the assembling jig $17_3$ of the assembling device 35 provided in the assembling station S6, so that detailed description thereof is omitted.

The foregoing supplying device 48 is arranged such that it may set the spider C2 onto the assembling jig $17_5$ when in a setting position having a phase difference of 180° with respect to the assembling position. The supplying device $48_2$ is arranged such that it may set the circlip C5 onto the assembling jig $17_6$ when in a setting position having a phase difference of 90° in the counterclockwise direction with respect to the assembling position.

The grease injection station S14 is provided with a grease injection device 51 that injects grease into the boot B7 of the first joint unit B on the upper end side of the driving shaft A.

Figure 31:
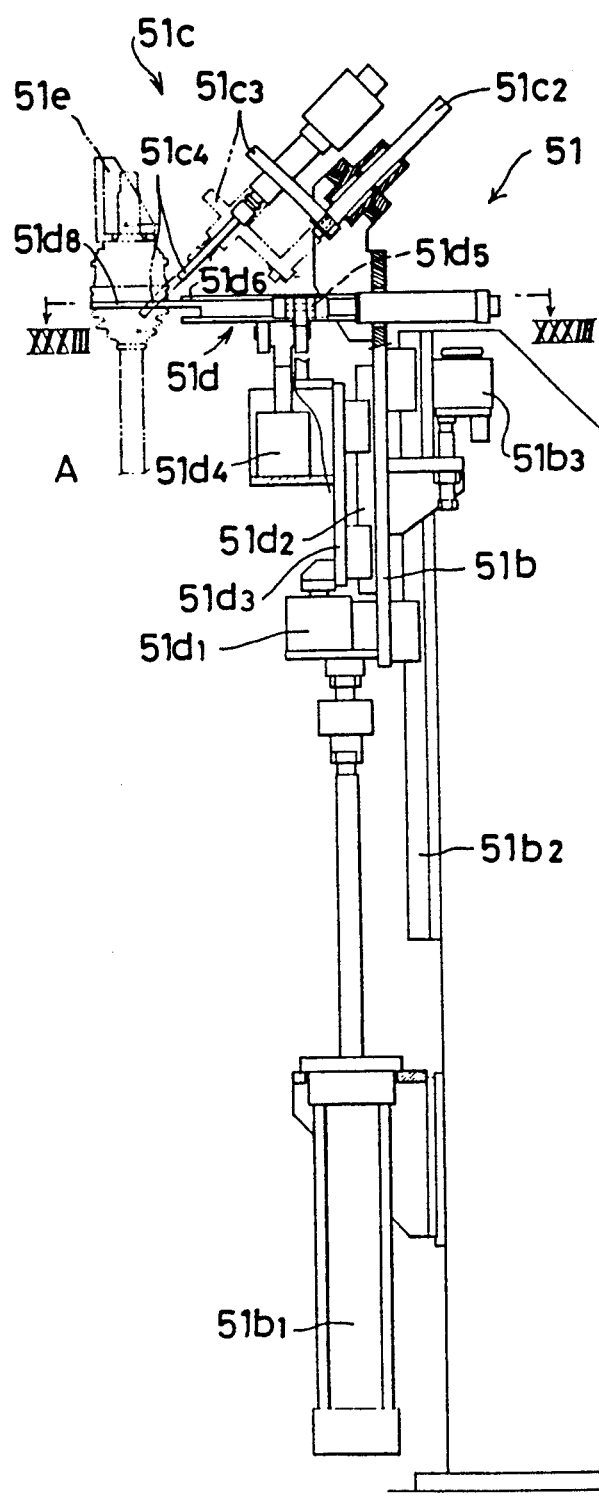
FIG. 31 is a sectional side view of the grease injection device provided at the grease injection station.
Figure 32:
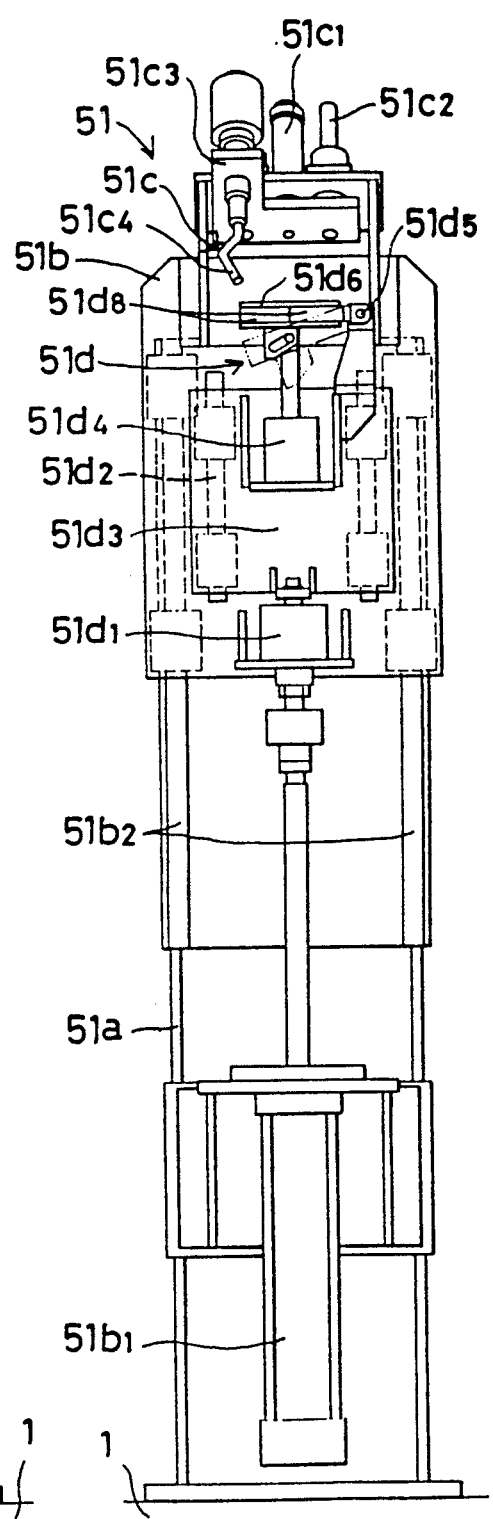
FIG. 32 is a front view thereof.

Details of the grease injection device 51 are as shown in FIGS. 31 and 32 arranged as follow: A supporting column $51a$ is erected at one side of the machine base 1. A base frame $51b$ is provided on the supporting column $51a$ and is moved upward by a cylinder $51b_2$ for positional adjustment and set to an appropriate height of elevation according to the type of the driving shaft A by a rotary type stopper means $51b_3$. A nozzle device $51c$ and a boot opening/closing device $51d$ are mounted on the base frame $51b$.

Figure 33:
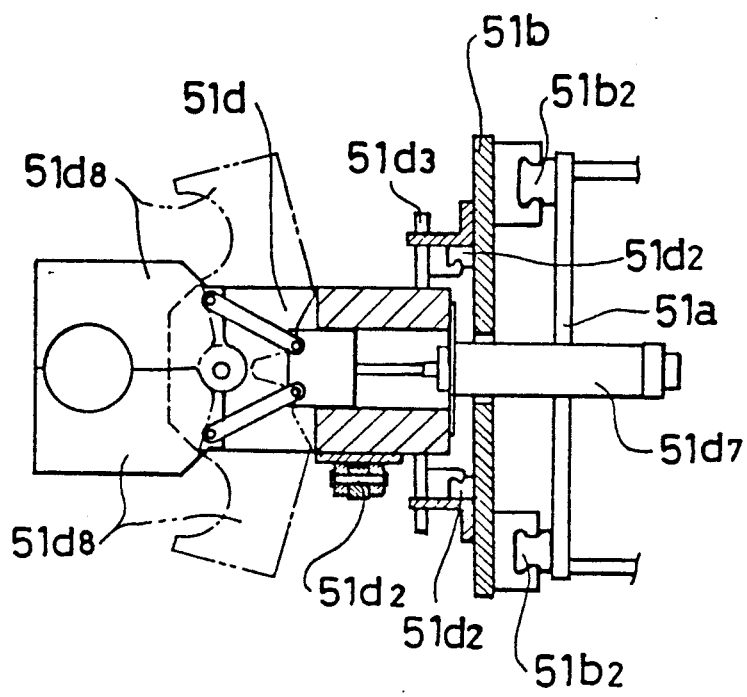
FIG. 33 is a sectional plan view taken along the line XXXIII—XXXIII in FIG. 31.

The nozzle device $51c$ comprises a cylinder $51c_1$, a guide bar $51c_2$, a movable frame $51c_3$ provided on the upper end of the base frame $51b$ and movable back and forth by the cylinder $51d_1$ and the guide bar $51c_2$ in the downwardly oblique direction toward the rubber boot B7, and a nozzle $51c_4$ so attached to the movable frame $51c_3$ as to be extending in the downwardly oblique direction. The boot opening/closing device $52d$ comprises a lift frame $51d_3$ which is moved upward and downward by a cylinder $51d_1$ along the guide rails $51d_2$, a swingable frame $51d_6$ attached to the lift frame $51d_3$ and swingable vertically on a pivot $51d_5$ by a cylinder $51d_4$ and a pair of clamp arms $51d_8$, $51d_8$ attached to the swingable frame $51d_6$ and operated by the cylinder $51d_7$ for opening and closing, as shown in FIG. 33.

In FIG. 31, a positioning member $51e$ comes in contact with the stepped surface of the shank of the outer member B1 so as to hold the outer member B1 in a vertical posture, with the member $51e$ being moved upward and downward by a cylinder (not shown) provided by the side of the machine base 1.

For injecting grease, the clamp arms $51d_8$, $51d_8$ are first closed to hold the rubber boot B7 at the lower portion of a diametrally larger end $B7_b$ thereof being put in contact with the open end of the outer member B1 as shown in FIG. 34($a$). Then the swingable frame $51d_6$ is swung downward so as to pull the diametrally large end $B7_b$ down while twisting the rubber boot B7. According to this operation, as shown in FIG. 34($b$), one peripheral side of the diametrally larger end $B7_b$ is opened widely with respect to the outer member B1 and, in this condition, the movable frame $51c_3$ is moved forward to have the nozzle $51c_4$ face on that one peripheral side opening between the diametrally larger end $B7_b$ and the outer member B1 and then inject a predetermined amount of grease into the rubber boot B7.

Next, the swingable frame $51d_6$ is returned to the horizontal posture and at the same time the lift frame $51d_3$ is moved upward to push the diametrally larger end $B7_b$ up by the clamp arms $51d_8$, $51d_8$ so as to have the diametrally larger and $B7_b$ externally fitted onto the open end of the outer member B1 as shown in FIG. 34($c$). This completes the grease injection operation.

In the assembling station S16, an assembling device 52 for assembling rollers C3 to the projections C2a on three locations on the periphery of the spider C2 attached to the other end A2 of the driving shaft A and thereafter assembling the outer member C1 thereto, and supplying devices 53, 54, one for the roller C3 and the other for the outer member C1 are provided.

Figure 35:
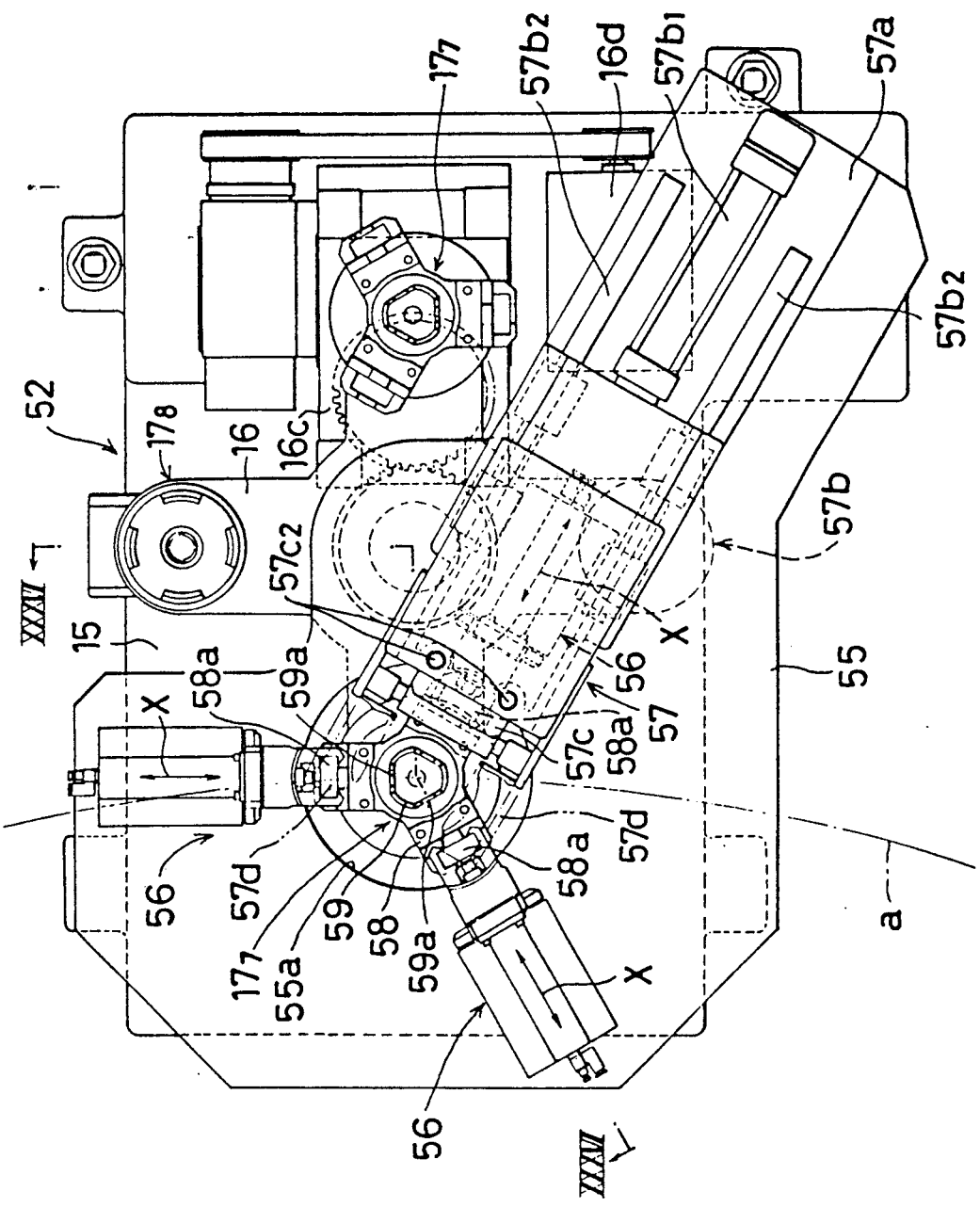
FIG. 35 is a plan view of the assembling device provided at the assembling stations for the roller and the outer member.
Figure 36:
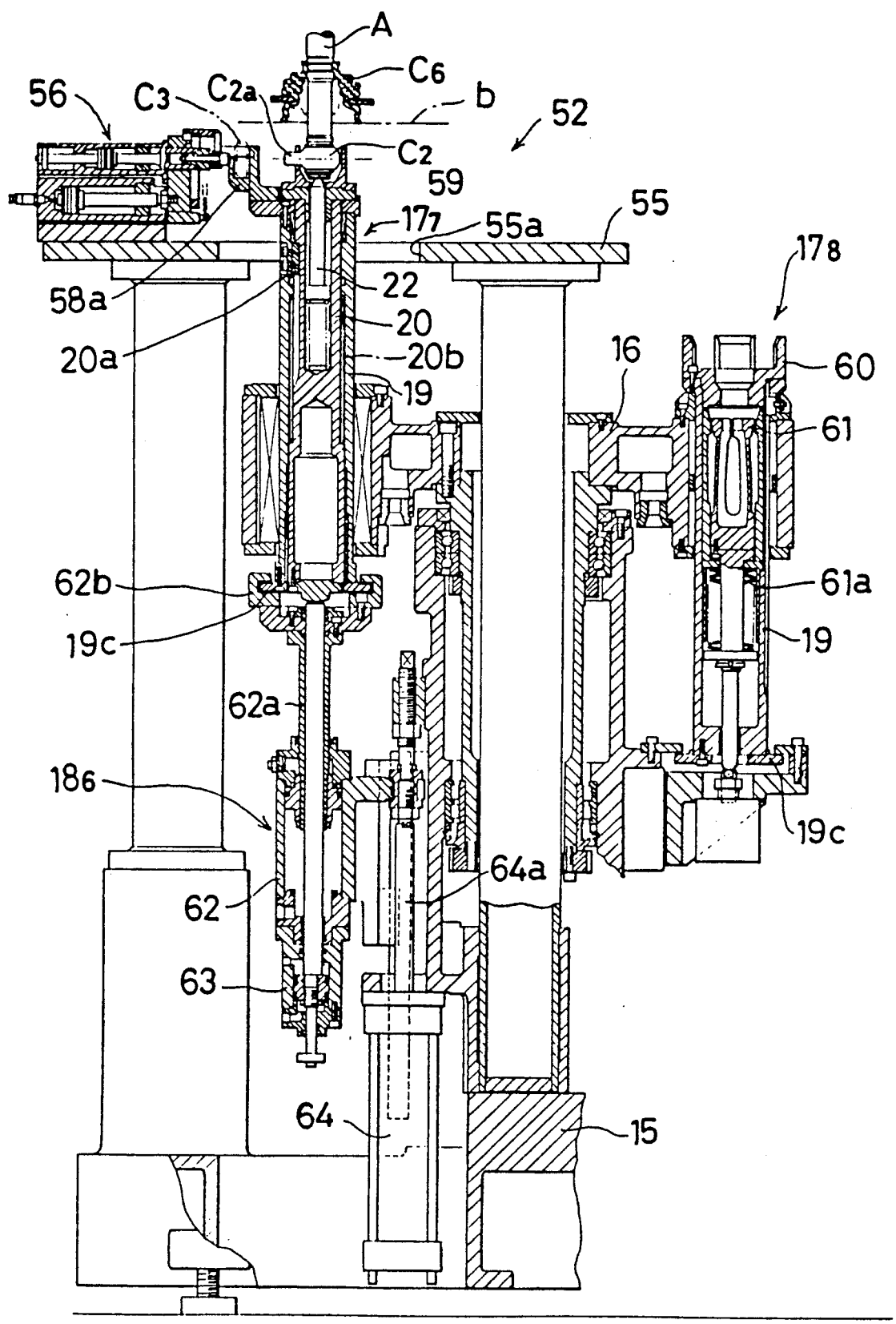
FIG. 36 is a sectional side view taken along the line XXXVI—XXXVI in FIG. 35.
Figure 37:
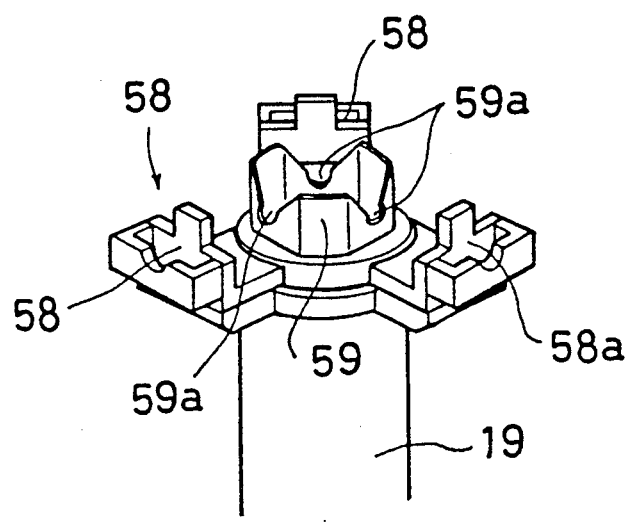
FIG. 37 is a perspective view of the upper end portion of the set jig provided on the assembling device concerned.

As shown in FIG. 35 and 36, the assembling device 52 is arranged as follows: A pair each of roller set jigs $17_7$ for the rollers C3 and outer member assembling jigs $17_8$ for the outer member C1 are disposed alternately at intervals of 90° on the rotary disk 16 which is index-turned by 90° at a time so that both jigs $17_7$ and $17_8$ may be moved successively to the assembling position right below the driving shaft A. In addition, there is provided a holder base 55 located above the rotary disk 16. The holder base 55 is provided with a through window $55a$ so formed as to permit each of the jigs $17_7$, $17_8$ when at the assembling position to be inserted vertically therethrough. Roller C3 insertion units 56 are disposed on the holder base 55 positioned at three locations around the through window $55a$. A rubber boot assembling unit 57 is also mounted on the base 55. The roller jig $17_7$ is arranged as follows: The roller jig body 19 is inserted vertically slidably through the rotary disk 16. A guide shaft 20 provided with a center pin 22 is inserted through the jig body 19 and is movable upward and downward against the spring $20b$. The guide shaft 20 is locked by a key $20a$ against turning. As shown in FIG. 37, a roller setting member 58 is attached to the top end of the jig body 19 which is provided at three peripheral locations with pocket portions $58a$ which hold the rollers C3 in such a manner as to permit each one to be pulled off upward. A cylindrical guide member 59 for receiving the spider C2 is attached to the upper end of the guide shaft 20, the guide member 59 being provided at three peripheral locations thereof with V-shaped notches $59a$ for receiving the respective projections C2a of the spider C2 while making a phase alignment so as to have them aligned with the axial line of the rollers C3 held in each pocket portion $58a$.

The outer member assembling jig $17_8$ is arranged such that there is provided a retainer 60 for the outer member C1, the retainer being attached to the upper end of the outer member jig body 19 which is inserted through the rotary disk 16 in such a manner as to be vertically slidable. A collet 61 for clamping the shank of the outer member C1 is provided in the outer member jig body 19 so as to be urged downward toward the closing side by a spring $61a$.

A cylinder device $18_6$ provided below the assembling position is arranged to comprise an upper or first cylinder 62, a lower or second cylinder 63, and a third cylinder 64 for moving the two cylinders 62, 63 upward and downward. An engagement piece $62b$ is attached to the upper end of a piston rod $62a$ of the first cylinder 62 for engagement with the flange $19c$ attached to the lower end of the jig body 19 of each of the jigs $17_7$, $17_8$.

Figure 38:
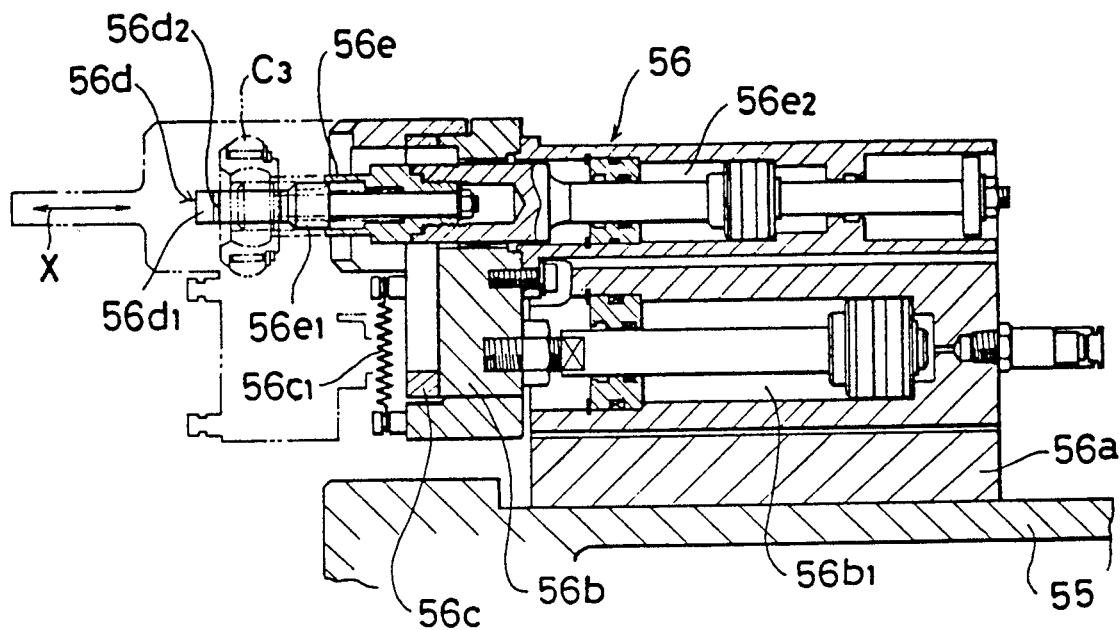
FIG. 38 is a sectional side view of the roller insertion unit provided on the assembling service concerned.
Figure 39:
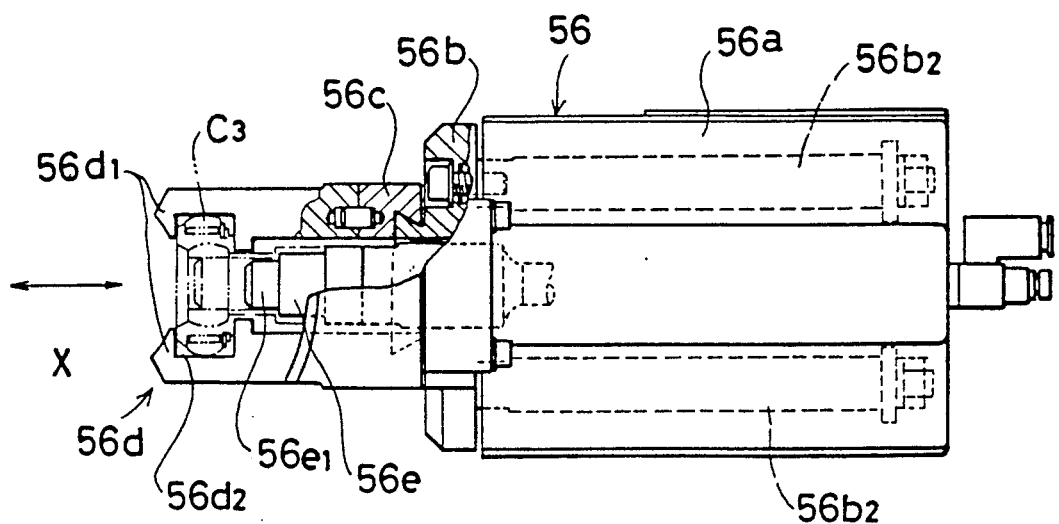
FIG. 39 is a plan view thereof.
Figure 40:
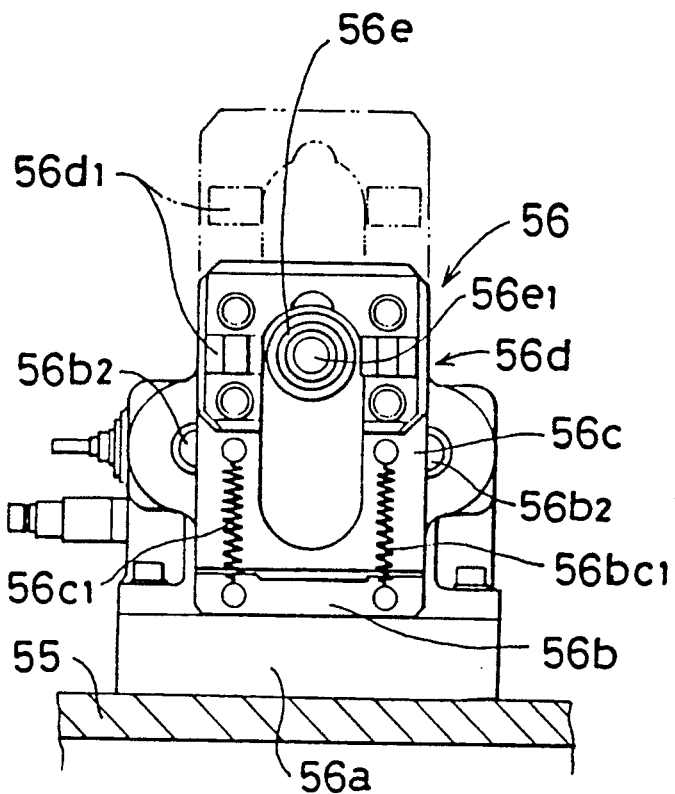
FIG. 40 is a front view thereof.

The roller insertion unit 56 comprises, as shown in FIGS. 38 through 40, a base frame $56a$ fixedly attached to the holder base 55, a movable plate $56b$ so provided on the base frame $56a$ and movable back and for the in the X-axis direction by a cylinder $56b_1$ and guide bars $56b_2$. The X-axis direction is the direction along a radial line passing the center of each pocket portion $58a$ of the set jig $17_7$ at the assembling position. A slidable plate $56c$ is provided on the movable plate 56b and is movable upward against springs $56c_1$. A roller holder 56d is attached to the slidable plate 56c, and includes a pair of pawls $56d_1$ $56d_1$ and a receiving portion $56d_2$ formed between the tips of the pawls $56d_1$, $56d_1$ to receive therein a roller C3 in such a manner that the roller C3 can be pulled off vertically. A pusher 56e is provided with a cushion pin $56e_1$ insertable into the inner part of the roller C3 and is mounted on the movable plate 56b. The pusher 56e is movable by a cylinder $56e_2$ in the X-axis direction toward the receiving portion $56d_2$.

Figure 41:
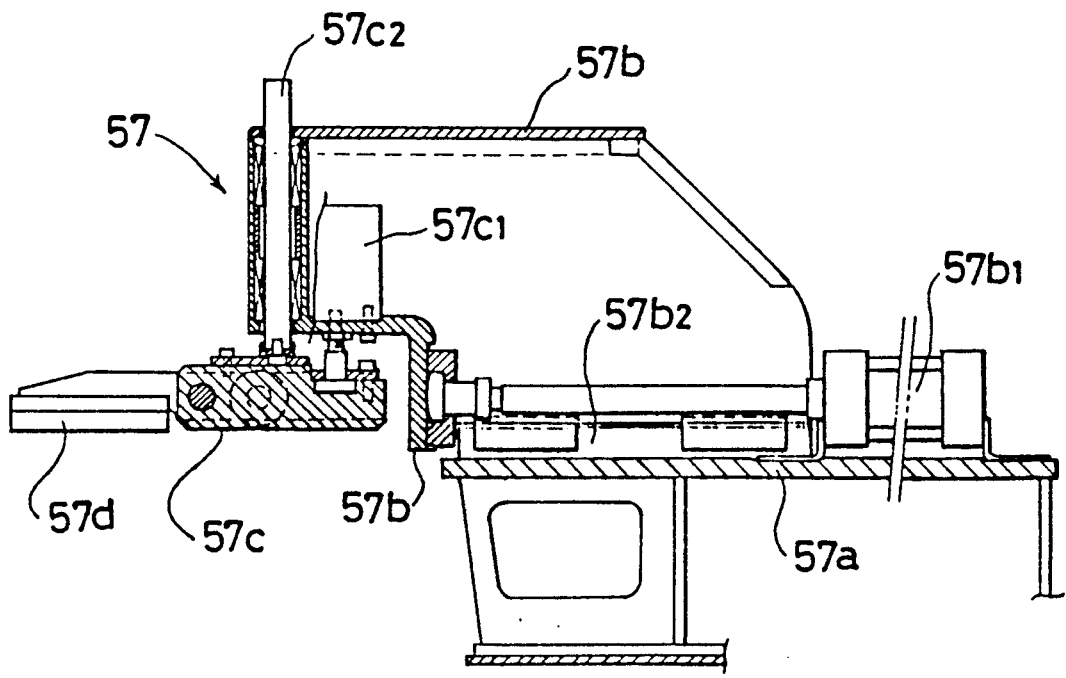
FIG. 41 is a sectional side view of the rubber boot assembling unit provided on the assembling device concerned.

The foregoing rubber boot assembling unit 57 comprises, as shown in FIGS. 35 and 41, a base frame 57a fixedly attached to the holder base 55, a movable frame 57b mounted on the base frame 57a and movable back and forth by a cylinder 57b along guide rails $57b_2$, a tool holder 57c suspended from the movable frame 57b by a cylinder $57c_1$ and guide bars $57c_2$ in such a manner as to be vertically movable, and a pair of clamp arms 57d, 57d for clamping the rubber boot C6. The pair of clamp arms are mounted on the tool holder 57c to be opened and closed by a cylinder (not shown).

For assembling the roller C3 and the outer member C1, the roller setting jig $17_7$ in which the rollers C3 are already set in each pocket portion 58a of the roller setting member 58 is moved to the assembling position. Thereafter, the piston rod 64a of the third cylinder 64 is moved upward to push upward the jig body 19 together with the guide shaft 20 to the predetermined level of elevation for assembling. During this operation, the movable plate 56b of each insertion unit 56 is moved back outwardly in the X-axis direction for the receiving portion $56d_2$ of the roller holder 56d to face on a path of upward movement of each pocket portion 58. With the upward move of the jig body 19 to the assembling level of elevation, the upper half of each roller C3 resting in each pocket portion 58a is inserted into the receiving portion $56d_2$ in order to have the axial lines of the rollers C3 and the pusher 56e of each insertion unit 56 aligned with each other.

The conveying level of elevation for the driving shaft A is, as indicated by b on FIG. 36, set at a higher lever than that of the insertion unit 56 in order for the driving shaft A not to interfere with the insertion unit 56 when in a position overlapping a path a for shaft conveying. After the jig body 19 is moved upward, the driving shaft A is pushed down by a backup unit that will be described later, and the spider C2 is thus pushed into the guide member 59. According to this operation, the driving shaft A is set centered by the center pin 22 and at the same time each projection C2a of the spider C2 is inserted into each notch 59a of the guide member 59, so that the spider C2 is phase-aligned as shown by FIG. 36, in which the axial line of each projection C2a is aligned with that of the roller C3 in each pocket portion 58a. At this time, the movable frame 57b of the assembling unit 57 is advanced to the operating position toward the driving shaft A to clamp the rubber boot C6 with the clamp arms 57d, 57d and raise the tool holder 57c, thereby tucking up the boot C6.

For pushing down the driving shaft A, the clamping pieces $2b_7$, $2b_7$ of the chuck member 2b of the carrier 2 are moved through the previously described floating function in such a manner as to follow the movement of the driving shaft A while remaining closed as they move part of the way. When the driving shaft A is moved downward to the level at which the project C2a of the spider C2 starts being inserted into the notch 59a, the clamping pieces $2b_7$, $2b_7$ are opened so as to allow the driving shaft A to rotate upon phase alignment of the spider C2.

Next, the pusher 56e of each insertion unit 56 is moved forward by the cylinder $56e_2$ to insert the cushion pin $56e_1$ into the inner member of the roller C3 in each pocket portion 58. Thereafter, the piston rod 62a of the first cylinder 62 is moved downward to lower the jig body 19 by the predetermined amount of stroke and reach the position shown in FIG. 42(a). In this case, each roller C3 is held by the cushion pin 56e in the position in which it is aligned with the axial line of each projection C2a of the spider C2 while remaining inserted in the receiving portion 56b of the roller holder 56d of each insertion unit 56. The guide shaft 20 is held at the predetermined assembling level of elevation by means of the piston rod 63a of the second cylinder 63 which is in contact with the lower end thereof.

Next, the movable plate 56b of each insertion unit 56 is advanced. According to this operation, the cushion pin $56e_1$ comes in contact with the end surface of the projection C2a and thereafter the roller holder 56d advances to the projection C2a side while compressing the pin $56e_1$ into the pusher 56e so as to have the roller C3 fitted over the projection C2a. Then, the piston rod 64a of the third cylinder 64 is moved downward to lower the guide shaft 20 together with the jig body 19, thereby obtaining the position as shown in FIG. 42(b).

Now, the rotary disk 16 is turned by 90° to move to the assembling position the assembling jig $17_8$ with the outer member C1 set thereon. Next, while the pusher 56e of each insertion unit 56 is retained in the state in which it has been moved back by the cylinder $56e_2$, the jig body 19 of the jig $17_8$ is raised by operation of the third cylinder 64 to the predetermined assembling level of elevation as shown in FIG. 42(c). According to this operation, the open end of the outer member C1 comes in contact with the roller holder 56d of each insertion unit 56 and the holder 56d is thus pushed up in a body with the slidable plate 56c, so that the outer member C1 is raised to the assembling level of elevation with respect to the driving shaft A while inserting each roller C3 into each engagement groove C1a on the inner periphery of the outer member C1.

Next, the movable plate 56b of each insertion unit 56 is moved back and thereafter the clamp arms 57d, 57d of the assembling unit 57 are lowered by movement of the tool holder 56c to have the diametrally larger end of the rubber boot C6 fitted onto the open end of the outer member C1 as shown in FIG. 42(d). Then, the clamp arms 57d, 57d are opened and thereafter moved back by operation of the movable frame 56b. Furthermore, the piston rod 63a of the second cylinder 63 is moved upward to push up the collet 61 in the jig body 19 thereby and open the same. In this condition, the piston rod 64a of the third cylinder 64 is lowered to move the assembling jig $17_8$ away downwardly of the outer member C1 while the driving shaft A is raised to the conveying level of elevation to close the afore-said clamping pieces $2b_7$, $2b'_7$ of the chuck member 2b and obtain the state as shown in FIG. 42(e), thus completing the assembling operation.

Figure 43:
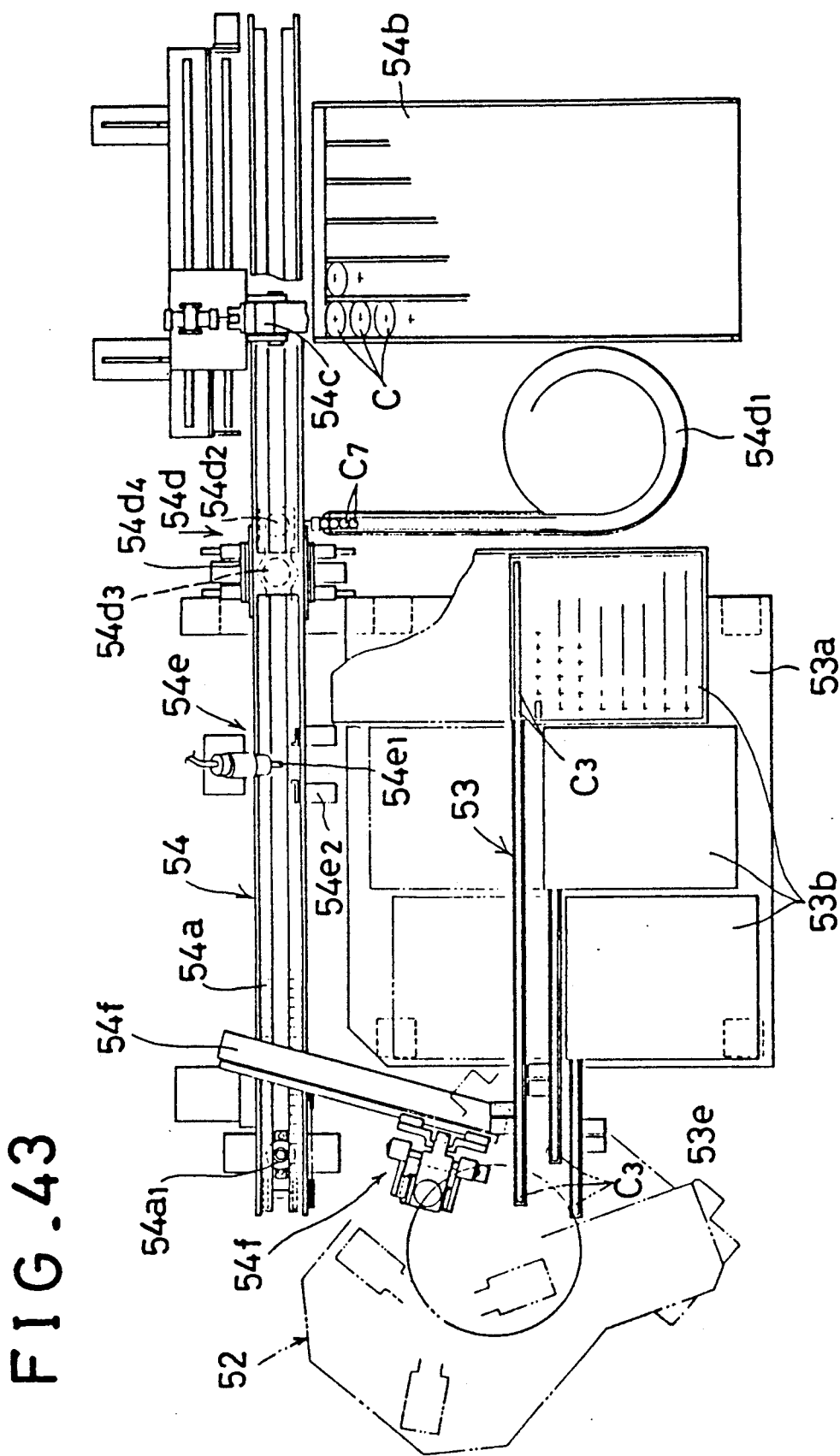
FIG. 43 is a plan view of the supplying device for the rollers and the outer member.
Figure 44:
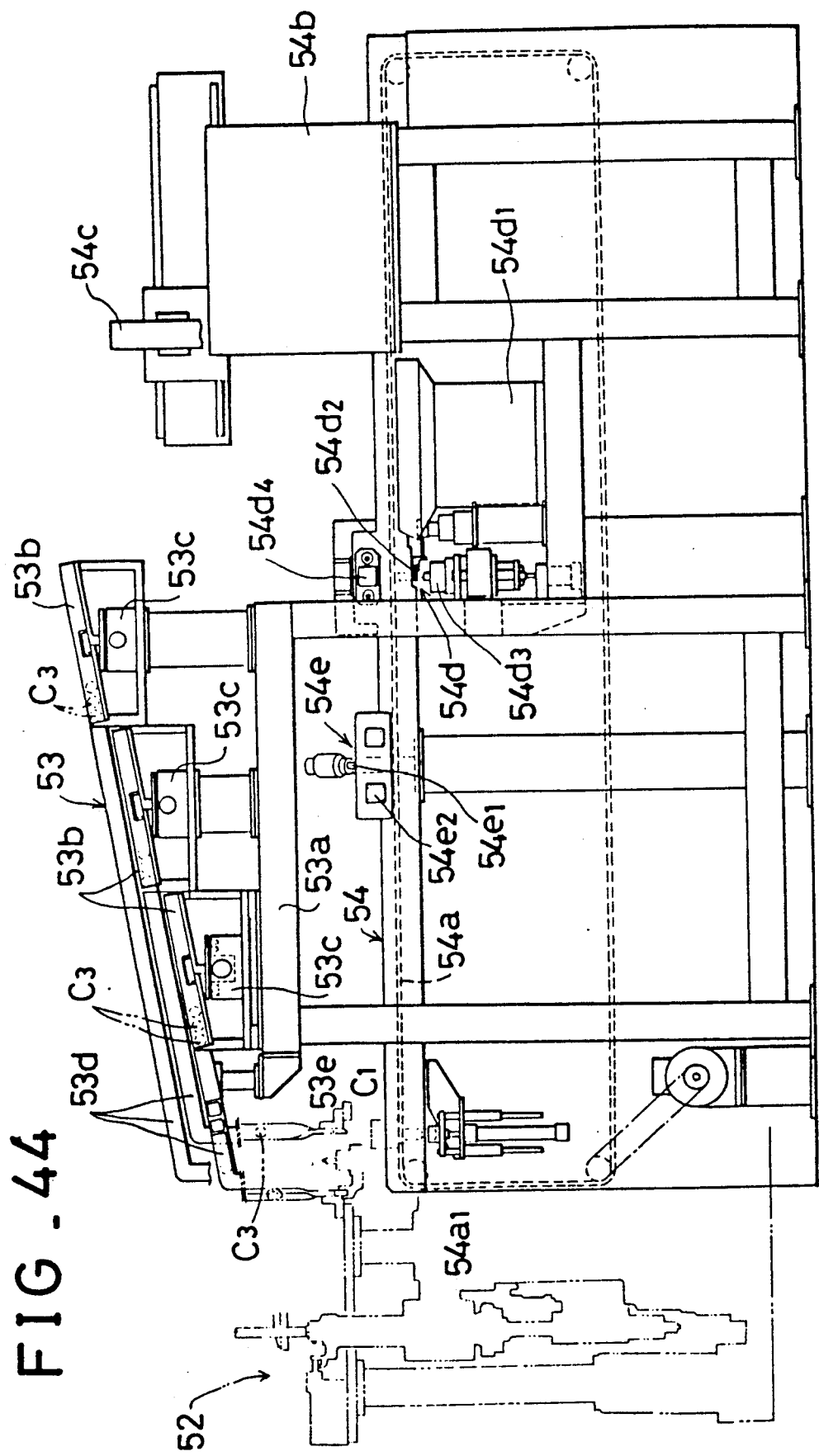
FIG. 44 is a side view thereof.

Details of the supplying devices 53, 54 are shown in FIGS. 43 and 44. The roller supplying device 54 is arranged to comprise a holder base 53a disposed outside of the assembling device 52, three pallets 53b provided on the holder base 53a to be delivered intermittently as desired in the lateral direction by a feed mechanism 53c, each of said pallets 53b containing the rollers C3 arranged in a plurality of rows, and three chutes 53d provided to correspond to the three pallets 53b. In the above arrangement, as each pallet 53b is moved intermittently for delivery of the rollers C3, these rollers C3 are delivered by row from the pallet 53b to each corresponding chute 53d. In addition, the front end portion of each chute 53d is bent downward at the roller setting position having a phase difference of 180° with respect to the assembling position so that when the set jig $17_7$ which has been moved to the setting position is pushed up by a cylinder (not shown), the lower ends of these chutes 53d may coincide with the respective pocket portions 58. Then the rollers C3 may be delivered one by one by means of a cutout mechanism 53e provided half-way in the chute 53d so as to drop it into each pocket portion 58a.

The outer member supplying device 54 is arranged to comprise a conveyor 54a for conveying outer members C1, a stocker 54b, a takeout device for taking out the outer member C1, one by one, from the stocker 54b and transferring them onto the conveyor 54a, a set ring C7 assembling device 54d and a grease injection device 54e (which are both provided half-way on the conveyor 54a), and a setting device 54f for setting the outer member C1 onto the assembling jig $17_8$ which has been moved to the outer member setting position having a phase difference of 90° with respect to the assembling position.

The set ring C7 assembling device 54d is arranged as follows. The set ring C7 supplied from a part feeder $54d_1$ is set to a press-in jig $54d_3$ through a clamper $54d_2$ which is turnable and movable upward and downward. While the outer member C1 on the conveyor 54a is kept positioned by a positioning means $54d_4$, the press-in jig $54d_3$ is raised to have the set ring C7 inserted under pressure onto the shank of the outer member C1. The grease injection device $54e_1$ is arranged such that grease is injected through a nozzle 54e into the outer member C1 positioned by a positioning means $54d_4$, the nozzle being located to face the conveyor 54a from above.

Figure 45:
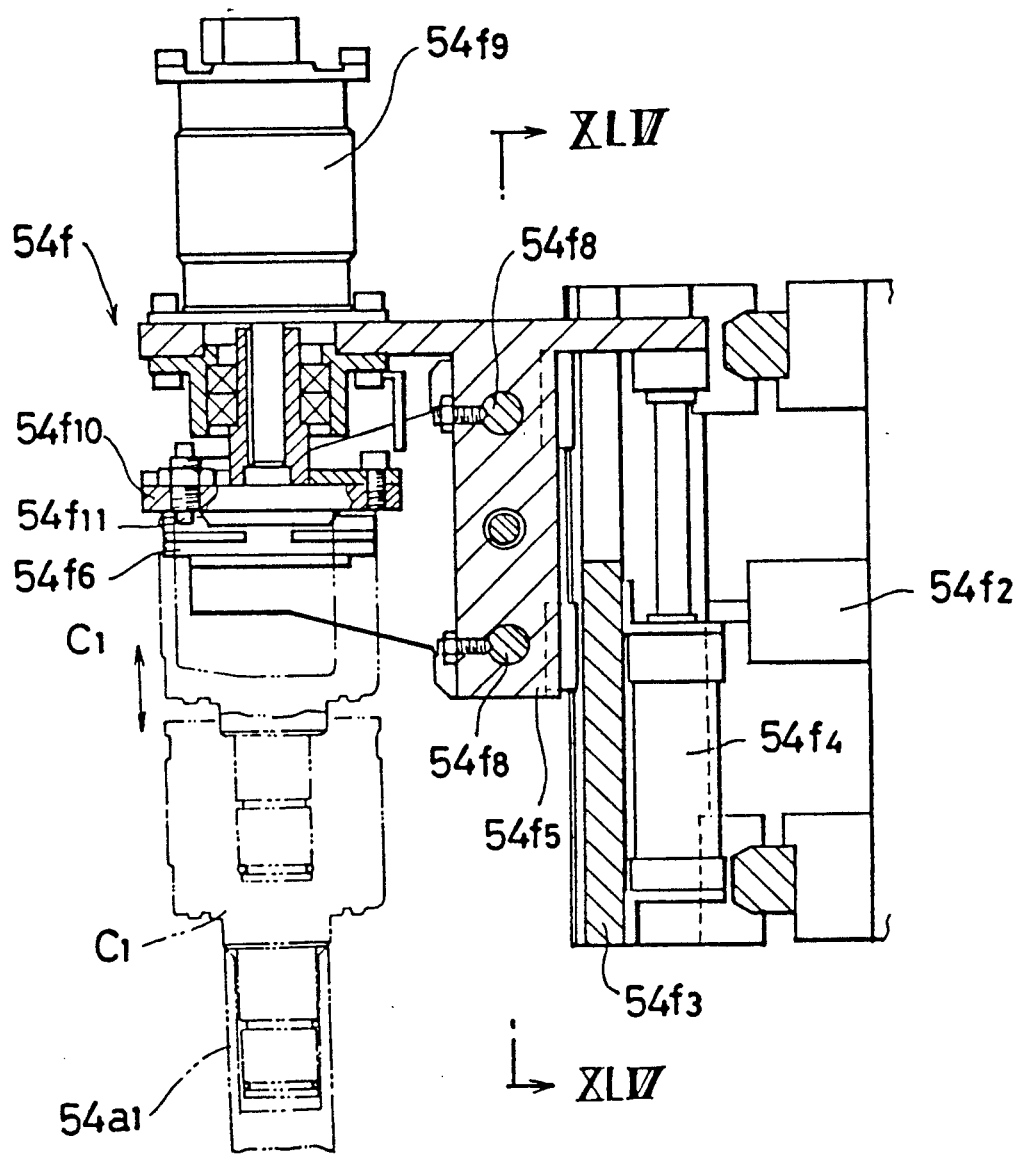
FIG. 45 is a sectional side view of the setting device provided on the outer member supplying device.
Figure 46:
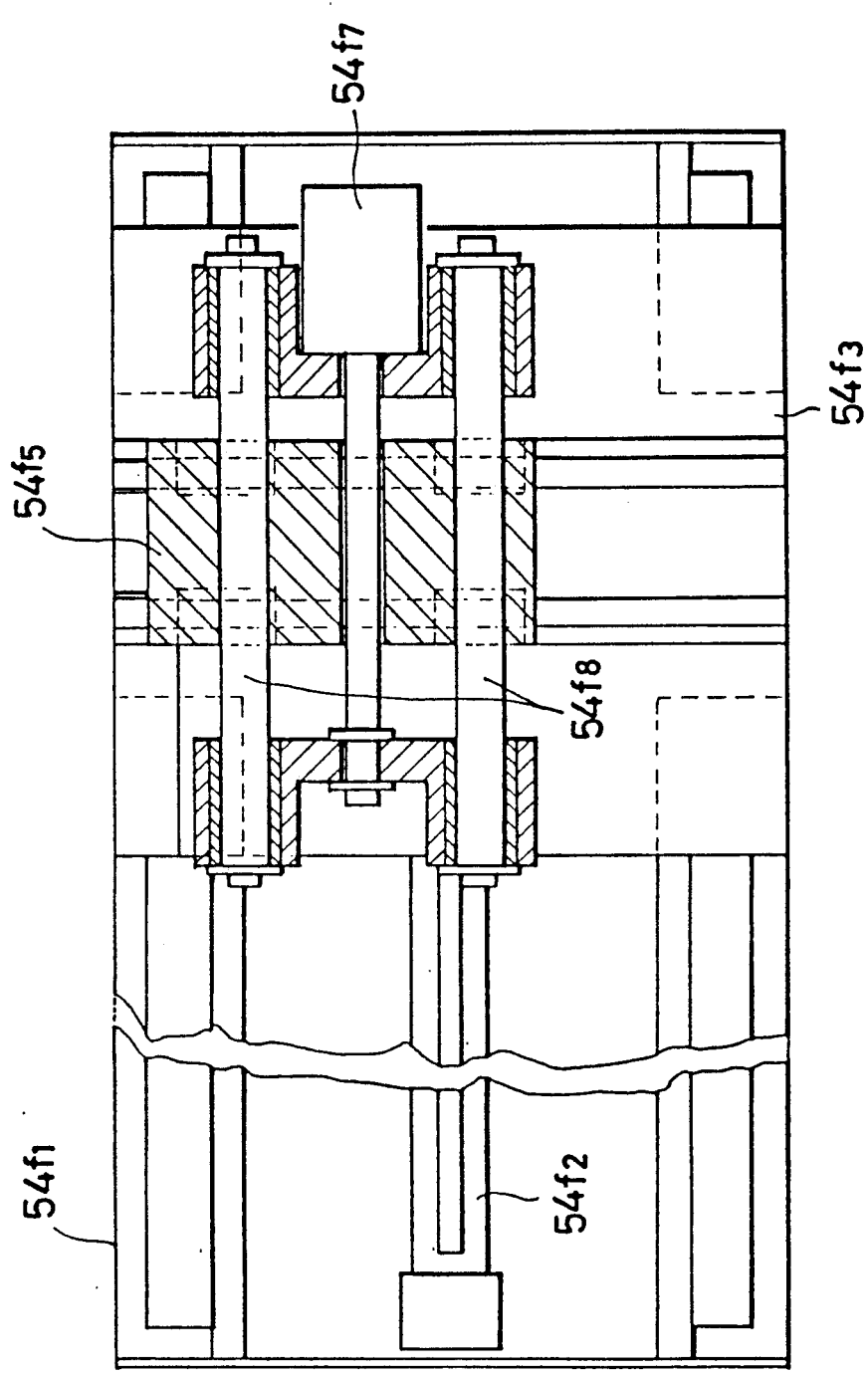
FIG. 46 is a sectional front view taken along the line XLVI—XLVI in FIG. 45.
Figure 47:
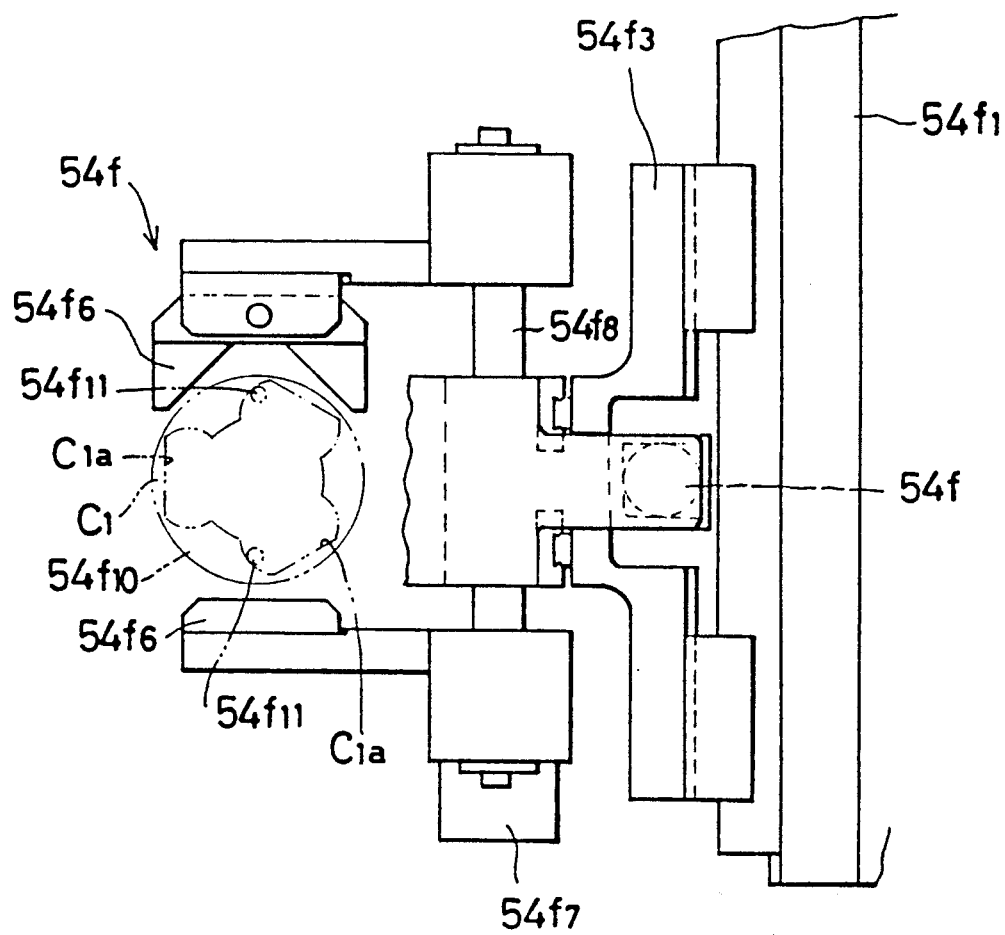
FIG. 47 is a plan view thereof.

The setting device 54f comprises, as shown in FIGS. 45 through 47, a guide frame $54f_1$ provided to stretch over the final end of the conveyor 54a and the outer member setting position, a shift frame $54f_3$ operated by a cylinder $54f_2$ to reciprocate between the conveyor 54a side and the outer member setting position, a lift frame $54f_5$ operated by a cylinder $54f_4$ to move upward and downward, a pair of clamp arms $54f_6$, $54f_6$ provided on the lift frame $54f_5$ to be operated by a cylinder $54f_7$ to open and close along guide bars $54f_8$, and a phase-setting disk $54f_{10}$ which is turned 360° at a time by a motor $54f_9$, the disk $54f_{10}$ being located as to face on the opening end of the outer member C1.

Attached to the underside surface of the disk $54f_{10}$ are a pair of cushion pins $54f_{11}$, $54f_{11}$ which can project therefrom and retreat thereinto. The pins are disposed in such a manner that one of them may be engaged with the side wall on one side in the peripheral direction of one of the adjacent engagement grooves C1a, C1a on the inner periphery of the outer member C1 and the other engaged with the side wall on the other side in the peripheral direction of the other of the grooves C1a, C1a.

At the final end of the conveyor 54a, the outer member C1 is lifted up to the predetermined delivery position by a cylinder-like lifter $54a_1$ which receives the shank of the outer member C1. In this condition, the lift frame $54f_5$ of the setting device 54f is lowered to seat the phase-setting disk $54f_{10}$ at the opening end of the outer member C1 and turn the same by 360°. According to this operation, each cushion pin $54f_{11}$ comes to stick out into the engagement groove C1a and engage the side wall thereof while the disk $54f_{10}$ is still being turned, so that the outer member C1 is turned therewith after the above engagement and becomes aligned in phase as indicated on FIG. 47.

Next, the clamp arms $54f_6$, $54f_6$ are closed to clamp the outer member therebetween. In this condition, the lift frame $54f_5$ is lifted and the shift frame $54f_3$ is moved forward to the outer setting position side. When the assembling jig $17_8$ is moved to the outer setting position, the collet 61 provided in the jig $17_8$ is pushed up and opened by means of the cylinder 28 provided below the setting position (refer to FIG. 36) while the lift frame $54f_5$ is lowered to set the outer member C1 onto the jig $17_8$. Next, the cylinder 28 is released from operation and the shank of the outer member C1 is clamped by the collet 61. Thereafter, the clamp arms $54f_6$, $54f_6$ are opened and the lift frame $54f_5$ is lifted and the slidable frame $54f_3$ is moved back to the conveyor 54a side.

Thus, when the assembling jig $17_8$ with the outer member C1 set thereto in the predetermined phase is moved to the assembling position to raise the outer member C1, each roller C3 can be accurately inserted into each engagement groove C1a.

Assembling of the driving shaft A is completed through the above-described steps of assembling operation and, at the discharging station S18, the driving shaft A is removed from the carrier 2 by the unloader device 11 s previously described.

At each of the assembling stations S3, S4, S6, S7, S10, S11, S13, and S16 described in the foregoing, a backup unit 65 is provided designed to hold the upper end of the driving shaft A so as to keep the driving shaft set at its centered position, the structural details thereof being described in the following.

Figure 48:
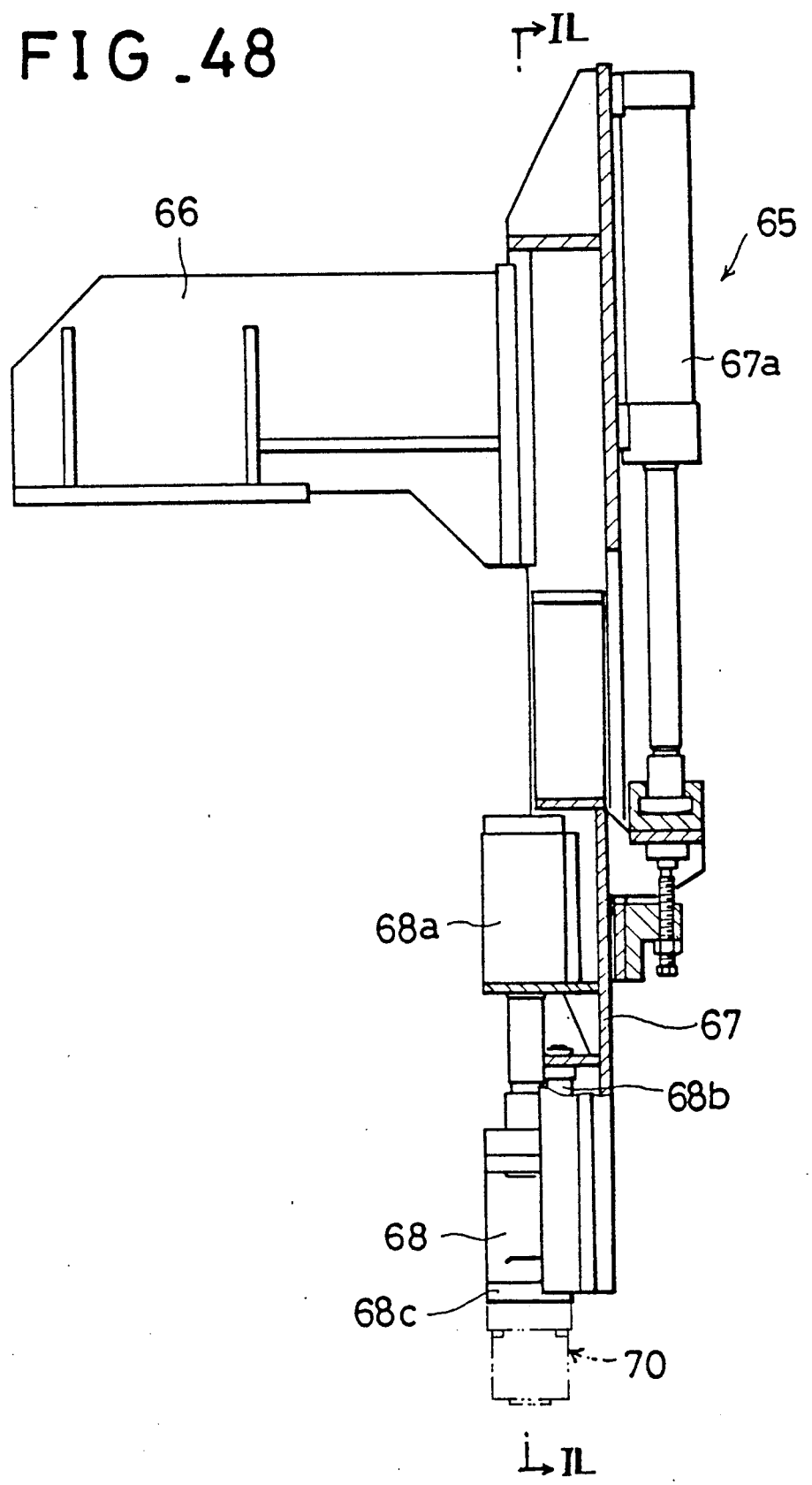
FIG. 48 is a sectional side view of the backup unit.
Figure 49:
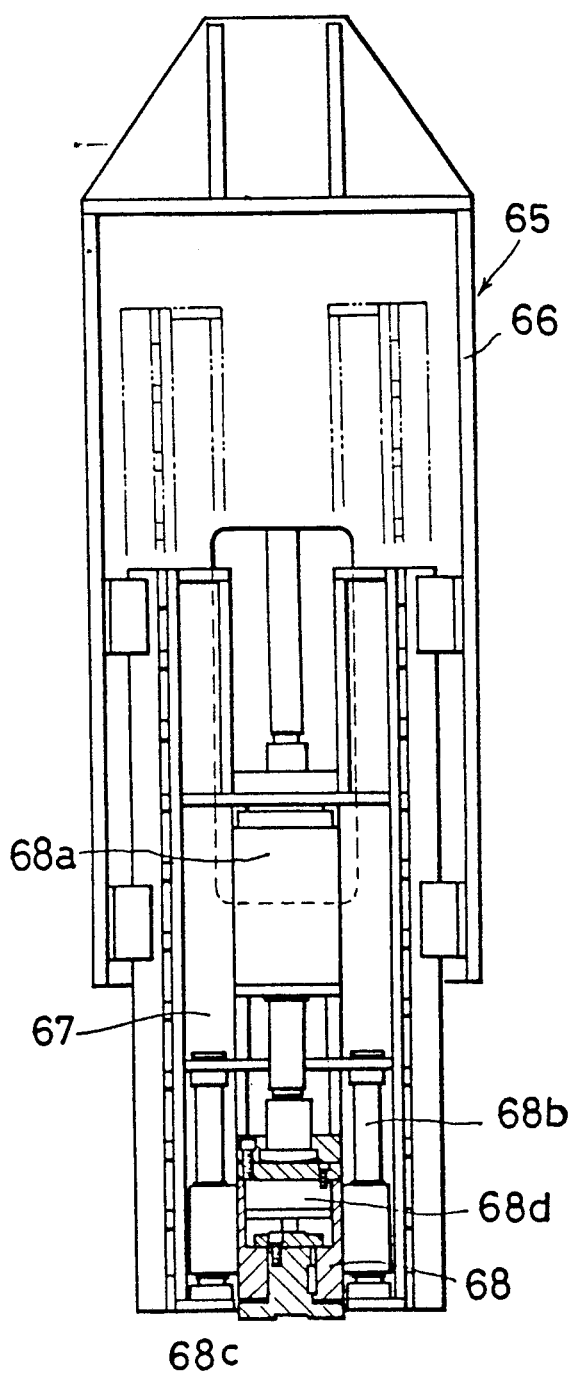
FIG. 49 is a sectional view taken along the line IL—IL in FIG. 48.
Figure 50:
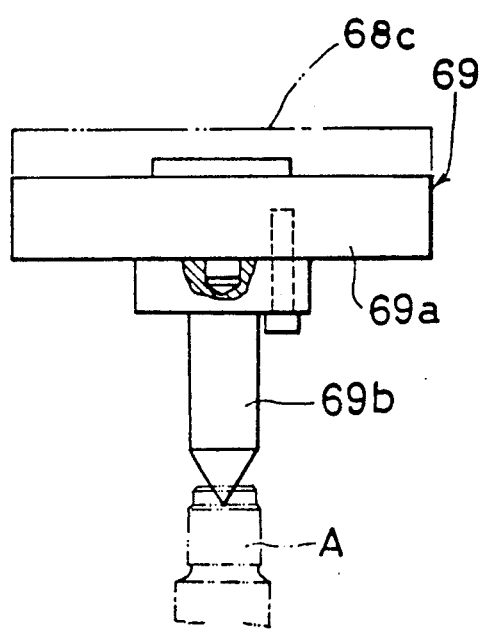
FIGS. 50 through 52 are sectional side view of various types of the backup member attached to the backup unit.
Figure 52:
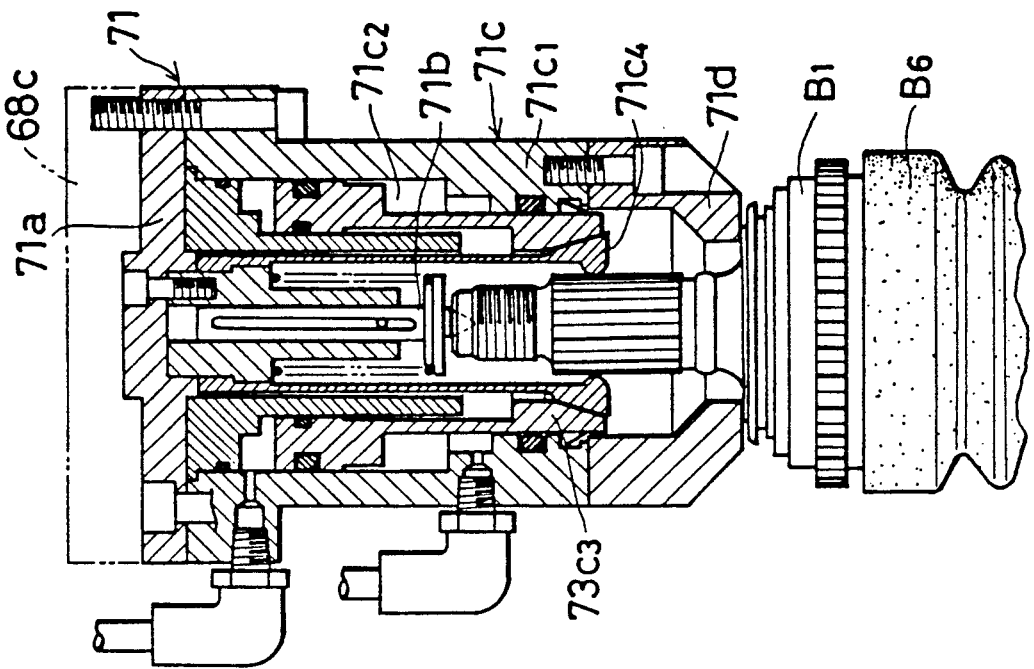
Figure 51:
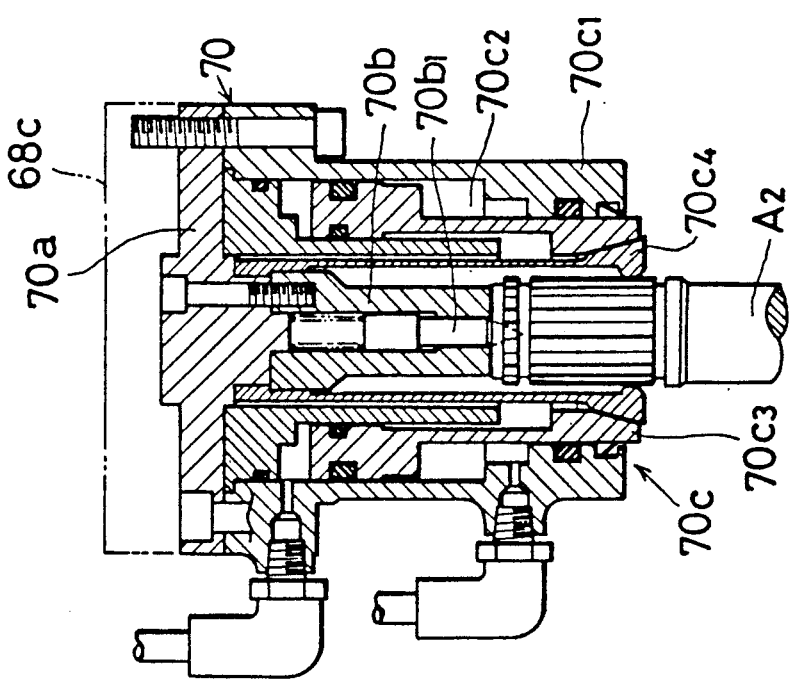

The backup unit 65 comprises, as shown in FIGS. 48 and 49, a base frame 66 that is to be mounted on the machine base 1, a lift frame 67 which is attached to the base frame 66 and positionally adjusted by a cylinder 67a according to the type of the driving shaft A, a tool holder 68 attached to the lift frame 67 and moved upward and downward along guide bars 68b by a cylinder 68a, and a backup member attached to the lower surface of a supporting member 68c fitted to the tool holder 68. Three types of the backup member are prepared to include a first one 69 as shown in FIG. 50, a second one 70 as shown in FIG. 51 and a third one 71 as shown in FIG. 52. The first one shown in FIG. 50 is for use in the assembling stations S3, S6 respectively for the damper weight D and the stopper ring B6, the second one in FIG. 51 is for use in the assembling stations S4, S7 for the rubber boot B7 and the joint body B5, and the third one in FIG. 52 is for use in the assembling stations such as S10, S11, S13 and S16 after the reversing station S9.

The backup member 69 shown in FIG. 50 comprises a fitting base 69a which is attached to the appropriate supporting member 68c and a center pin 69b securely fixed to the underside surface of the fitting base 69a. The center pin 69b is disposed to engage the center hole in the other end A2 of the driving shaft A, so that the tool holder 68 is lowered to have the other end A2 of the driving shaft A centered by the center pin 69b.

The backup member 70 shown in FIG. 51 comprises a fitting base 70a which is attached to the appropriate supporting member $68c$, a seating holder $70b$ provided with a center pin $70b_1$ for contacting the end surface of the other end A2 of the driving shaft A and attached to the underside surface of the fitting base $70a$, and a collet chuck $70c$ for clamping the other end A2 of the driving shaft A. The collet chuck $70c$ is provided around the seating holder $70b$ and attached to the underside surface of the fitting base $70a$. The collet chuck $70c$ is arranged to comprise an outer sleeve $70c_1$, a cylinder $70c_2$ provided inside of the outer sleeve $70c_1$, an operating sleeve $70c_3$ operated by the cylinder $70c_2$, and a collet $70c_4$ that is opened and closed by the operating sleeve $70c_3$, so that when the seating holder $70b$ has come to hit against the end surface of the shaft A by the downward movement of the tool holder 68 and is remaining in that condition, the operating sleeve $70c_3$ is moved downward to close the collet $70c_4$ and thereby hold the other end A2 of the driving shaft A in the properly centered condition by the backup member 70.

The backup member 71 shown in FIG. 52 comprises a fitting base $71a$ which is attached to the appropriate supporting member $68c$, a center pin $71b$ attached to the underside surface of the fitting base $71a$ so as to engage the center hole in the end surface of the shank of the outer member B1 of the first joint unit B, a collet chuck $71c$ for clamping the shank of the outer member B1, the chuck $71c$ being of the same type as described the foregoing and attached to the underside surface of the fitting base $71a$, and a posture correction ring $71d$ which comes in contact with the stepped surface of the shank of the outer member B1. The ring is attached to the lower end of the outer sleeve $71c_1$ of the chuck $71c$. Thus, with the lowering of the tool holder 68, the ring $71d$ comes in contact with the stepped surface to correct the posture of the outer member B1 to a vertical or upright one and, in this condition, the operating sleeve $71c_3$ is moved downward by the cylinder $71c_2$ provided in the outer sleeve $71c_1$ so as to close the collet $71c_4$, thereby holding the one end A1 of the driving shaft A properly centered through the outer member B1 of the first joint unit B.

As shown in FIG. 49, the tool holder 68 of the backup 65 provided in each of the assembling stations S7, S10 and S13 for the joint body B5, the rubber boot C6 and the spider C2, respectively, is provided with a load cell $68d$ abutting on the upper end of the supporting member 68 so that push-up load acting on the supporting member $68c$ during assembly of the parts and components may be detected by the load cell $68d$ so as to determine whether or not the parts and components are assembled properly.

Figure 53:
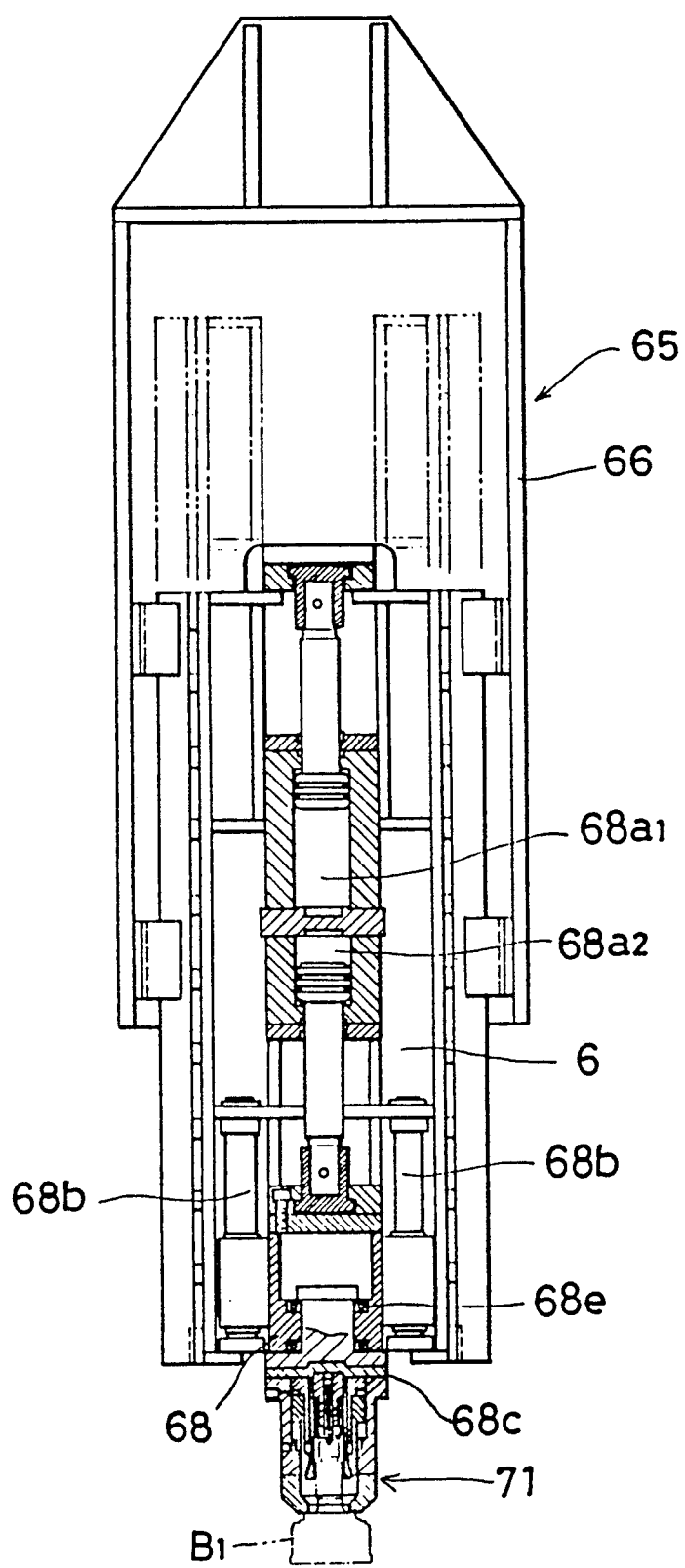
FIG. 53 is a sectional view of the backup unit provided at the assembling station for the roller and the outer member, the sectional view corresponding to that in FIG. 49.

The tool holder 68 of the backup unit 65 provided in the assembling station S16 is, as shown in FIG. 53, moved upward and downward by upper and lower cylinders $68a_1$, $68a_2$. By operation of the upper cylinder $68a_1$, the backup member 71 is moved downward to a position where it can clamp the outer member B1 of the first joint unit B on the upper end of the driving shaft A found at the conveying level. By operation of the lower cylinder $68a_2$, the driving shaft A is lowered further from the conveying level. Further, the tool holder 68 is arranged to include the supporting member $68c$ pivotally supported on a bearing 68 to permit the driving shaft A to rotate in conjunction with the aforementioned phase alignment of the spider C2.

Arranged as described in the foregoing, the present invention brings about the following effects.

According to the assembling method, since the driving shaft A is conveyed in its upright or vertical posture to each assembling station where component parts are assembled to the shaft A still held in the vertical posture, both the width of the conveying passage and the planar space of the assembling stations are significantly reduced for an improved space economy. In addition, the driving shaft which would otherwise be unbalanced due to the component parts attached thereto at one assembling station or another can be conveyed in its balanced, stable state of posture.

Further according to the assembling method, since the second joint unit is assembled to the other end of the driving shaft only after the first joint unit has been assembled to one end of the driving shaft, centering of the other end of the driving shaft which is carried out at each assembling station belonging to the first group of assembling stations for the first joint unit can be performed while directly holding the other end of the shaft with the backup unit. In this manner, it is not necessary to change the specification of the backup unit according to change in type of the second joint unit. On the other hand, centering of one end of the driving shaft to be performed at each assembling station belonging to the second group of assembling stations for the second joint unit can be carried out while holding the shank of the outer member of the first joint unit already assembled to one end of the driving shaft with the backup unit. Since there is practically no difference in the shape of the shank according to type of the first joint unit, it is thus unnecessary to change the specification of the backup unit for the second group of assembling stations due to change in type of the first joint unit. All these combine to make it easier to deal with changes in types of the joint units and contribute to improvement of productivity.

Still further according to the assembling method, the component parts of each of the joint units are assembled to the driving shaft from therebelow so that the frequency at which assembling errors could take place due to the component parts falling off from the assembling device may be reduced to a minimum and at the same time the parts falling into the rubber boot and remaining therein can be prevented.

According to the assembling apparatus, assembling of the driving shaft according to the above method is automatically and efficiently performed while, by making the conveying passage of the driving shaft annular, the apparatus as a whole is made compact and the number of the carriers required is reduced for lower cost of the apparatus.

Further, according to this invention, a pair of upper and lower chuck members for each carrier can be adjusted in position independently of each other by adjusting separately a pair of the upper and lower lift rails which are separately adjustable for their lift-up so that any one of plural driving shafts different in length may be held stably by the chuck means with an appropriate clamping span therebetween which is determined according to the length of the shaft. In addition, all of the upper chuck means for all of the carriers are adjusted in position altogether and those lower ones also adjusted likewise altogether so that operations to make the positional adjustment as required according to the change in type of the driving shaft can be carried out speedily. Still further to the invention, each of the lift rails is so arranged as to be smoothly raised and lowered with rotation of one of rotary tables provided. This simplifies the structural arrangement thereof and contributes to cost reduction.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a vehicular driving shaft in which a joint unit is attached to each of both ends of the driving shaft, comprising:

a plurality of carriers movably provided along an annular conveying passage holding the driving shaft in its vertical posture in which its axial line extends vertically; a plurality of assembling stations, at appropriate intervals along a peripheral direction in the annular conveying passage, each station comprising a predetermined assembling device for assembling each component part of each said joint unit to the driving shaft and a supplying device for feeding each component part, and a drive mechanism which stops each carrier at each of the assembling stations and moves each carrier intermittently in the peripheral direction of the conveying passage; and wherein said plurality of the assembling stations are divided into two groups, a first group of assembling stations for a first joint unit to be assembled to one end of the driving shaft and a second group of assembling stations for a second joint unit to be assembled to the other end of the driving shaft, said first and second groups of assembling stations being disposed in that order along the peripheral direction of the conveying passage, and a discharging station for removing the driving shaft from each of said carriers and a charging station for setting the driving shaft into each carrier side by side on a portion of the conveying passage located between a final end of the second group of the stations and a starting end of the first group of the stations; and a reversing station on a portion of the conveying passage located between a final end of the first group of the stations and a starting end of the second group of the stations, said reversing station being equipped with a reversing device for removing the driving shaft from each of the carriers, turning the shaft upside down and then resetting the shaft one each of the carriers; and wherein each of said assembling devices provided at each assembling station of each group of the stations is arranged to be of the type that each of the component parts is assembled to the driving shaft from therebelow; and wherein the charging station is provided with a loader device for setting the driving shaft on each carrier while holding the shaft with said one end thereof facing downward.

2. An apparatus for assembling a vehicular driving shaft according to claim 1, wherein each of the assembling stations belonging to the first group includes a backup unit for centering the other end of the driving shaft and holding the same in the centered position, and each of the assembling stations belonging to the second group is provided with a backup unit for centering the shank of the outer member of the first joint unit already assembled to one end of the driving shaft and holding the same in the centered position.

3. An apparatus for assembling a vehicular driving shaft in which a joint unit is attached to each of both ends of the driving shaft, comprising: a plurality of carriers movably provided along an annular conveying passage holding the driving shaft in its vertical posture in which its axial line extends vertically; a plurality of assembling stations, at appropriate intervals along a peripheral direction in the annular conveying passage, each station comprising a predetermined assembling device for assembling each component part of each said joint unit to the driving shaft and a supplying device for feeding each component part, and a drive mechanism which stops each carrier at each of the assembling stations and moves it intermittently in the peripheral direction of the conveying passage; and further comprising a machine base having an outer peripheral space therearound defining the conveying passage, the drive mechanism having an annular frame on which said plurality of the carriers are disposed at intervals in the peripheral direction thereof turnably supported on said machine base, means for turning said annular frame intermittently for a predetermined angle at a time, plural guide members vertically attached to said annular frame, paired upper and lower carrier frames each supported on said guide members, each of said carriers having a chuck member attached to one of said paired upper and lower carrier frames, the driving shaft being held at two upper and lower points by the respective chuck member of each said carrier, and a pair of annular upper and lower lift rails concentric with the annular frame and connected thereto to permit adjustment of elevation of each rail separately, said upper and the lower carrier frames of all of the carriers being engaged, respectively, with the upper and the lower lift rails so as to be slidable in the peripheral direction.

4. An apparatus for assembling a vehicular driving shaft according to claim 3, further comprising first rods at a plurality of locating along the periphery of the upper lift rail, second rods at a plurality of locations along the periphery of the lower lift rail, first levers at a plurality of first locations on the periphery of the machine base ,connected to move each of the first rods upward and downward, second levers to at a plurality of second locations of the periphery of the machine base connected to move each of the second rods upward and downward, a first rotary table at the center portion on the machine base, a plurality of first links connecting the first levers to the first rotary table operating to make those first levers swing synchronously with one another, a second rotary table at the center portion on the machine base, and a plurality of second links connecting the second levers to the second rotary table operating to make those second levers swing sychronously with each other through, said first and second tables being disposed vertically one over the other.

* * * * *

UNITED STATES PATENT AND TRADEMARK OFFICE
CERTIFICATE OF CORRECTION

PATENT NO. : 5,038,463
DATED : August 13, 1991
INVENTOR(S) : Yoshiharu KAMATA et al It is certified that error appears in the above-indentified patent and that said Letters Patent is hereby corrected as shown below:

Column 28, line 45, "locating" should read --locations--;

line 49, delete ",";
line 50, delete "to".

Signed and Sealed this

Eighth Day of June, 1993

Attest:

MICHAEL K. KIRK

*Attesting Officer*     Acting Commissioner of Patents and Trademarks